United States Patent
Takei et al.

(10) Patent No.: US 8,131,141 B2
(45) Date of Patent: Mar. 6, 2012

(54) LENS POSITION DETECTING DEVICE INCLUDING A POSITION DETECTING MAGNET AND A MAGNET FORCE DETECTING SENSOR

(75) Inventors: Tomoya Takei, Tokyo (JP); Toshifumi Takaoka, Chiba (JP); Hideo Takagi, Tokyo (JP); Yoshikazu Ito, Gifu (JP); Masanori Hayashi, Chiba (JP); Tomohiro Yasui, Tokyo (JP); Hideki Yamaoka, Gifu (JP); Kentaro Tashita, Gifu (JP)

(73) Assignee: Sony Corporation, Tokyo (JP)

(*) Notice: Subject to any disclaimer, the term of this patent is extended or adjusted under 35 U.S.C. 154(b) by 659 days.

(21) Appl. No.: 10/576,097

(22) PCT Filed: Aug. 18, 2005

(86) PCT No.: PCT/JP2005/014946
§ 371 (c)(1),
(2), (4) Date: May 15, 2007

(87) PCT Pub. No.: WO2006/019094
PCT Pub. Date: Feb. 23, 2006

(65) Prior Publication Data
US 2007/0273364 A1 Nov. 29, 2007

(30) Foreign Application Priority Data

Aug. 19, 2004 (JP) ................... 2004-239146
Aug. 27, 2004 (JP) ................... 2004-249366
Aug. 27, 2004 (JP) ................... 2004-249370

(51) Int. Cl.
*G03B 17/00* (2006.01)
(52) U.S. Cl. .......................... 396/87; 396/120
(58) Field of Classification Search ............. 396/87
See application file for complete search history.

(56) References Cited

U.S. PATENT DOCUMENTS
4,401,944 A * 8/1983 Narimatsu et al. ........ 324/207.21
(Continued)

FOREIGN PATENT DOCUMENTS
JP 02-140410 5/1990
(Continued)

OTHER PUBLICATIONS
International Preliminary Report on Patentability and Written Opinion of the International Searching Authority for PCT/JP2005/014946 dated Feb. 20, 2007.
(Continued)

*Primary Examiner* — Clayton E Laballe
*Assistant Examiner* — Bret Adams
(74) *Attorney, Agent, or Firm* — Finnegan, Henderson, Farabow, Garrett & Dunner, L.L.P.

(57) ABSTRACT

A lens position detecting device 200 has a position detecting magnet 202, a magnetic force detecting sensor 204, a positional information generating means 206, etc. The position detecting magnet 202 is mounted on a rear surface of a lens holder frame 1460. The magnetic force detecting sensor 204 serves to generate a detected signal having a magnitude depending on the intensity of a magnetic force generated from the magnetic poles of the position detecting magnet 202. The magnetic force detecting sensor 204 is disposed on a straight line that passes through the position detecting magnet 202 parallel to the optical axis. The magnetic force detecting sensor 204 outputs a detected signal having a voltage corresponding (proportional) to the intensity of the magnetic force. An amplifying circuit 208 of a positional information generating means 206 amplifies the detected signal Ss from the magnetic force detecting sensor 204.

12 Claims, 66 Drawing Sheets

U.S. PATENT DOCUMENTS

| | | | |
|---|---|---|---|
| 4,740,064 A * | 4/1988 | Kono et al. | 359/694 |
| 5,200,776 A | 4/1993 | Sakamoto | |
| 5,220,461 A * | 6/1993 | Inoue et al. | 359/824 |
| 5,345,290 A | 9/1994 | Watanabe et al. | |
| 5,432,639 A * | 7/1995 | Sakamoto | 359/823 |
| 5,801,762 A * | 9/1998 | Dianna et al. | 348/65 |
| 5,905,598 A * | 5/1999 | Shimada et al. | 359/694 |
| 6,263,162 B1 * | 7/2001 | Yamazaki et al. | 396/55 |
| 6,392,827 B1 * | 5/2002 | Ueyama et al. | 359/824 |
| 6,456,444 B1 * | 9/2002 | Yumiki et al. | 359/696 |
| 6,553,185 B1 * | 4/2003 | Inaba et al. | 396/85 |
| 6,968,129 B2 * | 11/2005 | Takei et al. | 396/85 |
| 2004/0057710 A1 * | 3/2004 | Terao | 396/52 |
| 2005/0036775 A1 * | 2/2005 | Morimoto | 396/67 |
| 2006/0119732 A1 * | 6/2006 | Ohta | 348/347 |
| 2008/0151398 A1 * | 6/2008 | Yu | 359/824 |
| 2008/0199166 A1 * | 8/2008 | Tojyo et al. | 396/55 |

FOREIGN PATENT DOCUMENTS

| | | |
|---|---|---|
| JP | 2-140410 | 11/1990 |
| JP | 05-045162 | 2/1993 |
| JP | 05-181048 | 7/1993 |
| JP | 5-181048 | 7/1993 |
| JP | 08-248297 | 9/1996 |
| JP | 8-248297 | 9/1996 |
| JP | 09-210673 | 8/1997 |
| JP | 10-170211 | 6/1998 |
| JP | 10-225083 | 8/1998 |
| JP | 2881959 | 2/1999 |
| JP | 11-149030 | 6/1999 |
| JP | 11-218794 | 8/1999 |
| JP | 2000-002559 | 1/2000 |
| JP | 2000-2559 | 1/2000 |
| JP | 2000-013670 | 1/2000 |
| JP | 2000-241694 | 9/2000 |
| JP | 2002-169073 | 6/2002 |
| JP | 2002-296480 | 10/2002 |

OTHER PUBLICATIONS

European Search Report dated Feb. 11, 2011, in corresponding European Patent Application No. 05 780 510.3.

* cited by examiner

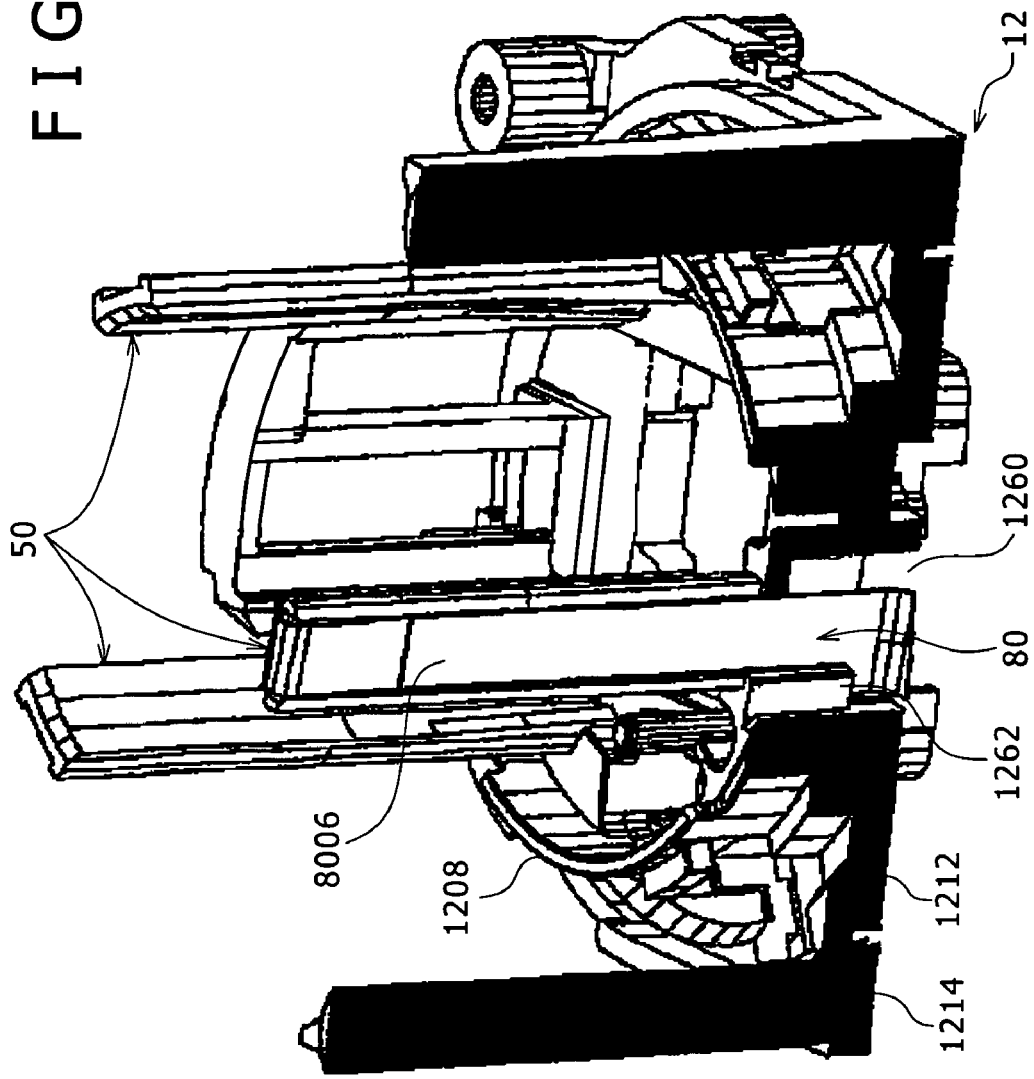

LENS POSITION DETECTING DEVICE INCLUDING A POSITION DETECTING MAGNET AND A MAGNET FORCE DETECTING SENSOR

TECHNICAL FIELD

The present invention relates to a lens position detecting device, a lens barrel, and an image capturing device.

BACKGROUND ART

Generally, lens actuating devices for video cameras and digital still cameras having an automatic focusing function and an electronic zooming function have a lens position detecting device for detecting the position of a movable lens for automatic focusing and the position of a movable lens for zooming.

Relatively many lens position detecting devices of the above type employ a magnetoresistive device such as an MR sensor for converting a change in the magnetic force of a magnet, for example, into an electric signal.

For example, there has been proposed according to prior art 1 a lens position detecting device having a position detecting magnet that is magnetized into alternate different magnetic poles along the direction in which a movable member moves, and a magnetoresistive device fixed to a fixed member in confronting relation to the range in which the position detecting magnet is movable, the magnetoresistive device having its resistance variable depending on a change in magnetism (see, for example, Japanese Patent Laid-Open No. 2002-169073).

The lens position detecting device requires a magnet having a size that is substantially equal to the moving stroke of the movable member. The positional signal produced by the magnetoresistive device is represented by a repetitive wave having constant amplitude.

According to prior art 2, there has been proposed a lens position detecting device which employs a Hall device instead of the MR sensor (see, for example, Japanese Patent Laid-Open No. Hei 11-149030).

The lens position detecting device has a magnetic scale magnetized into alternate S and N poles arranged at a predetermined pitch along a driving direction, and a magnetic sensor installed in confronting relation to the magnetic scale with a certain distance provided therebetween. The magnetic sensor includes an MR device, a Hall device, or the like, According to prior art 3, there has also been proposed a position detecting method which employs an inclined magnet and a Hall device to detect a position based on a change in the magnetic flux applied to the Hall device when the distance between the inclined surface of the magnet as a movable member moves in the direction of an optical axis, i.e., in an optical axis direction (see, for example, Japanese Patent Publication No. 2881959).

Image capturing devices such as digital still cameras, digital video cameras, etc. have a lens barrel.

The lens barrel has a lens for guiding a subject image to an image capturing unit, the lens being disposed forwardly of the image capturing unit which captures the subject image, a lens holder frame for holding the lens, and an actuating mechanism for moving the lens holder frame in an optical axis direction. The lens, the lens holder frame, and the actuating mechanism are disposed in a barrel (see, for example, Japanese Patent Laid-Open No. 2002-296480).

The actuating mechanism has a male screw member disposed radially outwardly of the lens and extending in the optical axis direction, a motor for rotating the male screw member, a support member supporting the both ends of the male screw member, and a female screw member threaded over the male screw member and movable in the direction in which the male screw member extends. The female screw member is connected to the movable lens. When the motor is energized, the movable lens is moved in the axial direction in unison with the female screw member.

The motor includes a rotary motor having a rotor rotatable with respect to a stator.

There is also proposed a lens barrel which employs a linear motor, instead of the rotary motor, having a stator and a rotor which are developed in a linear configuration.

FIG. 72 is a perspective view of an arrangement of a lens barrel employing a linear motor and FIG. 73 is a cross-sectional view of FIG. 72.

As shown in FIGS. 72 and 73, the lens barrel has a base 2 with an image capturing unit 1 mounted therein, a lens holder frame 4 holding a lens 3 for guiding a subject image to the image capturing unit 2, two guide shafts 5 inserted respectively through two bearings 4A of the lens holder frame 4 and holding the lens holder frame 4 movably in the optical axis direction of the lens 3, a linear motor 6 as an actuating mechanism for moving the lens holder frame 4 in the optical axis direction of the lens 3, and a position detecting mechanism 7 for detecting the position of the lens in the optical axis direction thereof.

The linear motor 6 includes a voice-coil linear motor, and has a coil 6A fixed to the lens holder frame 4 and having a winding around a winding axis parallel to the optical axis, a yoke 6B inserted centrally through the coil 6A and fixed to the base 2, and a magnet 6C magnetized into N poles and S poles along a direction perpendicular to the winding axis.

The yoke 6B includes a back yoke 6B1 extending parallel to the optical axis and supporting the magnet 6C mounted thereon, and an opposite yoke 6B2 extending parallel to the back yoke 6B1 in spaced relation thereto and inserted centrally through the coil 6A. Since the back yoke 6B1 and the opposite yoke 6B2 have their ends interconnected, the yoke 6B and the magnet 6C make up a closed magnetic circuit. Any magnetic fields generated outside of the magnetic circuit can almost be ignored.

When a drive current flows through the coil 6A, it generates a magnetic field, and the magnet 6C and the yoke 6B generate a magnetic field. These magnetic fields magnetically interact to apply a drive force to the coil 6A, i.e., the lens holder frame 4, in the optical axis direction, thereby moving the lens holder frame 4 in the optical axis direction.

The position detecting mechanism 7 has an MR magnet 7A mounted on one of the bearings 4A of the lens holder frame 4 and having different magnetic poles alternately arranged in the optical axis direction, and an MR sensor (magnetoresistive device) 7B mounted on the base 2 for detecting magnetic forces of the MR magnet 7A.

When the lens holder frame 4 moves in the optical axis direction, the MR sensor 7B detects magnetic forces of the different magnetic poles of the MR magnet 7A and generates a detected signal. A detecting circuit, not shown, determines the distance that the lens holder frame 4 has moved, i.e., the position thereof in the optical axis direction, based on a change in the detected signal.

DISCLOSURE OF INVENTION

According to the prior art 1, 2 described above, since the sensor output signal, i.e., the detected signal (positional signal), generated when the movable member moves has a repetitive waveform having a constant amplitude, if the position detecting process is started when the movable member is located at any position in its stroke, then it is necessary to perform an initial position setting (initializing) process to acquire a sensor output signal at an end of the stroke in order to recognize a relative position from the stroke end. Therefore, each time the position detecting process is started, a period of time is required to move the movable member to the stroke end and acquire a sensor output signal.

To detect the direction in which the movable member is actuated, it is necessary to obtain two-phase sensor output signals. Accordingly, problems have arisen as to an increased sensor installation space, a reduction in the reliability of circuits and devices, and a need for the correction of an output signal deviation due to different magnetic characteristics of the two-phase sensors and device sensitivity differences.

The detection of positional information in the full stroke of the movable member requires a position detecting magnet having a size greater than the stroke of the movable member. As a consequence, the space of the lens barrel cannot effectively be utilized. Since the mass of the movable member is increased, a thrust force that the actuator needs to be generate is increased, resulting in an increase in the size of the actuator and hence the size of the image capturing device.

According to the prior art 3, as with the prior art 1, 2, obtaining positional information in the full stroke requires a position detecting magnetic having a length which is substantially equal to the stroke, and a large space is needed as a certain thickness is required in a direction perpendicular to the actuating direction in order to have the magnet inclined. Therefore, the lens actuating device and the image capturing device tend to be large in size.

With the lens barrel having the linear motor shown in FIGS. 72 and 73, if the lens held by the lens holder frame 4 is a focus adjusting lens movable in the optical axis direction for adjusting the focal point of a subject image that is focused onto the image capturing unit 2, then it is important to increase the speed at which the focus adjusting lens moves in the optical axis direction to quickly adjust the focus for increasing the operation efficiency at the time an image is captured.

However, the conventional structure suffers disadvantages against efforts to achieve smaller sizes and lower electric power requirements because the actuating mechanism (linear motor) tends to be larger in size and needs a greater drive current in order to increase the moving speed of the lens.

In order to reduce the size of lens barrels, it has been attempted to employ a flat linear motor which occupies a smaller space than the above voice-coil linear motor.

However, inasmuch as the flat linear motor has an open magnetic circuit and a number of parts disposed in a small space that is provided in the lens barrel, the magnetic field that is formed around the linear motor causes a magnetic interference with the parts in the lens barrel, tending to adversely affect the parts in the lens barrel.

The present invention has been made in view of the above drawbacks. It is an object of the present invention to provide a lens position detecting device which is advantageous in making itself small in size and shortening a period of time required to detect the position of a lens.

Another object of the present invention is to provide a lens barrel and an image capturing device which are advantageous in preventing an actuating mechanism from being increased in size and also preventing electric power consumption from being increased, and in increasing the speed at which a lens moves in an optical axis direction for increasing the operation efficiency.

Furthermore, the present invention has been made in view of the magnetic interference described above. It is an object of the present invention to provide a lens barrel and an image capturing device which are advantageous in positively utilizing a magnetic interference to increase the speed at which a lens moves in an optical axis direction for increasing the operation efficiency.

To achieve the above objects, there is provided in accordance with the present invention a lens position detecting device for detecting the position of a lens on a base in an optical axis direction, including a position detecting magnet mounted on either one of the lens and the base, a magnetic force detecting sensor mounted on the other of the lens and the base, for generating a detected signal having a magnitude depending on the intensity of a magnetic force generated from magnetic poles of the position detecting magnet, and positional information generating means for generating positional information of the lens on the base in the optical axis direction based on the magnitude of the detected signal.

The magnetic force detecting sensor outputs a detected signal having a magnitude depending on the distance between the position detecting magnet and the magnetic force detecting sensor, i.e., the position of the lens in the optical axis direction, and the positional information generating means detects the position of the lens based on the magnitude of the detected signal.

Therefore, it is not necessary to provide a position detecting magnet over the full moving stroke of the lens, and the space occupied by the position detecting magnetic is greatly reduced, resulting in an advantage in reducing the size of the lens position detecting device.

Since the magnetic force detecting sensor generates a detected signal having a magnitude depending on the intensity of a magnetic force generated from the magnetic poles of the position detecting magnet, and the detected signal is uniquely determined depending on the position of the lens, it is not necessary to perform an initializing process by moving the lens holder frame to a reference position prior to the detection of the lens position, allowing the period of time required to detect the lens position to be shortened.

To achieve the above objects, there is provided in accordance with the present invention a lens barrel including a barrel, a base disposed in the barrel, an image capturing unit disposed in the barrel and mounted on the base, a lens disposed in the barrel for guiding a subject image to the image capturing unit, a lend holder frame disposed in the barrel and holding the lens, a guide mechanism disposed in the barrel and supporting the lens holder frame for movement in an optical axis direction of the lens, an actuating mechanism disposed in the barrel for moving the lens holder frame in the optical axis direction, and a position detecting mechanism disposed in the barrel for detecting the position of the lens in the optical axis direction, wherein the actuating mechanism has a coil mounted on one of the base and the lens holder frame, an actuating magnet mounted on the other of the base and the lens holder frame, and current supply means for supplying a drive current to the coil, the actuating magnet having a magnetic pole surface extending parallel to the optical axis of the lens, the magnetic pole surface having two different magnetic poles arrayed in a direction in which the magnetic pole surface extends, the coil having a winding disposed around an axis perpendicular to the magnetic pole surface and having a winding end surface facing the magnetic pole surface, wherein the position detecting mechanism includes a position detecting magnet for generating a magnetic force and a magnetic force detecting sensor for detecting the magnetic force from the position detecting magnet through a magnetosensitive surface thereof and generating a detected signal having a magnitude depending on the intensity of the magnetic force, the position detecting magnet being mounted on the lens holder frame, the base having a thin wall portion in a wall portion thereof through which a straight line extending through the position detecting magnet parallel to the optical axis passes, and the magnetic force detecting sensor being disposed in place with the magnetosensitive surface being held against the thin wall portion by a metal plate mounted on the base and made of a weak magnetic material, the metal plate being pressed against a rear surface of the magnetic force detecting sensor which is opposite to the magnetosensitive surface.

According to the present invention, there is also provided an image capturing device having a lens barrel having an image capturing unit for capturing a subject image guided by a lens, the lens barrel including a barrel, a base disposed in the barrel, the image capturing unit being mounted on the base, the lens disposed in the barrel, a lend holder frame disposed in the barrel and holding the lens, a guide mechanism disposed in the barrel and supporting the lens holder frame for movement in an optical axis direction of the lens, and an actuating mechanism disposed in the barrel for moving the lens holder frame in the optical axis direction, wherein the actuating mechanism has a coil mounted on one of the base and the lens holder frame, an actuating magnet mounted on the other of the base and the lens holder frame, and current supply means for supplying a drive current to the coil, the actuating magnet having a magnetic pole surface extending parallel to the optical axis of the lens, the magnetic pole surface having two different magnetic poles arrayed in a direction in which the magnetic pole surface extends, the coil having a winding disposed around an axis perpendicular to the magnetic pole surface and having a winding end surface facing the magnetic pole surface, wherein the position detecting mechanism includes a position detecting magnet for generating a magnetic force and a magnetic force detecting sensor for detecting the magnetic force from the position detecting magnet through a magnetosensitive surface thereof and generating a detected signal having a magnitude depending on the intensity of the magnetic force, the position detecting magnet being mounted on the lens holder frame, the base having a thin wall in a wall portion thereof through which a straight line extending through the position detecting magnet parallel to the optical axis passes, and the magnetic force detecting sensor being disposed in place with the magnetosensitive surface being held against the thin wall portion by a metal plate mounted on the base and made of a weak magnetic material, the metal plate being pressed against a rear surface of the magnetic force detecting sensor which is opposite to the magnetosensitive surface.

According to the present invention, the position detecting magnet is mounted on the lens holder frame, the base has the thin wall in the wall portion thereof through which the straight line extending through the position detecting magnet parallel to the optical axis passes, and the magnetic force detecting sensor is disposed in place with the magnetosensitive surface being held against the thin wall portion by a metal plate mounted on the base and made of a weak magnetic material, the metal plate being pressed against a rear surface of the magnetic force detecting sensor which is opposite to the magnetosensitive surface, with the magnetosensitive surface being held against the thin wall.

Since the metal plate mounted on the base is made of a weak magnetic material, it is attracted by a magnetic force. The position detecting magnet undergoes an attractive force from the metal plate, and the lens holder frame is normally urged in a direction toward the image capturing unit.

If a focusing system is constructed using the lens barrel according to the present invention, then the focusing lens (focal point adjustment lens) moves in a direction toward the image capturing unit until the image is focused, and when the image is focused, the focusing lens stops moving, and an image capturing mode is initiated. If the focusing lens moves faster, then the image is focused in a shorter period of time.

As described above, since the lens holder frame of the focusing lens is attracted under a magnetic force, the attractive force, in addition to the actuating force from the actuating mechanism, is applied to the lens holder frame for focusing the image in a shorter period of time.

Furthermore, inasmuch as the metal plate is positioned on the rear surface of the magnetic force detecting sensor, magnetic fluxes from a Hall device magnet concentrate on the metal plate.

Stated otherwise, the metal plate has a confronting yoke effect, resulting in increased magnetic fluxes that pass through the magnetic force detecting sensor. Therefore, the detected signal from the magnetic force detecting sensor increases in level, resulting in an advantage in increasing the accuracy with which to detect the position of the focusing lens that is obtained based on the detected signal.

To achieve the above objects, there is provided in accordance with the present invention a lens barrel including a barrel, a base disposed in the barrel, an image capturing unit disposed in the barrel and mounted on the base, a lens disposed in the barrel for guiding a subject image to the image capturing unit, a lend holder frame disposed in the barrel and holding the lens, a guide mechanism disposed in the barrel and supporting the lens holder frame for movement in an optical axis direction of the lens, an actuating mechanism disposed in the barrel for moving the lens holder frame in the optical axis direction, and a position detecting mechanism disposed in the barrel for detecting the position of the lens in the optical axis direction, wherein the actuating mechanism has a coil mounted on the lens holder frame, an actuating magnet mounted on the base, and current supply means for supplying a drive current to the coil, the actuating magnet having a magnetic pole surface extending parallel to the optical axis of the lens, the magnetic pole surface having two different magnetic poles arrayed in a direction in which the magnetic pole surface extends, the coil having a winding disposed around an axis perpendicular to the magnetic pole surface and having a winding end surface facing the magnetic pole surface, wherein the position detecting mechanism includes a position detecting magnet for generating a magnetic force and a magnetic force detecting sensor for detecting the magnetic force from the position detecting magnet through a magnetosensitive surface thereof and generating a detected signal having a magnitude depending on the intensity of the magnetic force, the position detecting magnet being mounted on the lens holder frame, the magnetic force detecting sensor being mounted on a wall portion of the base through which a straight line extending parallel to the optical axis through the position detecting magnet passes, with the magnetosensitive surface facing the position detecting magnet, and wherein the actuating magnet generates a first flux line and the position detecting magnet generates a second flux line, the first flux line and the second flux line being oriented in the same direction at a magnetic interference point where the first flux line and the second flux line cross each other.

According to the present invention, there is also provided an image capturing device having a lens barrel having an image capturing unit for capturing a subject image guided by a lens, the lens barrel including a barrel, a base disposed in the barrel, the image capturing unit being mounted on the base, the lens disposed in the barrel, a lend holder frame disposed in the barrel and holding the lens, a guide mechanism disposed in the barrel and supporting the lens holder frame for movement in an optical axis direction of the lens, and an actuating mechanism disposed in the barrel for moving the lens holder frame in the optical axis direction, wherein the actuating mechanism has a coil mounted on the lens holder frame, an actuating magnet mounted on the base, and current supply means for supplying a drive current to the coil, the actuating magnet having a magnetic pole surface extending parallel to the optical axis of the lens, the magnetic pole surface having two different magnetic poles arrayed in a direction in which the magnetic pole surface extends, the coil having a winding disposed around an axis perpendicular to the magnetic pole surface and having a winding end surface facing the magnetic pole surface, wherein the position detecting mechanism includes a position detecting magnet for generating a magnetic force and a magnetic force detecting sensor for detecting the magnetic force from the position detecting magnet through a magnetosensitive surface thereof and generating a detected signal having a magnitude depending on the intensity of the magnetic force, the position detecting magnet being mounted on the lens holder frame, the magnetic force detecting sensor being mounted on a wall portion of the base through which a straight line extending parallel to the optical axis through the position detecting magnet passes, with the magnetosensitive surface facing the position detecting magnet, and wherein the actuating magnet generates a first flux line and the position detecting magnet generates a second flux line, the first flux line and the second flux line being oriented in the same direction at a magnetic interference point where the first flux line and the second flux line cross each other.

According to the present invention, since the first flux line generated by the actuating magnet and the second flux line generated by the position detecting magnet are oriented in the same direction at a magnetic interference point where the first flux line and the second flux line cross each other, a magnetic reactive force acts between the actuating magnet and the position detecting magnet in a direction to keep them apart from each other.

According to the present invention, therefore, a magnetic field generated around a linear motor is positively caused to magnetically interfere with parts in the lens barrel.

Consequently, if the lens holder frame is moved rearwardly in the optical axis direction by the actuating mechanism, then the magnetic reactive force, in addition to the actuating force from the actuating mechanism, is applied to the lens holder frame, thereby accelerating the lens holder frame.

If a focusing system is constructed using the lens barrel according to the present invention, then the focusing lens moves in a direction toward the image capturing unit until the image is focused, and when the image is focused, the focusing lens stops moving, and an image capturing mode is initiated. If the focusing lens moves faster, then the image is focused in a shorter period of time.

As described above, since the lens holder frame of the focusing lens undergoes a force due to the magnetic reactive force, the magnetic reactive force, in addition to the actuating force from the actuating mechanism, is applied to the lens holder frame for focusing the image in a shorter period of time.

In a focusing system wherein the focusing lens moves in a direction away from the image capturing unit to focus the image, then the polarity of one of the magnets is inverted to produce a magnetic attractive force acting between the actuating magnet and the position detecting magnet in a direction to attract them to each other, and the magnetic attractive force is added to the actuating force from the actuating mechanism. In this manner, the image can be focused in a shorter period of time.

BRIEF DESCRIPTION OF DRAWINGS

FIG. 48 is a perspective view showing the manner in which the shutter flexible board 80 is set in place.

Figure 70:
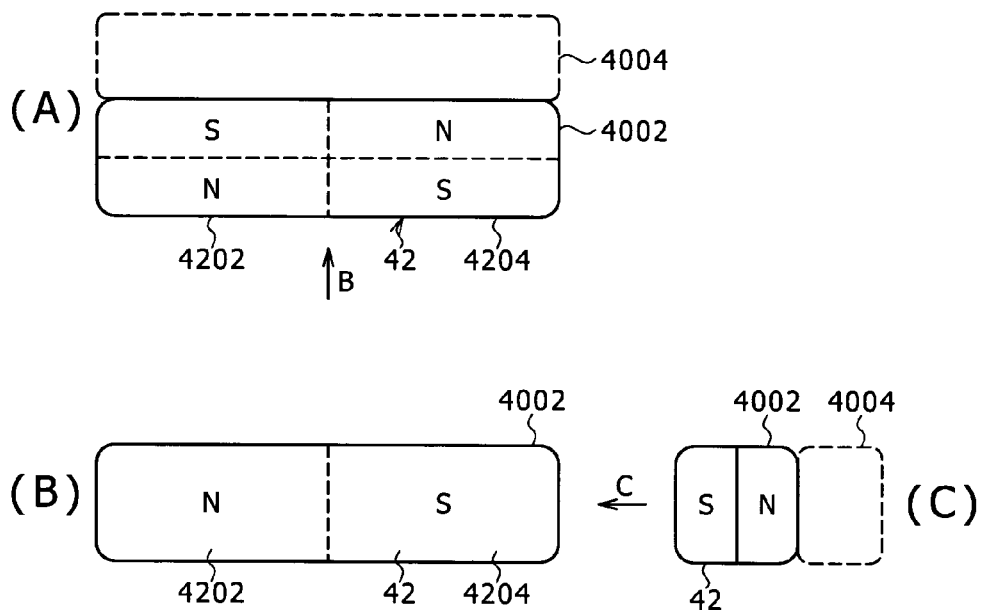

(A) of FIG. 70 is a side elevational view of the actuating magnet 4002 and a yoke 4004, (B) of FIG. 70 is a view as viewed in the direction indicated by the arrow B in (A) of FIG. 70, and (C) of FIG. 70 is a view as viewed in the direction indicated by the arrow C in (B) of FIG. 70.

Figure 71:
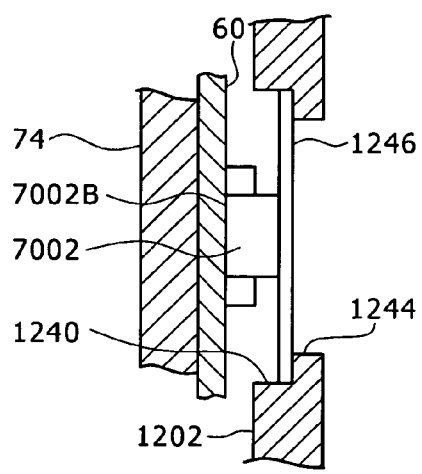

FIG. 71 is a cross-sectional view of the position detecting mechanism 70 shown in FIG. 71.

Figure 72:
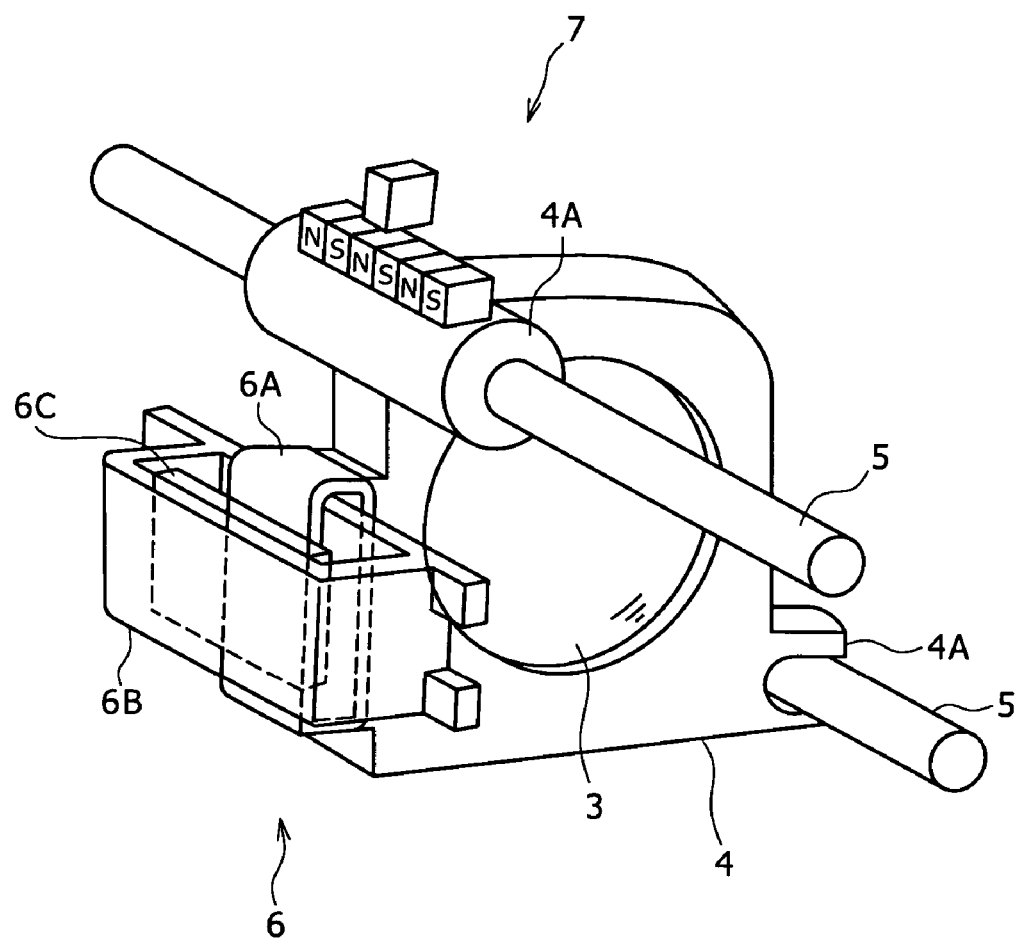

FIG. 72 is a perspective view of an arrangement of a lens barrel employing a linear motor.

Figure 73:
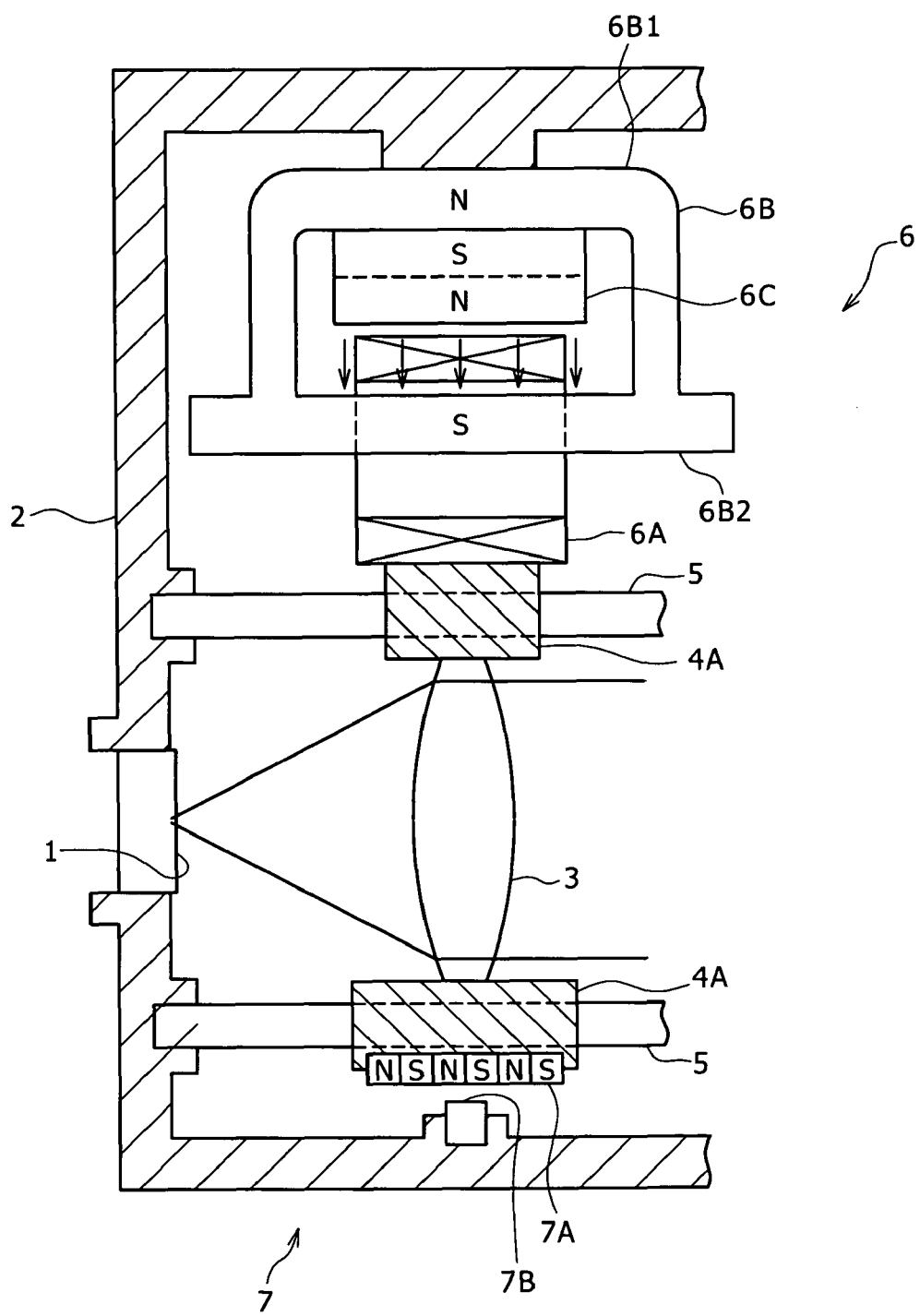

FIG. 73 is a cross-sectional view of FIG. 72.

BEST MODE FOR CARRYING OUT THE INVENTION

In Embodiments 1 through 4, the object to make a lens position detecting device small in size and shorten a period of time required to detect the position of a lens is achieved by providing a position detecting magnet, a magnetic force detecting sensor for generating a detected signal having a magnitude depending on the intensity of a magnetic force generated from the magnetic poles of the position detecting magnet, and a positional information generating means for generating the positional information of a lens based on the magnitude of the detected signal.

In Embodiment 5, the object to prevent an actuating mechanism from being increased in size and also prevent electric power consumption from being increased, and to increase the speed at which a lens moves for increasing the operation efficiency is achieved by mounting a position detecting magnet on a lens holder frame and holding a magnetic force detecting sensor against a thin wall at a wall location of a base with a metal plate made of a weak magnetic material mounted on the base.

Embodiment 1

Embodiment 1 of the present invention will be described below with reference to the drawings.

A lens position detecting device according to the present invention as incorporated in a digital still camera which serves as an image capturing device will be described below.

Figure 1:
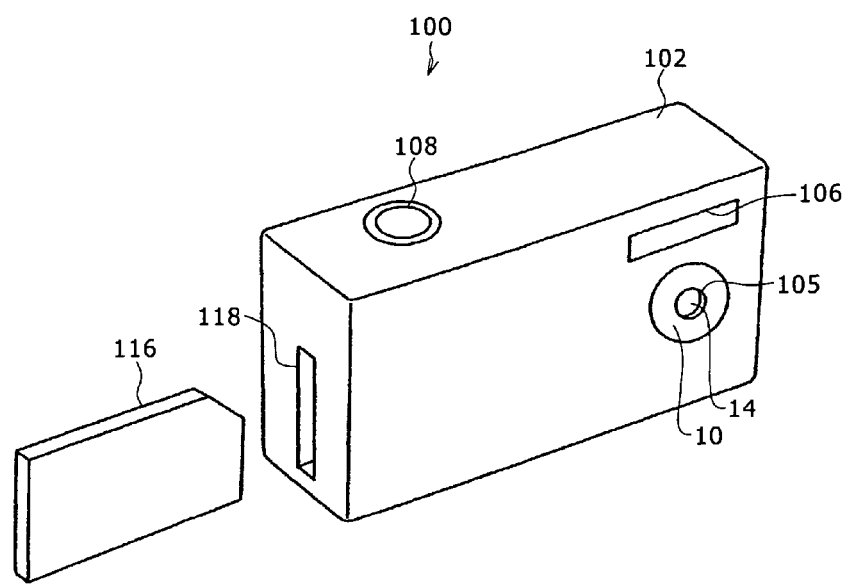
FIG. 1 is a perspective view of an image capturing device incorporating a lens position detecting device according to Embodiment 1.
Figure 2:
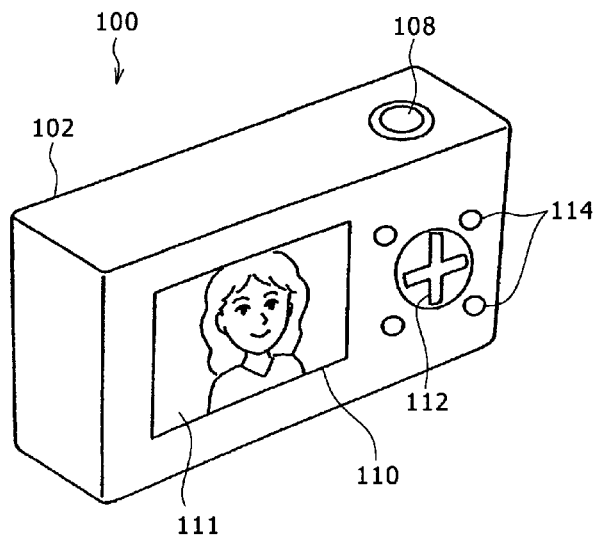
FIG. 2 is a perspective view of the image capturing device according to Embodiment 1, as viewed from behind.
Figure 3:
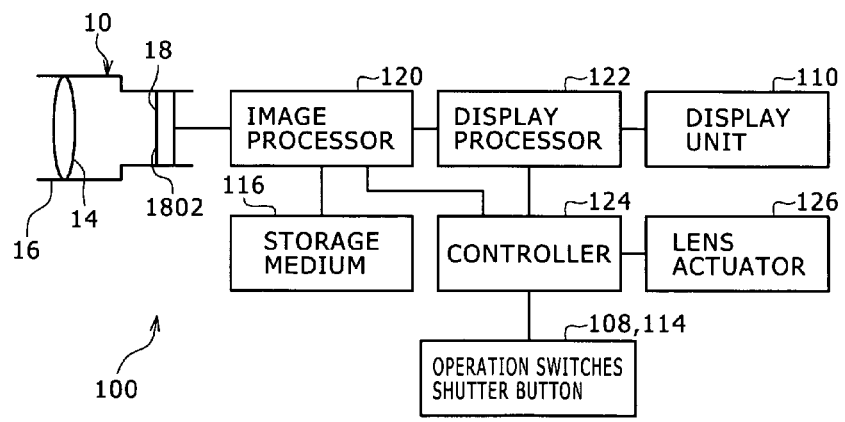
FIG. 3 is a block diagram of a control system of the image capturing device.
Figure 4:
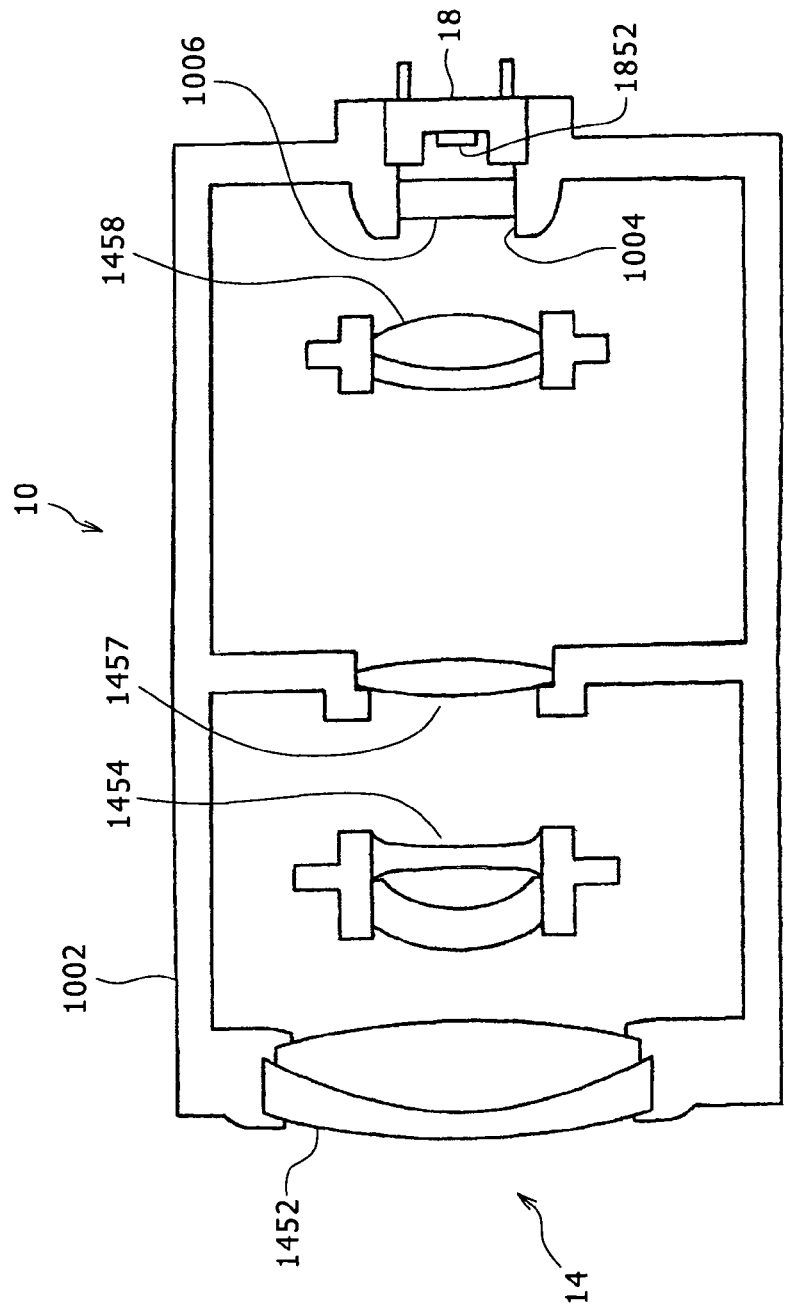
FIG. 4 is a cross-sectional view of a lens barrel.

FIG. 1 is a perspective view of an image capturing device incorporating a lens position detecting device according to Embodiment 1, as viewed from front, FIG. 2 is a perspective view of the image capturing device according to Embodiment 1, as viewed from behind, FIG. 3 is a block diagram of a control system of the image capturing device, and FIG. 4 is a cross-sectional view of a lens barrel.

As shown in FIG. 1, an image capturing device 100 includes a digital still camera and has a case 102 in made up of rectangular plates serving as an outer housing. In the present embodiment, left and right are referred to with respect to the image capturing device 100 when it is viewed from front, and a subject side in the optical axis direction of an optical system is referred to as front and an image capturing device side as rear.

As shown in FIG. 1, a lens window 105 is disposed on a front surface of the case 102 near a right edge thereof, and a lens barrel 10 is disposed so as to face forwardly of the case 102 from the lens window 105.

A flash unit 106 for emitting image capturing assistive light is disposed in a location above the lens window 105.

A shutter button 108, etc. is disposed on an upper face of the case 12 near a left edge thereof.

On a rear surface of the case 12, there are disposed a display unit 110 (liquid crystal display unit) for displaying images such as still images and moving images, characters, and symbols, a criss-cross switch 112 for performing various operations, and a plurality of operation buttons 114.

The case 12 has a memory storage space 118 defined in a left side thereof for removably storing therein a memory card 116 (storage medium) for recording images such as still images and moving images.

As shown in FIG. 3, the lens barrel 10 has an optical system 14 for guiding a subject image and an image capturing unit 18 disposed on the optical axis of the optical system 14. A subject image captured by the optical system 14 is focused onto the image capturing unit 18.

The image focused on the image capturing unit 18 is detected, and an image signal representing the detected image is output to an image processor 120. Based on the image signal, the image processor 120 generates image data representing a still image or a moving image, and records the image data in the memory card 116. The image data is also displayed on the display unit 110 by a display processor 122.

The image capturing device 100 also has a controller 124 including a CPU, etc. for controlling the image processor 120, the display processor 122, and a light controller depending on the operation of the shutter button 108, the criss-cross switch 112, and the operation buttons 114.

The image capturing device 100 also has a lens actuator 126 for outputting actuating signals required to move a first movable lens and a second movable lens, to be described later. The lens actuator 126 is controlled by the controller 124.

The lens barrel 10 will be described below.

As shown in FIG. 4, the lens barrel 10 has a barrel body 1002 to be placed in the case 102. The barrel body 1002 is in the shape of a hollow cylinder or a rectangular parallelepiped.

The optical system 14 includes a first fixed lens 1452, a first movable lens 1454, a second fixed lens 1456, and a second movable lens 1458 which are successively arranged in the barrel body 1002 in the order named from the front to the rear in the optical axis direction.

According to the present embodiment, the optical system 14 is constructed as an inner focus lens made up of these four lens groups.

The first fixed lens 1452 is fixedly mounted on a front end of the barrel body 1002 against movement in the optical axis direction of the optical system 14.

The second fixed lens 1456 is fixedly mounted in the barrel body 1002 at an intermediate position in the longitudinal direction thereof against movement in the optical axis direction of the optical system 14.

The first movable lens 1454 is disposed between the first fixed lens 1452 and the second fixed lens 1456, and the second movable lens 1458 is disposed behind the second fixed lens 1456. The first and second movable lenses 1454, 1458 are arranged such that they can be moved in the optical axis direction of the optical system 14 by a lens moving mechanism 50, to be described later, and their position in the optical axis direction can be detected by a lens position detecting device 200.

The first movable lens 1454 is constructed as a zoom lens for adjusting the focal length of the optical system 14 by being moved in the optical axis direction. The second movable lens 1458 is constructed as a focusing lens for adjusting the focal point of the optical system 14 by being moved in the optical axis direction. Therefore, the first movable lens 1454 is displaced to change the focal length of the optical system 14, and the second movable lens 1458 is displaced to correct a shift that is caused from the focused position by the change in the focal length, thereby bringing the optical system 14 into focus.

The barrel body 1002 has an opening 1004 defined in a rear end thereof. The image capturing unit 18 is mounted on the rear end of the barrel body 1002 and has a rectangular image capturing surface 1852 facing forwardly through the opening 1004. An optical filter 1006 is mounted in the opening 1004 for transmitting therethrough light that has passed through the second movable lens 1458. The optical filter 1006 includes a low-pass filter or an infrared filter, for example.

Figure 5:
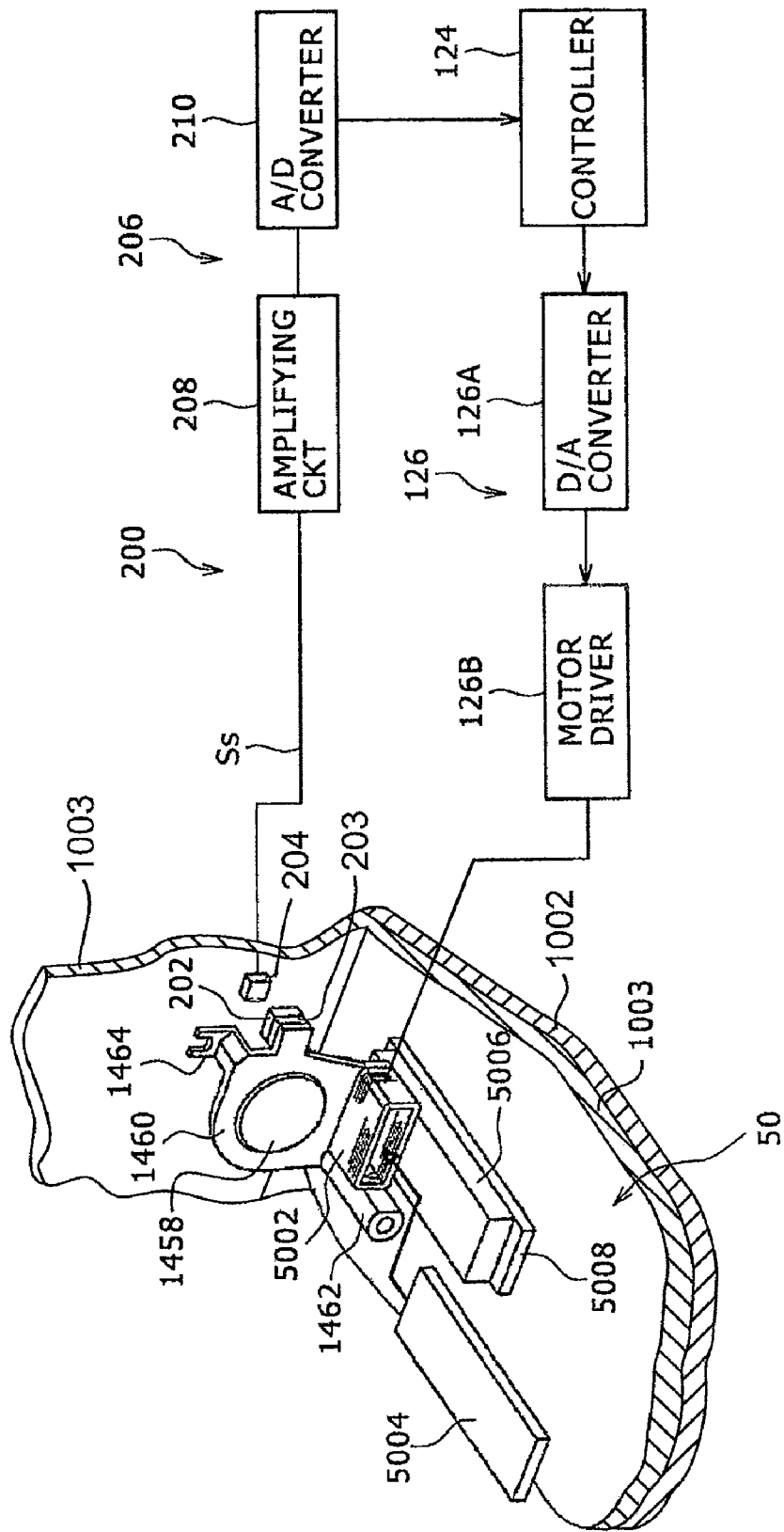
FIG. 5 is a view showing an arrangement of a lens guiding mechanism, a lens moving mechanism, and a lens position detecting device with respect to a second movable lens.
Figure 6:
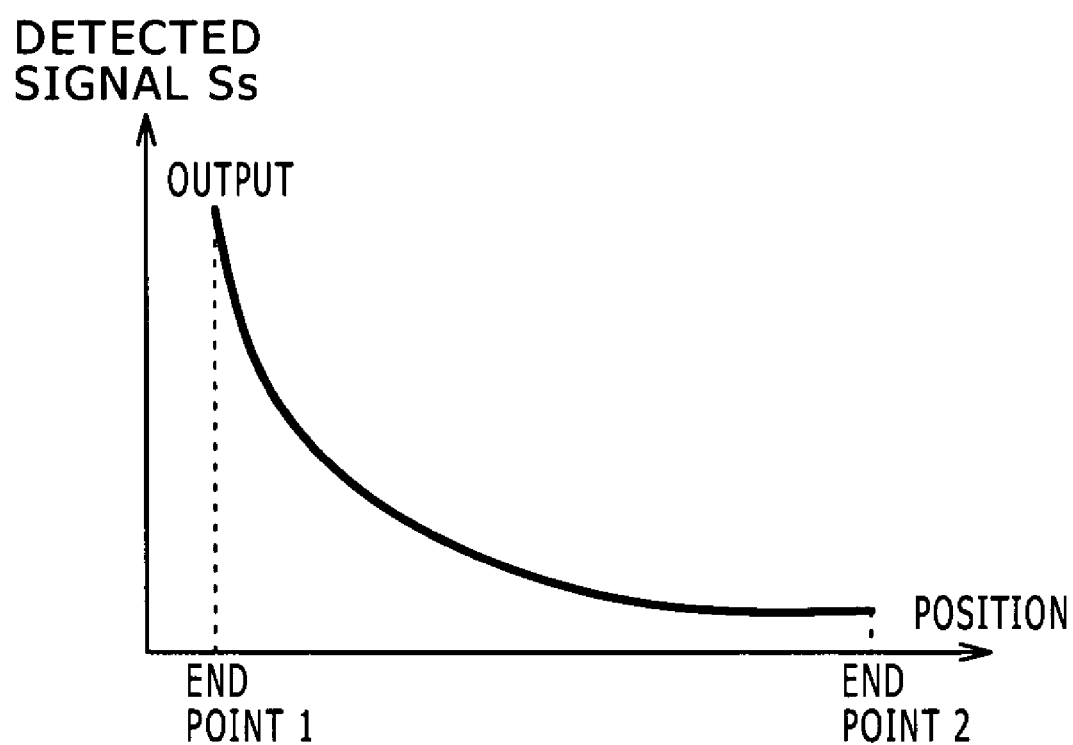
FIG. 6 is a diagram showing the relationship between a lens position and a detected signal.

FIG. 5 is a view showing an arrangement of a lens guiding mechanism, a lens moving mechanism, and a lens position detecting device with respect to the second movable lens, and FIG. 6 is a diagram showing the relationship between a lens position and a detected signal.

A lens position detecting device for the first movable lens 1454 is identical in structure to a lens position detecting device for the second movable lens 1458. Therefore, only the lens position detecting device for the second movable lens 1458 will be described below.

As shown in FIG. 5, a base 1003 is fixedly mounted in the barrel body 1002. On the base 1003, the second movable lens 1458 is supported for movement in the optical axis direction by a lens guiding mechanism 40, the second movable lens 1458 is moved in the optical axis direction by a lens moving mechanism 50, and the position of the second movable lens 1458 in the optical axis direction is detected by a lens position detecting device 200.

The lens guiding mechanism 40 includes a lens holder frame 1460, a sleeve portion 1462, a groove portion 1464, and first and second guide shafts, not shown.

The lens holder frame 1460 is of an annular shape with the second movable lens 1458 held centrally therein.

The sleeve portion 1462 and the groove portion 1464 are positioned in respective two locations on the outer circumferential edge of the lens holder frame 1460 that are spaced diametrically across the optical axis of the second movable lens 1458.

The first and second guide shafts are mounted on the base 1003 so as to extend parallel to the optical axis. The first guide shaft is inserted through the sleeve portion 1462, and the second guide shaft is inserted through the groove portion 1464, so that the second movable lens 1458 and the lens holder frame 1460 can linearly, but nonrotatably, move reciprocally along the first guide shaft.

The lens moving mechanism 50 includes an actuating coil 5002, an opposite yoke 5004, an actuating magnet 5006, and a ground yoke 5008.

The actuating coil 5002 is wound around an axis parallel to the optical axis and fixed to the lens holder frame 1460 by an adhesive or the like. The actuating coil 5002 has an internal space that is open at front and rear ends thereof.

The opposite yoke 5004 is in the shape of a strip, and is loosely inserted in the actuating coil 5002 and extends parallel to the optical axis.

The actuating magnet 5006 is in the shape of a strip, and is disposed on an outer circumferential surface of the actuating coil 5002 and extends parallel to the opposite yoke 5004.

The ground yoke 5008 is in the shape of a rectangular plate which is substantially identical in shape to the actuating magnet 5006, and is joined to a surface of the actuating magnet 5006 remote from the opposite yoke 5004.

The opposite yoke 5004 and the ground yoke 5008 are mounted on the base 1003. The actuating magnet 5006 is mounted on the ground yoke 5008.

The lens moving mechanism 50 is arranged such that when the lens actuator 126 supplies a drive current to the actuating coil 5002, the actuating coil 5002 generates a magnetic field, and the generated magnetic field and the magnetic field of the actuating magnet 5006 magnetically interact to produce a drive force to move the lens holder frame 1460 forwardly or rearwardly in the optical axis direction.

More specifically, the lens actuator 126 includes a D/A converter 126A for converting a digital drive signal supplied from the controller 124 into an analog drive signal, and a motor driver 126B for supplying the drive current to the actuating coil 5002 based on the analog drive signal supplied from the D/A converter 126A.

The lens position detecting device 200 includes a position detecting magnet 202, a magnetic force detecting sensor 204, positional information generating means 206, etc.

The position detecting magnet 202 is mounted on a rear surface of the lens holder frame 1460 for movement in the optical axis direction in unison with the lens holder frame 1460.

The position detecting magnet 202 is mounted on the lens holder frame 1460 such that N and S poles thereof are located in respective positions spaced from each other in the optical axis direction. Stated otherwise, the position detecting magnet 202 is magnetized in the optical axis direction.

According to the present embodiment, a ground yoke (back yoke) 203 for increasing the flux density of magnetic fluxes generated from the position detecting magnet 202 along the optical axis direction is interposed between the position detecting magnet 202 and the lens holder frame 1460, i.e., between the position detecting magnet 202 and the rear surface of the lens holder frame 1460.

The magnetic force detecting sensor 204 serves to generate a detected signal (positional signal) Ss having a magnitude depending on the intensity of a magnetic force generated from the magnetic poles of the position detecting magnet 202. The magnetic force detecting sensor 204 is mounted on the base 1003 in confronting relation to the position detecting magnet 202, and is disposed on a straight line that passes through the position detecting magnet 202 parallel to the optical axis.

According to the present embodiment, the magnetic force detecting sensor 204 includes a Hall device, for example. Since the Hall device generates a voltage that is proportional to the flux density, the magnetic force detecting sensor 204 outputs a detected signal Ss having a voltage corresponding (proportional) to the intensity of a magnetic force (the magnitude of the flux density) applied thereto. The magnetic force detecting sensor 204 is not limited to the Hall device, but may include a magnetoresistive device such as an MR device insofar as it can detect the intensity of a magnetic force and generate a detected signal Ss.

As shown in FIG. 6, if it is assumed that the second movable lens 1458 is at an end point 1 when it reaches the rearmost position (a position closest to the image capturing unit 18) and at an end point 2 when it reaches the foremost position (a position remotest from the image capturing unit 18), then when the second movable lens 1458 is positioned at the end point 1, the magnetic force of the position detecting magnet 202 as detected by the magnetic force detecting sensor 204 is maximum, and hence the detected signal Ss is maximum, and as the second movable lens 1458 moves from the end point 1 toward the end point 2, the magnetic force of the position detecting magnet 202 as detected by the magnetic force detecting sensor 204 is reduced, and hence the detected signal Ss is reduced.

Stated otherwise, the position of the lens holder frame 1460 and the voltage of the detected signal from the magnetic force detecting sensor 204 are held in one-to-one correspondence, and the position of the lens holder frame 1460 is uniquely determined by the value of the output voltage.

The positional information generating means 206 includes an amplifying circuit 208 and an A/D converter 210.

The amplifying circuit 208 amplifies the detected signal Ss from the magnetic force detecting sensor 204.

The A/D converter 210 converts the analog detected signal Ss amplified by the amplifying circuit 208 into a digital signal, and supplies the digital signal as representing positional information of the second movable lens 1458 to the controller 124.

Based on the digital detected signal Ss, the controller 124 detects the position of the second movable lens 1458 in the optical axis direction, and supplies a drive signal depending on the detected position to the lens actuator 126 to control the position of the second movable lens 1458 in the optical axis direction according to a closed loop control process, for example, a servo control process.

Operation and advantages of the present embodiment will be described below.

When the controller 124 supplies a drive signal to the lens actuator 126, the lens moving mechanism 50 moves the lens holder frame 1460 in the optical axis direction. As the lens holder frame 1460 moves, the distance between the position detecting magnet 202 and the magnetic force detecting sensor 204 changes, changing the intensity of a magnetic field applied to the magnetic force detecting sensor 204.

Therefore, the magnetic force detecting sensor 204 outputs a detected signal having a voltage depending on the distance between the position detecting magnet 202 and the magnetic force detecting sensor 204, i.e., the position of the second movable lens 1458 in the optical axis direction, and supplies the detected signal through the amplifying circuit 208 and the A/D converter 210 to the controller 124.

The controller 124 can thus detect the position of the second movable lens 1458.

According to the present embodiment, since the magnetic force detecting sensor 204 generates a detected signal whose magnitude depends on the intensity of a magnetic force generated from the magnetic poles of the position detecting magnet 202, it is not necessary to provide a position detecting magnet over the full moving stroke of the second movable lens 1458, unlike the conventional arrangement. The space occupied by the position detecting magnetic is greatly reduced, allowing the lens position detecting device 200 to be small in size. Consequently, if the lens position detecting device 200 according to the present embodiment is incorporated in the image capturing device 100, then the image capturing device 100 can be small in size.

Inasmuch as the detected signal (detected output) Ss from the magnetic force detecting sensor 204 is uniquely determined depending on the position of the second movable lens 1458, it is not necessary to perform an initializing process by moving the lens holder frame 1460 to the stroke end point and acquiring an output signal from a magnetic detecting device prior to the detection of the lens position, unlike the conventional arrangement. The position of the lens holder frame 1460 can be detected irrespective of where it may be at the same time that the position detecting process is started, allowing the period of time required to detect the lens position to be shortened. Consequently, if the lens position detecting device 200 according to the present embodiment is incorporated in the image capturing device 100, then the startup time of the image capturing device 100 can be shortened.

Embodiment 2

Embodiment 2 will be described below.

Embodiment 2 differs from Embodiment 1 in that the magnitude of the amplification factor of the amplifying circuit 208 is capable of switching between two levels.

Figure 7:
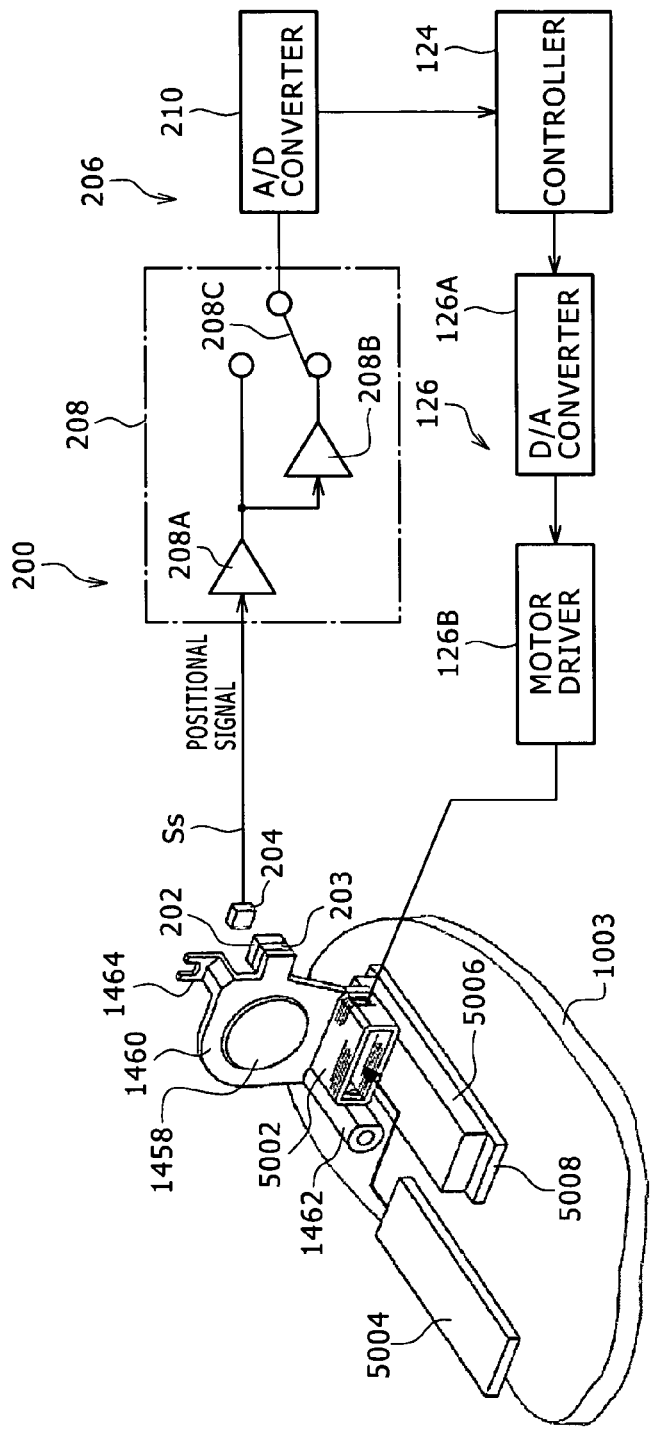
FIG. 7 is a view showing an arrangement of a lens guiding mechanism, a lens moving mechanism, and a lens position detecting device according to Embodiment 2.
Figure 8:
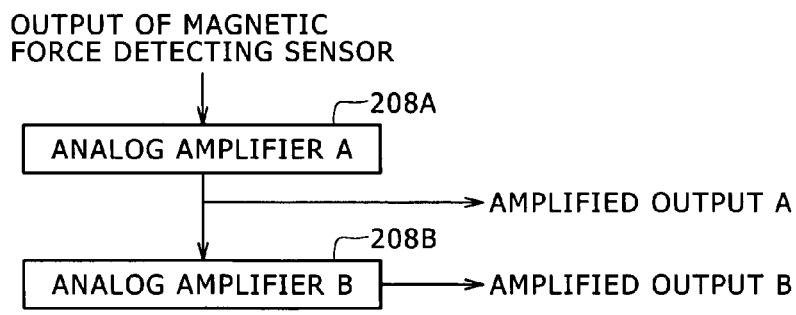
FIG. 8 is a diagram showing an arrangement of an amplifying circuit 208.
Figure 9:
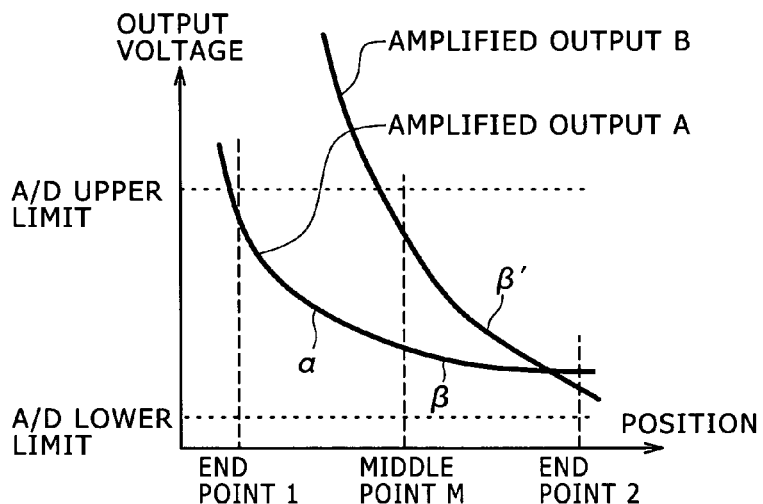
FIG. 9 is a diagram showing the relationship between a lens position and a detected signal according to Embodiment 2.

FIG. 7 is a view showing an arrangement of a lens guiding mechanism, a lens moving mechanism, and a lens position detecting device according to Embodiment 2, FIG. 8 is a diagram showing an arrangement of an amplifying circuit 208, and FIG. 9 is a diagram showing the relationship between a lens position and a detected signal according to Embodiment 2. In each of the embodiments described below, those parts and members which are identical to those of Embodiment 1 are denoted by identical reference characters.

As shown in FIG. 7, according to Embodiment 2, an amplifying circuit 208 includes first and second amplifiers 208A, 208B and a switch 208C.

The first amplifier 208A is supplied with the detected signal Ss from the magnetic force detecting sensor 204, and amplifies the detected signal Ss according to a first amplification factor.

The second amplifier 208B is supplied with an output signal from the first amplifier 208A, and amplifies the output signal according to a second amplification factor.

The switch 208C has a first input terminal connected to the output terminal of the first amplifier 208A, a second input terminal connected to the output terminal of the second amplifier 208B, and a common output terminal for selecting one of the first and second input terminals and connecting the selected input terminal to the input terminal of the A/D converter 210. The switch 208C is controlled for its switching operation by the controller 124.

According to Embodiment 2, as shown in FIG. 8, the detected signal Ss amplified by the first amplifier 208A is output as an output signal A, and the amplification factor thereof is represented by the amplification factor of the first amplifier 208A.

The detected signal Ss amplified by the second amplifier 208B is output as an output signal B, and the amplification factor thereof is represented by the product of the amplification factors of the first and second amplifiers 208A, 208B and is greater than the amplification factor given by the first amplifier 208A only.

As shown in FIG. 9, the output signal A from the first amplifier 208A decreases in level as the second movable lens 1458 moves away from the image capturing unit 18. If it is assumed that the intermediate position taken between the end point 1 and the end point 2 by the second movable lens 1458 is represented by an intermediate point M, the absolute value of the gradient of the output signal A from the end point 1 to the intermediate point M by $\alpha$, and the absolute value of the gradient of the output signal A from the intermediate point M to the end point 2 by $\beta$, then $\alpha > \beta$, as can be seen from FIG. 9.

If the absolute value of the gradient is greater, then the change in the output signal with respect to the distance that the second movable lens 1458 moves is greater. If the absolute value of the gradient is smaller, then the change in the output signal with respect to the distance that the second movable lens 1458 moves is smaller.

Stated otherwise, as the absolute value of the gradient is greater, the resolution of the position of the second movable lens 1458 is greater, allowing the second movable lens 1458 to be positionally detected more accurately.

Therefore, when the absolute value of the gradient is reduced, the detected signal may be amplified to increase the absolute value of the gradient.

Specifically, as shown in FIG. 9, in a range from the end point 1 to the intermediate point M, the absolute value $\alpha$ of the gradient is large enough to provide a sufficient resolution. Therefore, the switch 208C is shifted to the first amplifier 208A side to use the output signal A for positional detection.

In a range from the intermediate point M to the end point 2, the absolute value $\beta$ of the gradient is not large enough to provide a sufficient resolution. Therefore, the switch 208C is shifted to the second amplifier 208B to use the output signal B for positional detection. When the switch 208C is shifted to the second amplifier 208B, the absolute value $\beta'$ of the gradient of the output signal B is greater than the absolute value $\beta$ of the gradient, and is advantageous in performing more accurate positional detection.

According to Embodiment 2, the amplification factor is increased to produce an output signal having an absolute value of gradient which is required to provide a sufficient resolution for detecting the position of the second movable lens 1458. With this arrangement, even if the position detecting magnet 202 and the magnetic force detecting sensor 204 are widely spaced from each other, the position of the second movable lens 1458 can be detected, and hence the moving stroke (movable range) of the second movable lens 1458 can be achieved.

If the amplification factor is simply increased, then the output signal tends to exceed the input level of the A/D converter 210. As shown in FIG. 9, a negative offset is given to the output signal B to keep the output signal B below the input level of the A/D converter 210 (actually, a similar offset is given to the output signal A to keep the output signal A below the input level).

Figure 10:
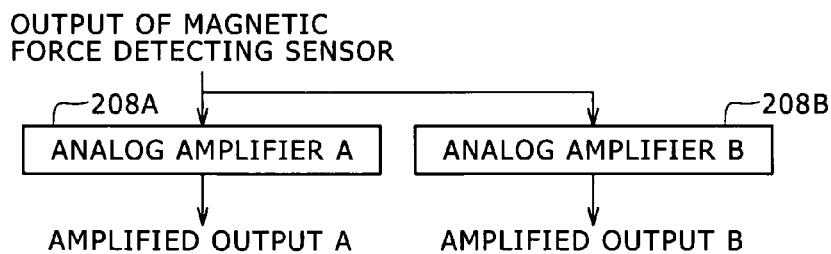
FIG. 10 is a diagram showing another arrangement of the amplifying circuit 208.

According to Embodiment 2, as shown in FIG. 8, the first amplifier 208A is connected to the second amplifier 208B. However, as shown in FIG. 10, the detected signal Ss may be supplied in common to a first amplifier 208A and a second amplifier 208B which have different amplification factors, and output signals from the first amplifier 208A and the second amplifier 208B may be selected one at a time by a switch.

According to Embodiment 2, the amplification factor switches (changes) between two different levels. However, the amplification factor may switch between three or more different levels.

When the detected signal Ss is amplified in according to Embodiment 2, a noise component contained in the detected signal Ss is simultaneously amplified, possibly increasing a variation of the position of the second movable lens 1458 that is finally achieved.

To eliminate the above shortcoming, a noise removing means may be provided for removing noise from the detected signal Ss or removing noise from the output signals A, B.

The noise removing means may include, for example, a noise-removing low-pass filter provided in a front stage or a rear stage of the amplifying circuit 208, or a digital filter such as an IIR filter, an FIR filter, or the like provided in a rear stage of the A/D converter 210.

As with Embodiment 1, Embodiment 2 is advantageous in reducing the size of the lens position detecting device 2 and also in shortening the period of time required to detect the lens position.

Embodiment 3

Embodiment 3 will be described below.

Embodiment 3 differs from Embodiment 1 as to the lens moving mechanism.

Figure 11:
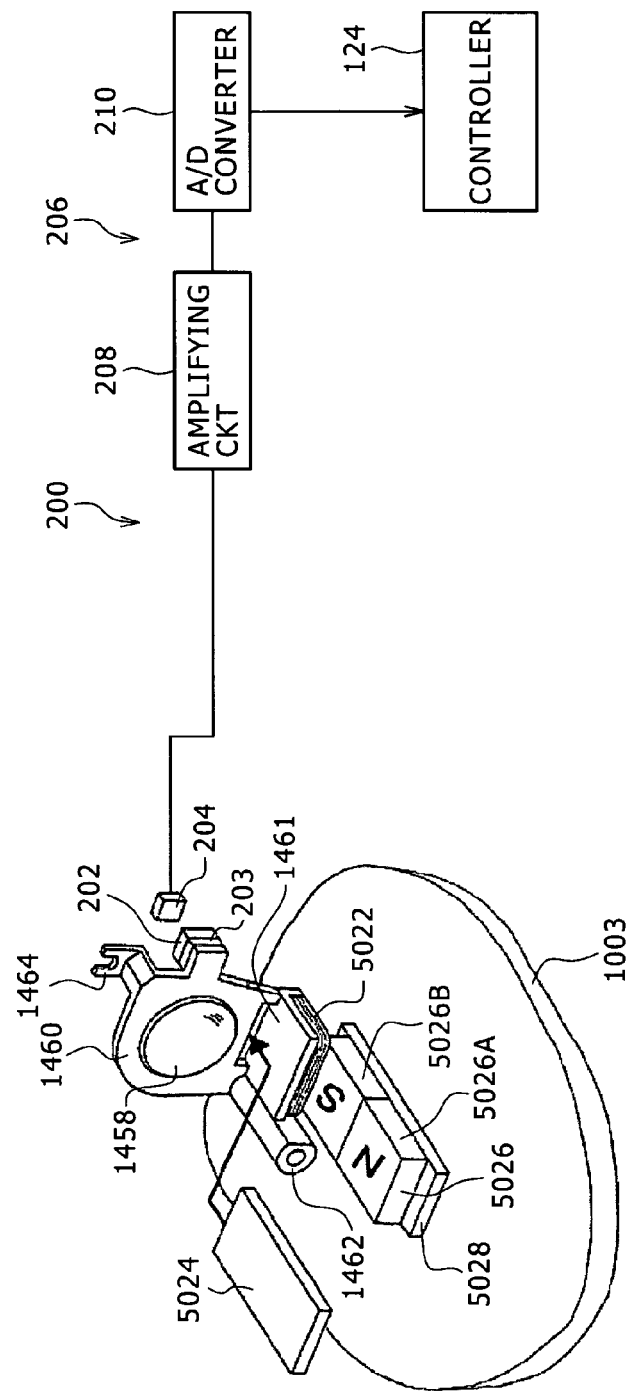
FIG. 11 is a view showing an arrangement of a lens guiding mechanism, a lens moving mechanism, and a lens position detecting device according to Embodiment 3.

FIG. 11 is a view showing an arrangement of a lens guiding mechanism, a lens moving mechanism, and a lens position detecting device according to Embodiment 3.

A lens moving mechanism 50' includes an actuating coil 5022, an opposite yoke 5024, an actuating magnet 5026, and a ground yoke 5028.

The actuating coil 5022 is wound around an axis parallel to the optical axis and fixed by an adhesive or the like to the lower surface of an attachment arm 1461 which projects from a lower portion of the lens holder frame 1460 (forwardly) in an optical axis direction.

The opposite yoke 5024 is inserted in an opening defined in a portion of the lens holder frame 1460 above the attachment arm 1461 and extends parallel to the optical axis.

The actuating magnet 5026 is in the shape of a strip, and is disposed on an outer circumferential surface of the actuating coil 5022 and extends parallel to the opposite yoke 5024. The actuating magnet 5026 has a first region 5026A magnetized to one of N and S poles and a second region 5026B magnetized to the other of N and S poles, the first and second regions 5026A, 5026B being alternately arranged in the direction in which the actuating magnet 5026 extends.

The ground yoke 5028 is in the shape of a rectangular plate which is substantially identical in shape to the actuating magnet 5026, and is joined to a surface of the actuating magnet 5026 remote from the opposite yoke 5024.

The opposite yoke 5024 and the ground yoke 5028 are mounted on the base 1003. The actuating magnet 5026 is mounted on the ground yoke 5028.

The lens moving mechanism 50' is arranged such that when the lens actuator 126 supplies a drive current to the actuating coil 5022, the actuating coil 5022 generates a magnetic field, and the generated magnetic field and the magnetic field of the first and second regions 5026A, 5026B of the actuating magnet 5026 magnetically interact to produce a drive force to move the lens holder frame 1460 forwardly or rearwardly in the optical axis direction.

As with Embodiment 1, Embodiment 3 thus constructed is advantageous in reducing the size of the lens position detecting device 2 and also in shortening the period of time required to detect the lens position.

Embodiment 3 also offers the same advantages as Embodiment 2 by having the same amplifying circuit 208 as that of Embodiment 2.

Embodiment 4

Embodiment 4 will be described below.

Embodiment 4 differs from Embodiment 3 in that it has two magnetic force detecting sensors to increase the accuracy with which to detect the lens position and also to increase the range in which to detect the lens position.

Figure 12:
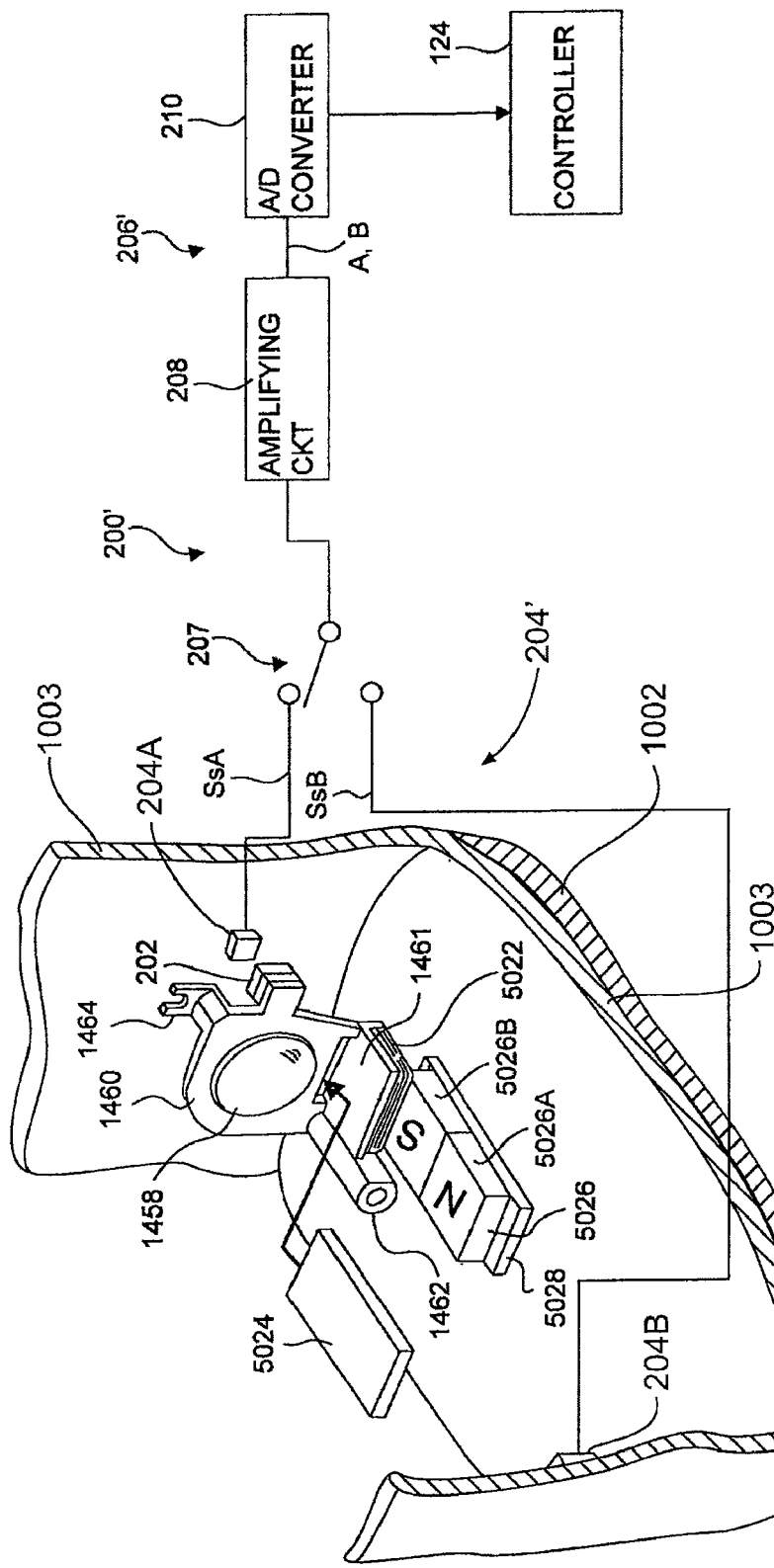
FIG. 12 is a view showing an arrangement of a lens guiding mechanism, a lens moving mechanism, and a lens position detecting device according to Embodiment 4.
Figure 13:
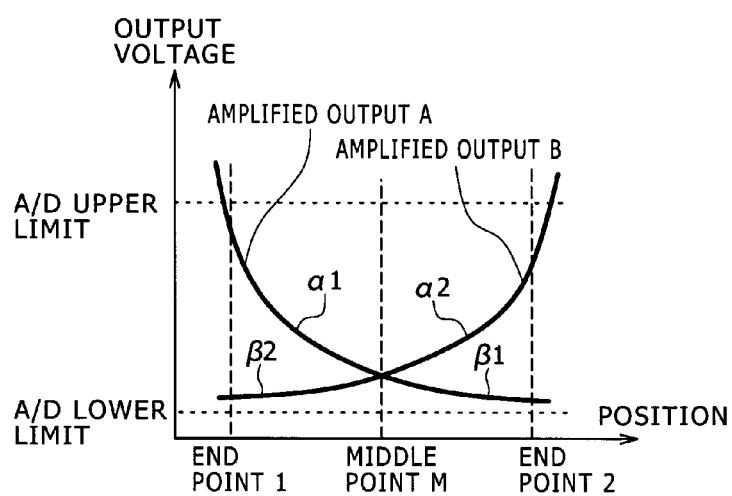
FIG. 13 is a diagram showing the relationship between a lens position and a detected signal according to Embodiment 4.

FIG. 12 is a view showing an arrangement of a lens guiding mechanism, a lens moving mechanism, and a lens position detecting device according to Embodiment 4. FIG. 13 is a diagram showing the relationship between a lens position and a detected signal according to Embodiment 4.

As shown in FIG. 12, a lens position detecting device 200' has a position detecting magnet 202, a magnetic force detecting sensor 204', and a positional information generating means 206'.

As with Embodiment 3, the position detecting magnet 202 is mounted on a rear surface of the lens holder frame 1460 for movement in the optical axis direction in unison with the lens holder frame 1460. The position detecting magnet 202 is mounted on the lens holder frame 1460 such that N and S poles thereof are located in respective positions spaced from each other in the optical axis direction. Stated otherwise, the position detecting magnet 202 is magnetized in the optical axis direction.

In Embodiment 4, the lens position detecting device 200' does not have the ground yoke (back yoke) 203 according to Embodiment 3.

The magnetic force detecting sensor 204' includes first and second magnetic force detecting sensors 204A, 204B.

The first and second magnetic force detecting sensors 204A, 204B generate detected signals (positional signals) having magnitudes depending on the intensity of a magnetic field generated from the magnetic poles of the position detecting magnet 202. The first and second magnetic force detecting sensors 204A, 204B are mounted on the base 1003 such that they confront the position detecting magnet 202 on a straight light parallel to the optical axis that extends through the position detecting magnet 202 and they are positioned in respective two positions forward and rearward of the position detecting magnet 202 in the optical axis direction. According to the present embodiment, the first magnetic force detecting sensor 204A is disposed rearwardly of the position detecting magnet 202 (closer to the image capturing unit 18) and the second magnetic force detecting sensor 204B is disposed forwardly of the position detecting magnet 202 (closer to the subject).

Each of the first and second magnetic force detecting sensors 204A, 204B includes a Hall device (magnetoresistive device) as with the magnetic force detecting sensor 204 according to Embodiments 1 through 3, and has its resistance variable depending on the intensity of a magnetic force applied thereto. The first and second magnetic force detecting sensors 204A, 204B are supplied with a constant electric current from a means, not shown, and are arranged to output respective detected signals SsA, SsB having voltages proportional to the intensity of the magnetic force. According to Embodiment 4, the first and second magnetic force detecting sensors 204A, 204B have the same characteristics, and are arranged such that their detected signals have the same voltage when they detect magnetic forces having the same intensity.

The magnetic force of the position detecting magnet 202 which is detected by the first magnetic force detecting sensor 204A is maximum when the second movable lens 1458 is positioned at the end point 1, and is reduced as the second movable lens 1458 moves from the end point 1 toward the end point 2.

Conversely, the magnetic force of the position detecting magnet 202 which is detected by the second magnetic force detecting sensor 204B is minimum when the second movable lens 1458 is positioned at the end point 1, and is increased as the second movable lens 1458 moves from the end point 1 toward the end point 2.

The positional information generating means 206' includes a switch 207 and an amplifying circuit 208.

The switch 207 is arranged to select one of the detected signals SsA, SsB from the first and second magnetic force detecting sensors 204A, 204B and supply the selected detected signal to the amplifying circuit 208. The switch 207 is controlled for its switching operation by the controller 124.

According to Embodiment 4, as shown in FIG. 13, when the switch 207 selects the detected signal SsA from the first magnetic force detecting sensor 204A, the detected signal SsA is amplified by the amplifying circuit 208 and output therefrom as an output signal A.

When the switch 207 selects the detected signal SsB from the second magnetic force detecting sensor 204B, the detected signal SsB is amplified by the amplifying circuit 208 and output therefrom as an output signal B.

As shown in FIG. 13, it is assumed that the second movable lens 1458 is at an end point 1 when it reaches the rearmost position (a position closest to the image capturing unit 18) and at an end point 2 when it reaches the foremost position (a position remotest from the image capturing unit 18), with a point intermediate between the end point 1 and the end point 2 being represented as an intermediate point A.

The output signal A from the first magnetic force detecting sensor 204A decreases in level as the second movable lens 1458 moves away from the image capturing unit 18. If it is assumed that the absolute value of the gradient of the output signal A from the end point 1 to the intermediate point M by $\alpha 1$, and the absolute value of the gradient of the output signal A from the intermediate point M to the end point 2 by $\beta 1$, then $\alpha 1 > \beta 1$, as can be seen from FIG. 13.

Similarly, the output signal B from the second magnetic force detecting sensor 204B decreases in level as the second movable lens 1458 moves away from the image capturing unit 18. If it is assumed that the absolute value of the gradient of the output signal B from the end point 1 to the intermediate point M by $\alpha 2$, and the absolute value of the gradient of the output signal B from the intermediate point M to the end point 2 by $\beta 2$, then $\alpha 2 > \beta 2$, as can be seen from FIG. 13.

As can be seen from FIG. 13, $\alpha 1 > \beta 2$ in the range from the end point 1 to the intermediate point M, and $\alpha 2 > \beta 1$ in the range from the intermediate point M to the end point 2.

In the range from the end point 1 to the intermediate point M, the switch 207 selects the detected signal SsA from the first magnetic force detecting sensor 204A and supplies the selected detected signal SsA to the amplifying circuit 208 to produce the output signal A where the absolute value of the gradient is represented by a1. In the range from the intermediate point M to the end point 2, the switch 207 selects the detected signal SsB from the second magnetic force detecting sensor 204B and supplies the selected detected signal SsB to the amplifying circuit 208 to produce the output signal B where the absolute value of the gradient is represented by $\alpha 2$.

When the detected signals SsA, SsB from the first and second magnetic force detecting sensors 204A, 204B are selectively supplied from the switch 207 to the amplifying circuit 208, the resolution of the positional detection of the second movable lens 1458 is increased in the range from the end point 1 to the end point 2, i.e., in the full moving stroke (movable range) of the second movable lens 1458, for achieving sufficient accuracy for positional detection.

According to Embodiment 3, since the amplification factor for the detected signal Ss corresponding to the range where the absolute value of the gradient is lower (the range where the absolute value of the gradient is represented by $\beta$) is greater than the amplification factor for the detected signal Ss corresponding to the range where the absolute value of the gradient is higher (the range where the absolute value of the gradient is represented by $\alpha$) in the positional information generating means 206, it is necessary to take a measure, e.g., to provide a filter, in view of the effect that noise has on the detected signal Ss. According to Embodiment 4, however, because the amplification factor does not need to switch between different levels, the effect that noise has on the detected signal Ss is small. Therefore, any measures to be taken in view of noise may be simple, allowing the positional information generating means 206 to be simplified in structure.

With the single magnetic force detecting sensor 204 being provided as with Embodiments 1 through 3, if the position detecting magnet 202 and the single magnetic force detecting sensor 204 are spaced from each other by a certain distance or greater, then the voltage of the detected signal is reduced to almost zero. Even when the detected signal is amplified by the amplifying circuit 208, it fails to produce an output signal whose gradient's absolute value is required to provide a sufficient resolution. Therefore, there is a limitation posed on the moving stroke (movable range) of the second movable lens 1458 for positional detection.

According to Embodiment 4, however, since the two detected signals SsA, SsB are produced respectively by the first and second magnetic force detecting sensors 204A, 204B that are disposed one on each side of the position detecting magnet 202 along the optical axis direction, it is possible to obtain an output signal having a sufficient resolution based on either one of the detected signals SsA, SsB. Therefore, the moving stroke (movable range) of the second movable lens 1458 for positional detection can be made greater than with Embodiments 1 through 3.

As with Embodiment 1, Embodiment 4 thus constructed is advantageous in reducing the size of the lens position detecting device 2 and also in shortening the period of time required to detect the lens position.

According to Embodiments 1 through 4, as shown in FIG. 4, the lens barrel is constructed as having an inner focus lens made up of four lens groups. The present invention is not limited to such a structure, but is applicable to any of lens barrels of variable types, e.g., a lens barrel including a movable component such as a collapsible lens or the like, for detecting the position of the movable component.

According to Embodiments 1 through 3, the position detecting magnet 202 is mounted on the lens holder frame 1460, and the magnetic force detecting sensor 204 is mounted on the base 1003. However, the magnetic force detecting sensor 204 may be mounted on the lens holder frame 1460, and the position detecting magnet 202 may be mounted on the base 1003.

According to Embodiments 1 through 4, the present invention is applied to the image capturing device. However, the present invention is not limited to the image capturing device, but is applicable to a structure for detecting the position of the objective lens of an optical pickup for use in an optical disc apparatus for recording information on and/or reproducing information from an optical disc, for example.

The present invention is not limited to the detection of a lens position, but may be applied to a structure for detecting the position of a movable component in any of various machine tools and measuring devices.

Embodiment 5

Embodiment 5 of the present invention will be described below with reference to the drawings.

Figure 14:
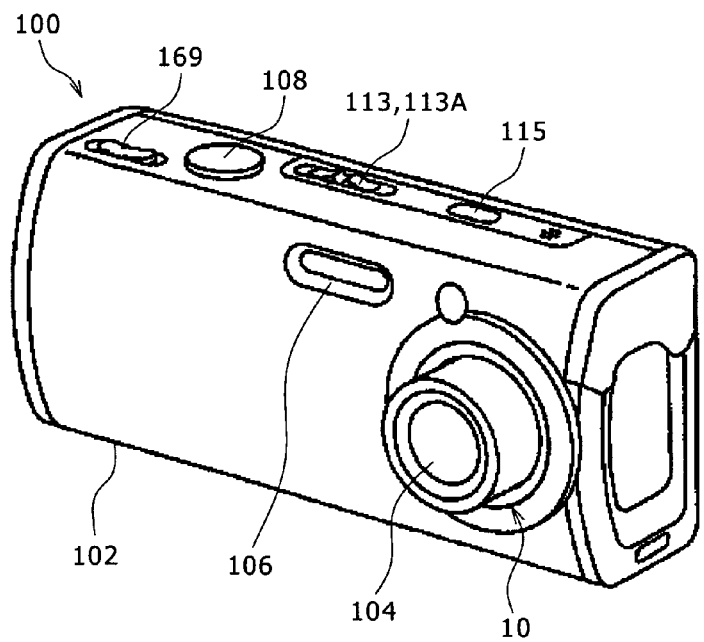
FIG. 14 is a perspective view of an image capturing device according to Embodiment 5, as viewed from front.
Figure 15:
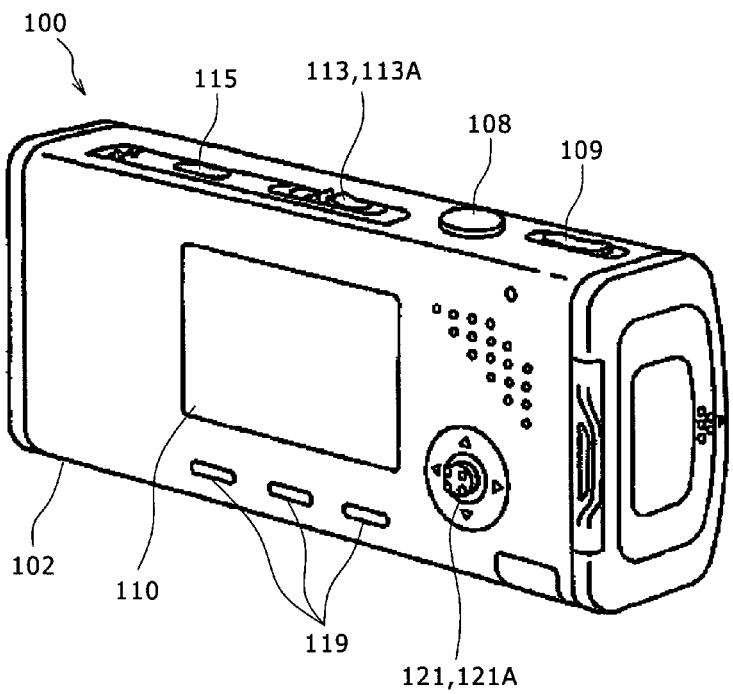
FIG. 15 is a perspective view of the image capturing device according to Embodiment 5, as viewed from behind.
Figure 16:
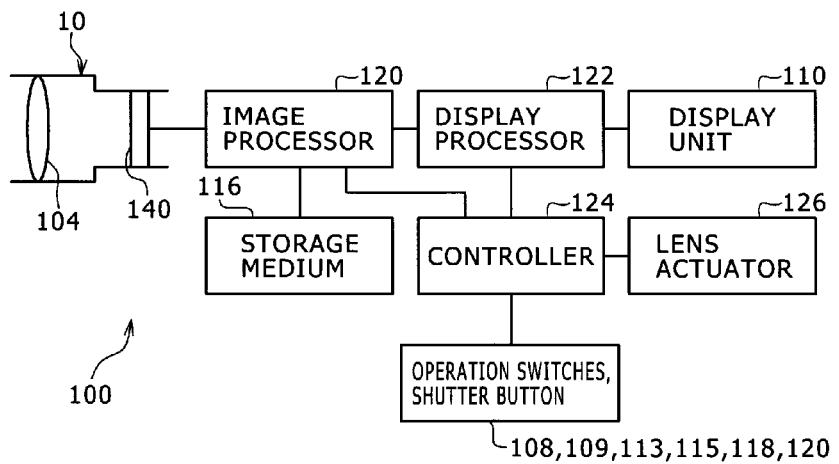
FIG. 16 is a block diagram of an arrangement of the image capturing device according to Embodiment 5.

FIG. 14 is a perspective view of an image capturing device according to Embodiment 5, as viewed from front, FIG. 15 is a perspective view of the image capturing device according to Embodiment 5, as viewed from behind, and FIG. 16 is a block diagram of an arrangement of the image capturing device according to Embodiment 5.

As shown in FIG. 1, an image capturing device 100 includes a digital still camera and has a case 102 serving as an outer housing. In the present specification, left and right are referred to with respect to the image capturing device 100 when it is viewed from front, and a subject side in the optical axis direction of an optical system is referred to as front and an image capturing device side as rear.

The image capturing device 100 has a collapsible lens barrel 10 disposed on a front surface of the case 102 near a right edge thereof and holding an image capturing optical system 104 therein. A flash unit 106 for emitting flash light is disposed on the front surface of the case 102 near an upper edge thereof.

The lens barrel 10 is movable by an actuator 126 (FIG. 16) between an operational position (a wide-angle state, a telephoto state, or an intermediate state between the wide-angle state and the telephoto state) projecting from the front surface of the case 102, and a retracted position (a collapsed state) within the front surface of the case 102.

On an upper end face of the case 102, there are disposed a shutter button 108 for capturing an image, a zoom switch 109 for adjusting zooming movement of the image capturing optical system 104, a mode selector switch 113 for changing modes such as a playback mode, and a power supply switch 115 for turning on and off the power supply of the image capturing device 100. On a rear surface of the case 102, there are disposed a display unit 110 for displaying captured images, a plurality of operation switches 119 for performing various modes of operation including an image capturing mode, a recording mode, an image displaying mode, etc., and a control switch 121 for performing various control actions including the selection of a menu to be displayed on the display unit 110.

According to the present embodiment, the mode selector switch 113 includes a so-called slide switch and has an operating member 113A projecting from the upper end face of the case 102. The mode selector switch 113 can select a mode when the user slides the operating member 113A to the left or the right with a finger.

The control switch 121 has an operating member 121A projecting rearwardly from the rear surface of the case 102. The operating member 121A can be tilted in four directions, i.e., upward and downward directions and leftward and rightward directions, when its tip end face is moved by a finger, and can be pressed transversely of the case 102 when its tip end face is pushed by a finger.

Specifically, when the operating member 121A is moved in the upward and downward directions and the leftward and rightward directions, the control switch 121 moves the position of a cursor displayed on the display unit 110 in the upward and downward directions and the leftward and rightward directions, or changes (increments or decrements) numerical values displayed on the display unit 110. When the operating member 121A is pushed, the control switch 121 determines one of a plurality of selective items (menu) displayed on the display unit 110 or enters a numerical value displayed in an input window.

As shown in FIG. 16, the lens barrel 10 houses in its rear portion an image capturing unit 140 such as a CCD, a CMOS sensor, or the like for capturing a subject image that is focused by the image capturing optical system 104. The image capturing device 100 has an image processor 120 for generating image data based on an image signal output from the image capturing unit 140 and recording the generated image data in a storage medium 116 such as a memory card or the like, a display processor 122 for displaying the image data on the display unit 110, the actuator 126, and a controller 148. The controller 148 controls the image processor 120, the display processor 122, and the actuator 126 depending on the operation of the shutter button 108, the zoom switch 109, the mode selector switch 113, the power supply switch 115, the operation switches 119, and the control switch 121. The controller 148 has a CPU that operates according to a control program.

A general structure of the lens barrel 10 will be described below.

Figure 17A:
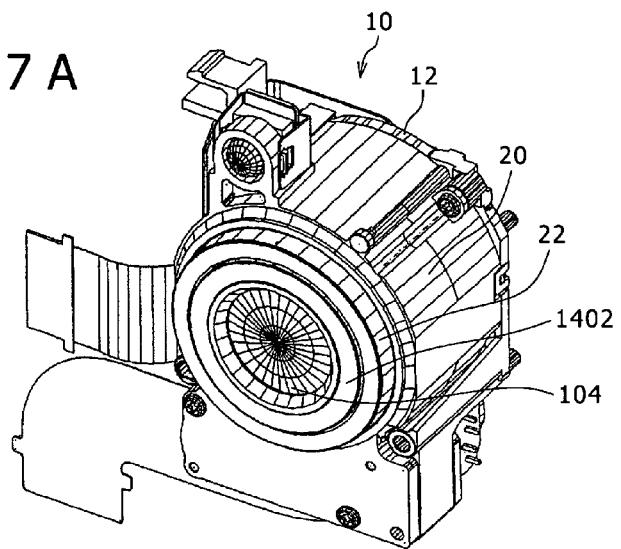
FIG. 17A is a perspective view of a lens barrel 10, showing a lens stored state when not in use, i.e., a lens collapsed state.
Figure 17B:
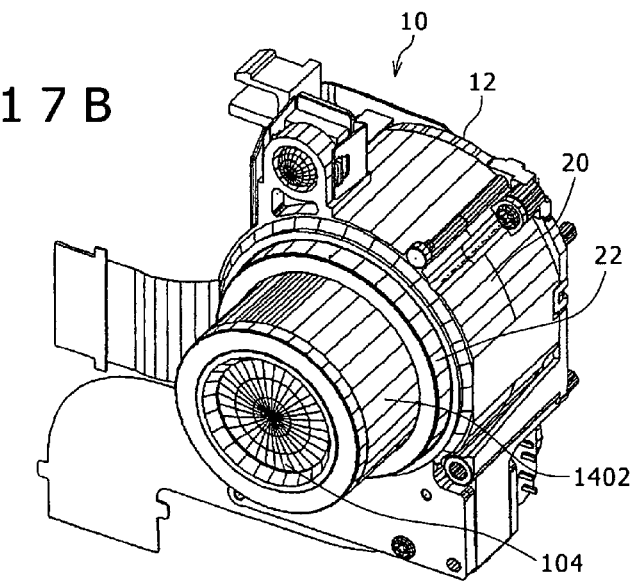
FIG. 17B is a perspective view of the lens barrel 10, showing a lens protruded state when in use (a wide-angle state or a telephoto state).

FIGS. 17A and 17B are perspective views illustrative of states of the lens barrel 10. FIG. 17A shows a lens stored state when not in use, i.e., a lens collapsed state, and FIG. 17B shows a lens protruded state when in use (a wide-angle state or a telephoto state).

Figure 18:
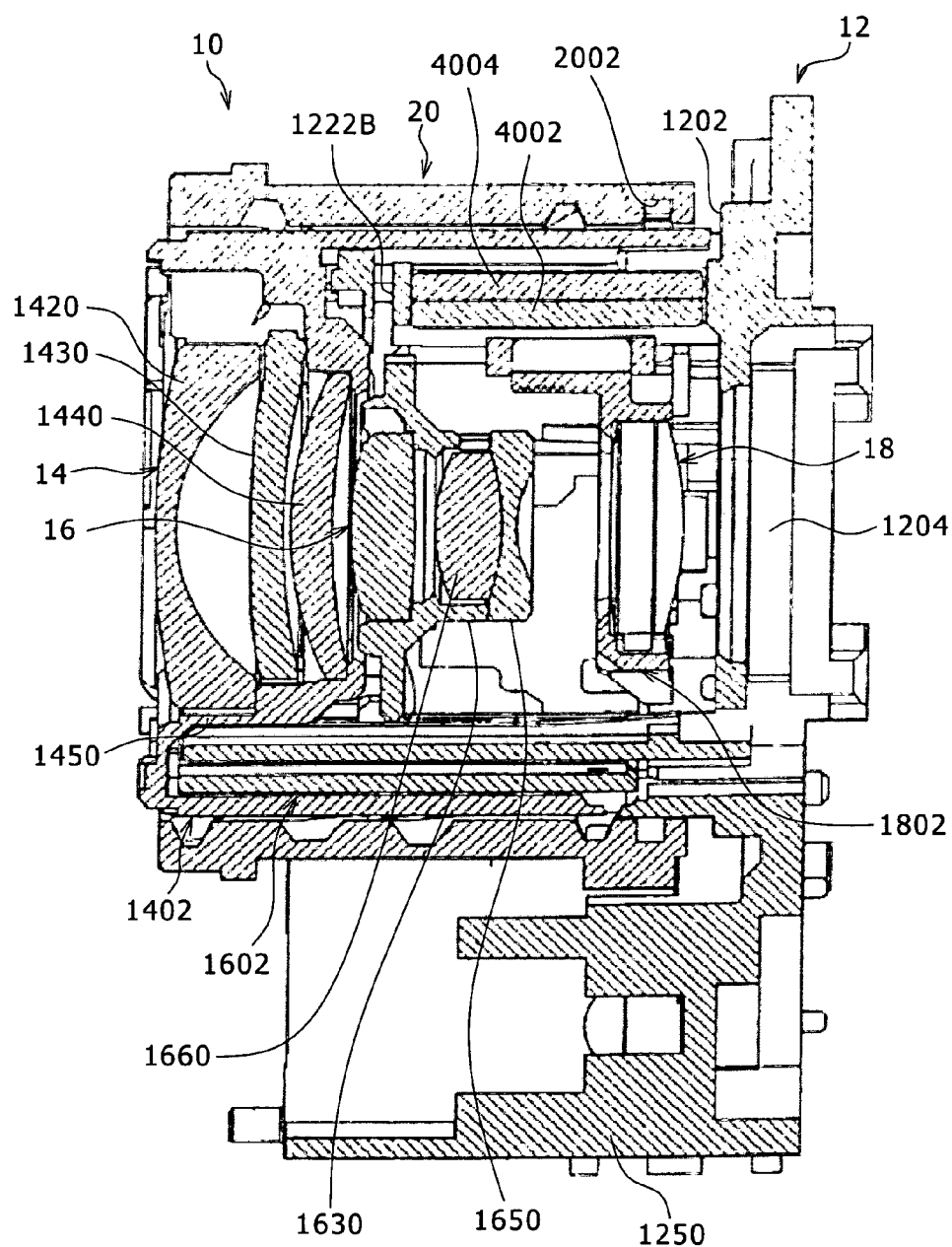
FIG. 18 is a cross-sectional view of the lens barrel 10 in the lens collapsed state.
Figure 19:
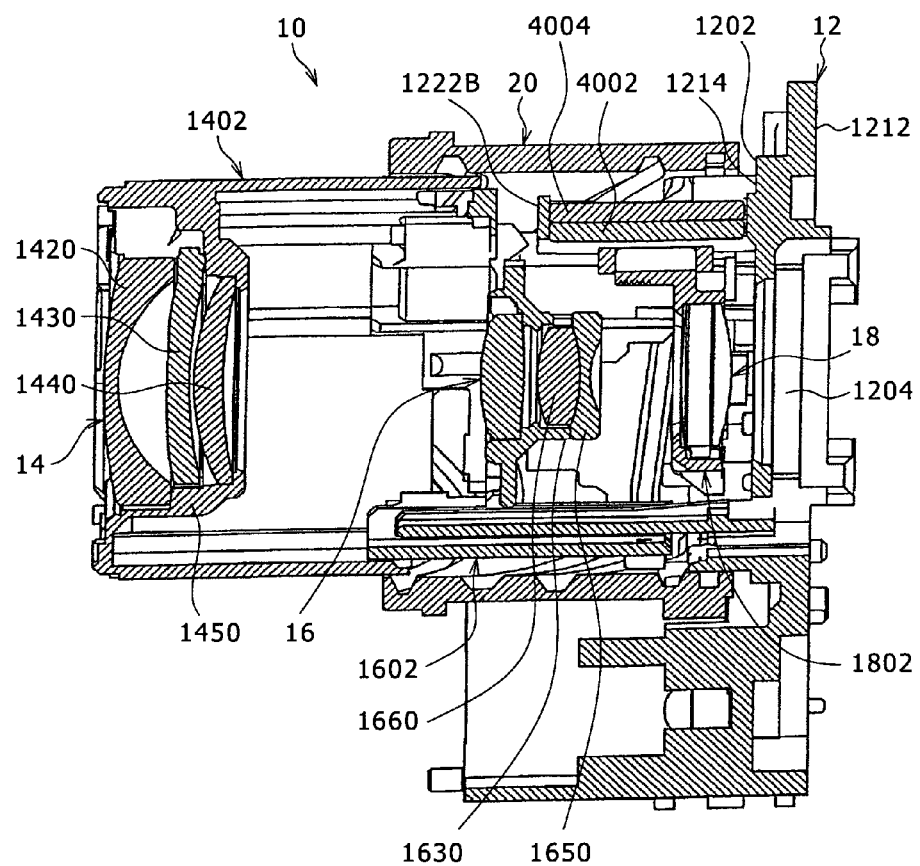
FIG. 19 is a cross-sectional view of the lens barrel 10 in the wide-angle state.
Figure 20:
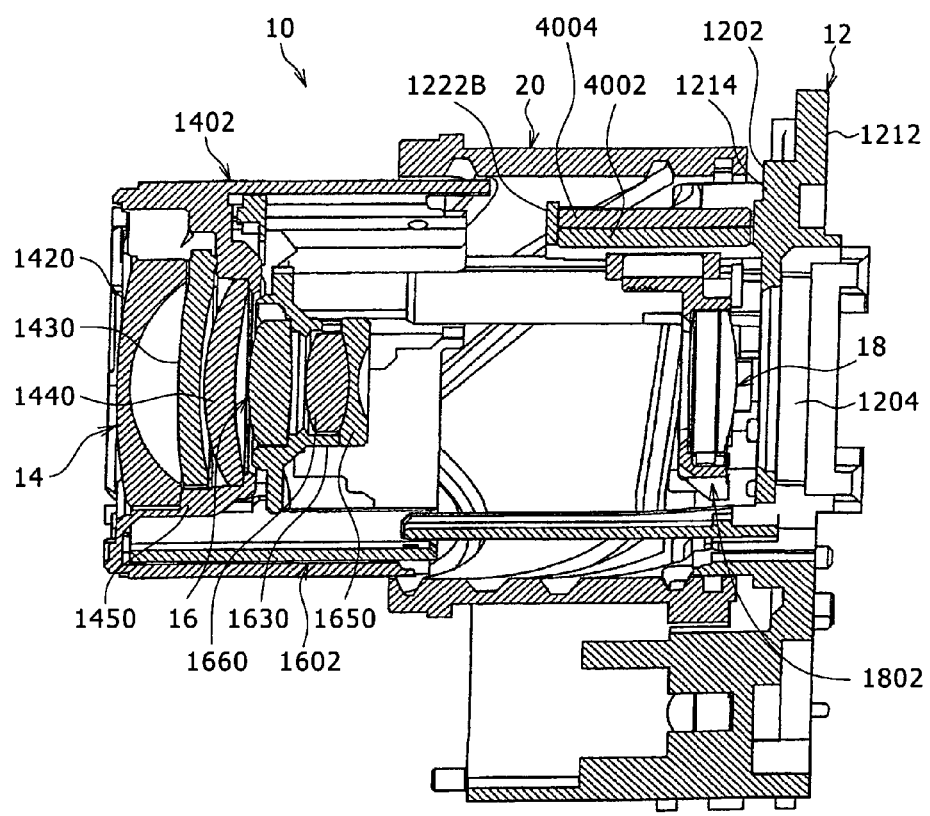
FIG. 20 is a cross-sectional view of the lens barrel 10 in the telephoto state.

FIG. 18 is a cross-sectional view of the lens barrel 10 in the lens collapsed state, FIG. 19 is a cross-sectional view of the lens barrel 10 in the wide-angle state, and FIG. 20 is a cross-sectional view of the lens barrel 10 in the telephoto state.

Figure 21:
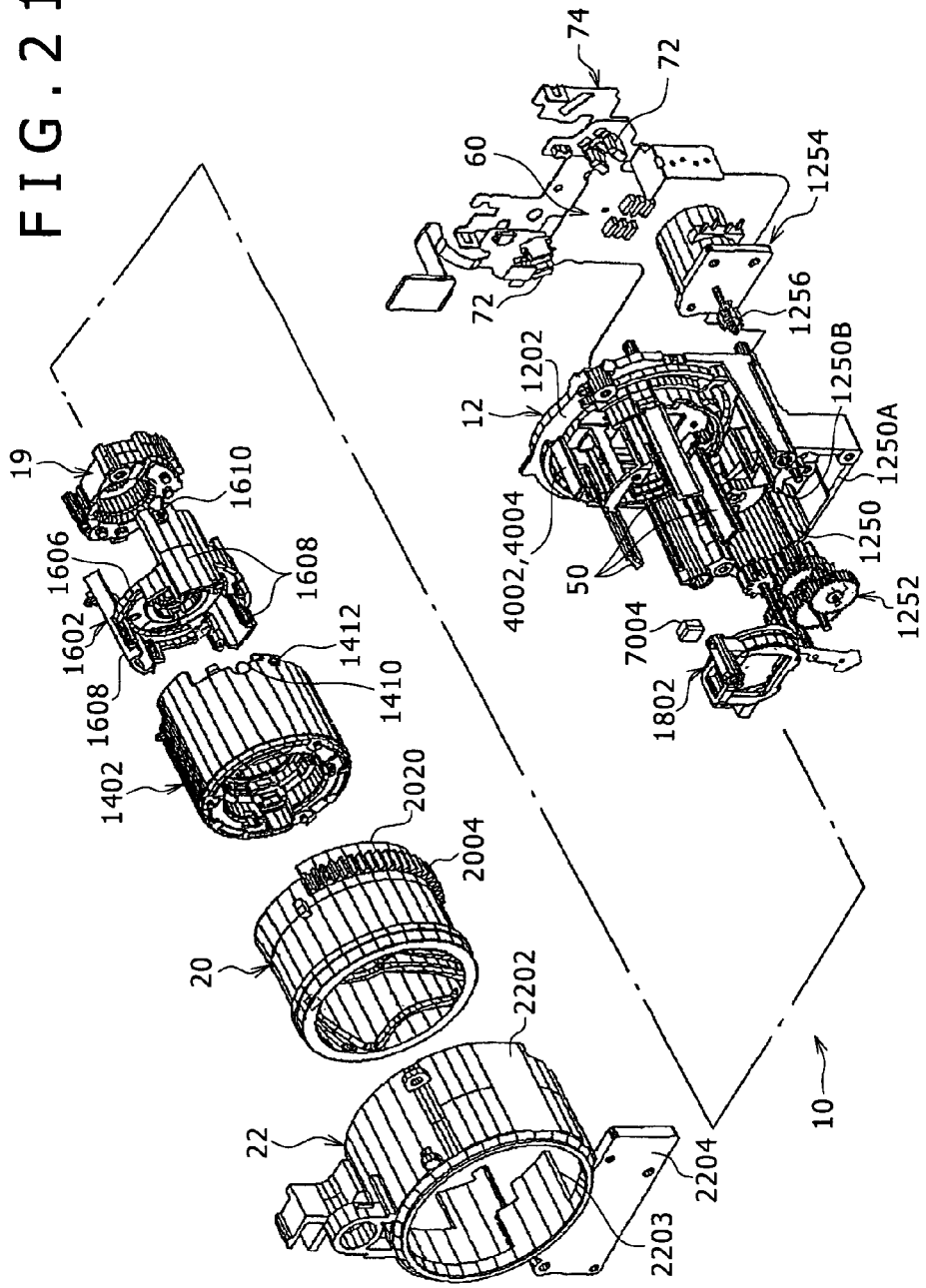
FIG. 21 is an exploded perspective view of the lens barrel 10, as viewed from front.
Figure 22:
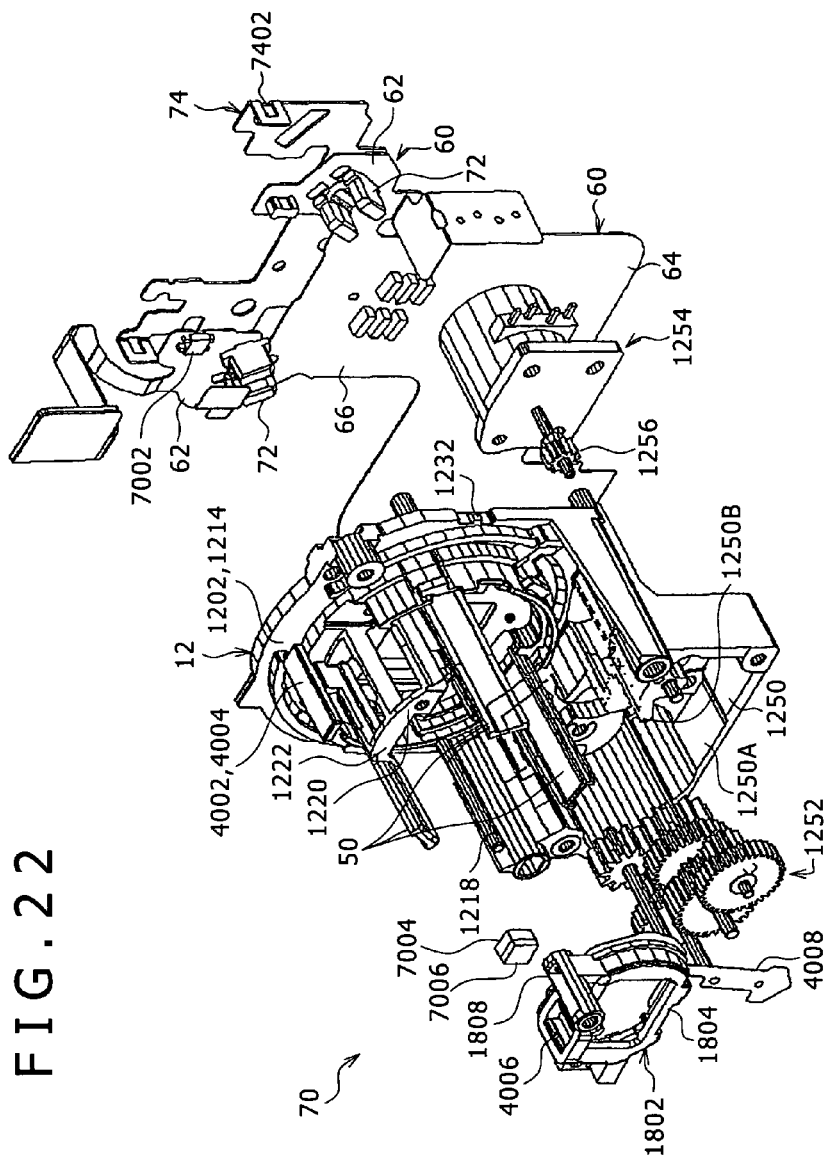
FIG. 22 is an exploded perspective view of a third lens holder frame, a base, and a flexible board shown in FIG. 21.
Figure 23:
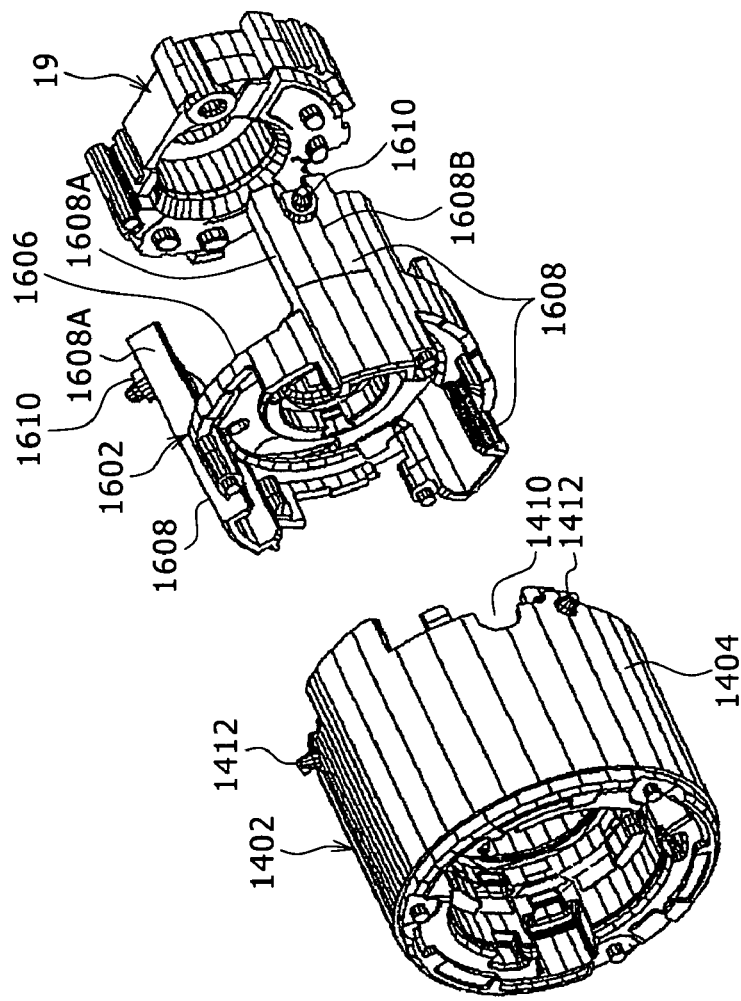
FIG. 23 is an exploded perspective view of a first lens holder frame, a second lens holder frame, and an automatic exposure device shown in FIG. 21.
Figure 24:
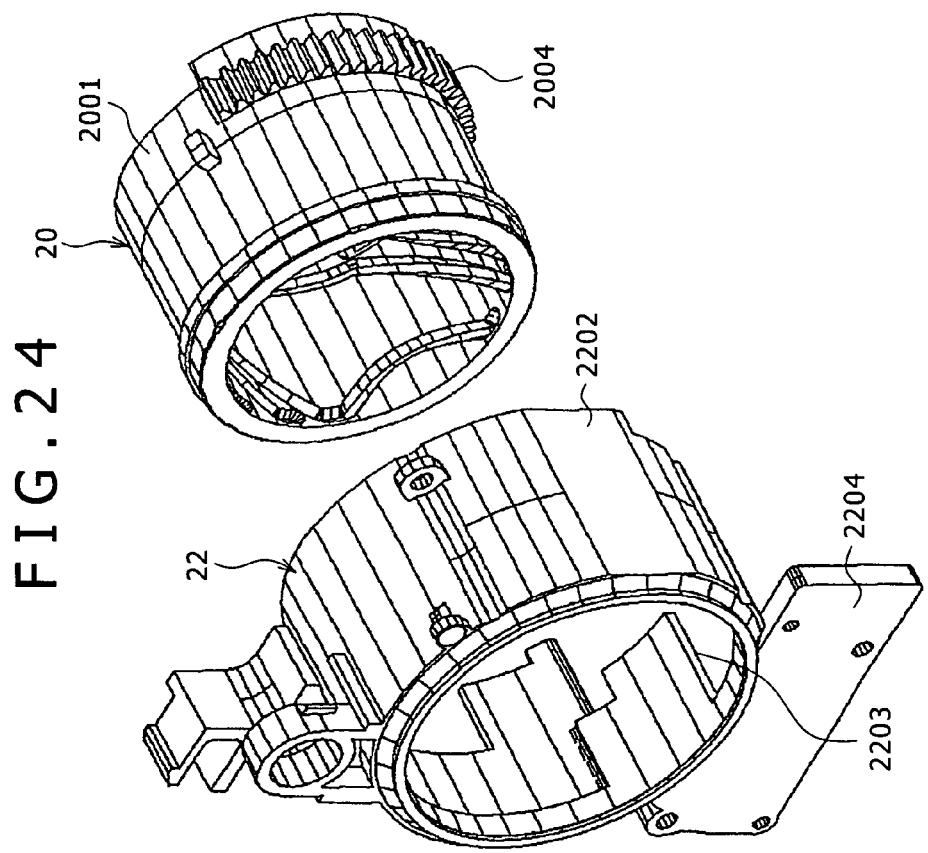
FIG. 24 is an exploded perspective view of a fixed ring and a cam ring shown in FIG. 21.

FIG. 21 is an exploded perspective view of the lens barrel 10, as viewed from front, FIG. 22 is an exploded perspective view of a third lens holder frame, a base, and a flexible board shown in FIG. 21, FIG. 23 is an exploded perspective view of a first lens holder frame, a second lens holder frame, and an automatic exposure device shown in FIG. 21, and FIG. 24 is an exploded perspective view of a fixed ring and a cam ring shown in FIG. 21.

Figure 25:
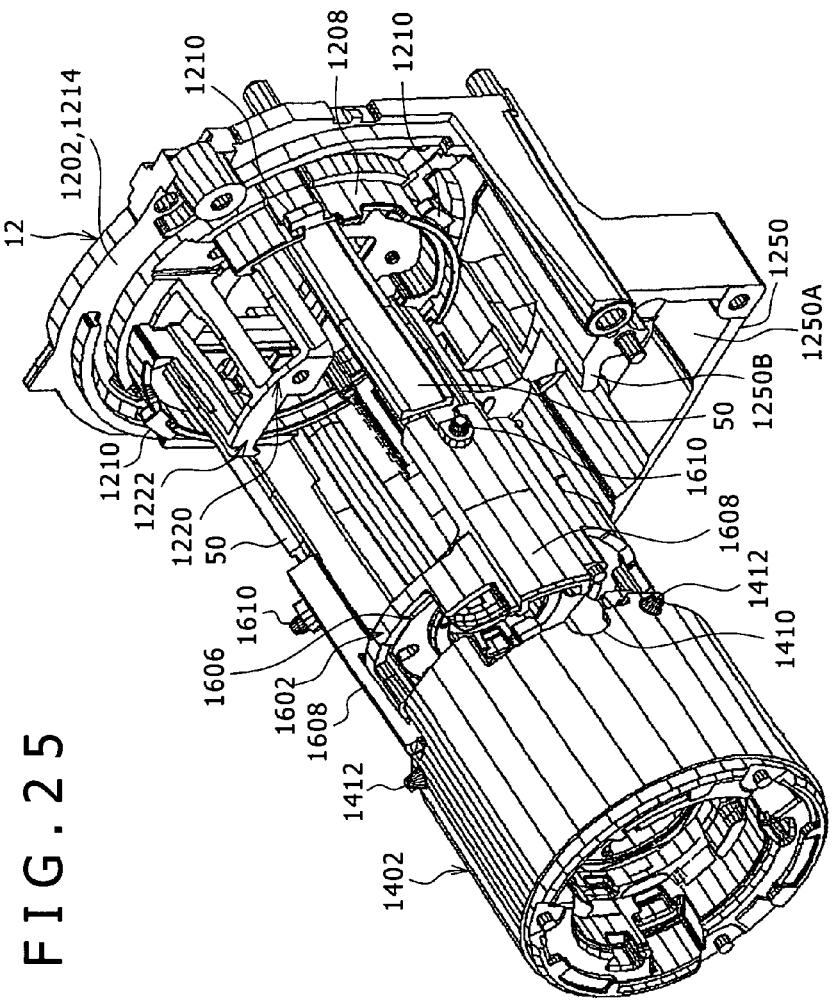
FIG. 25 is an exploded perspective view of the first lens holder frame, the second lens holder frame, and the base.
Figure 26:
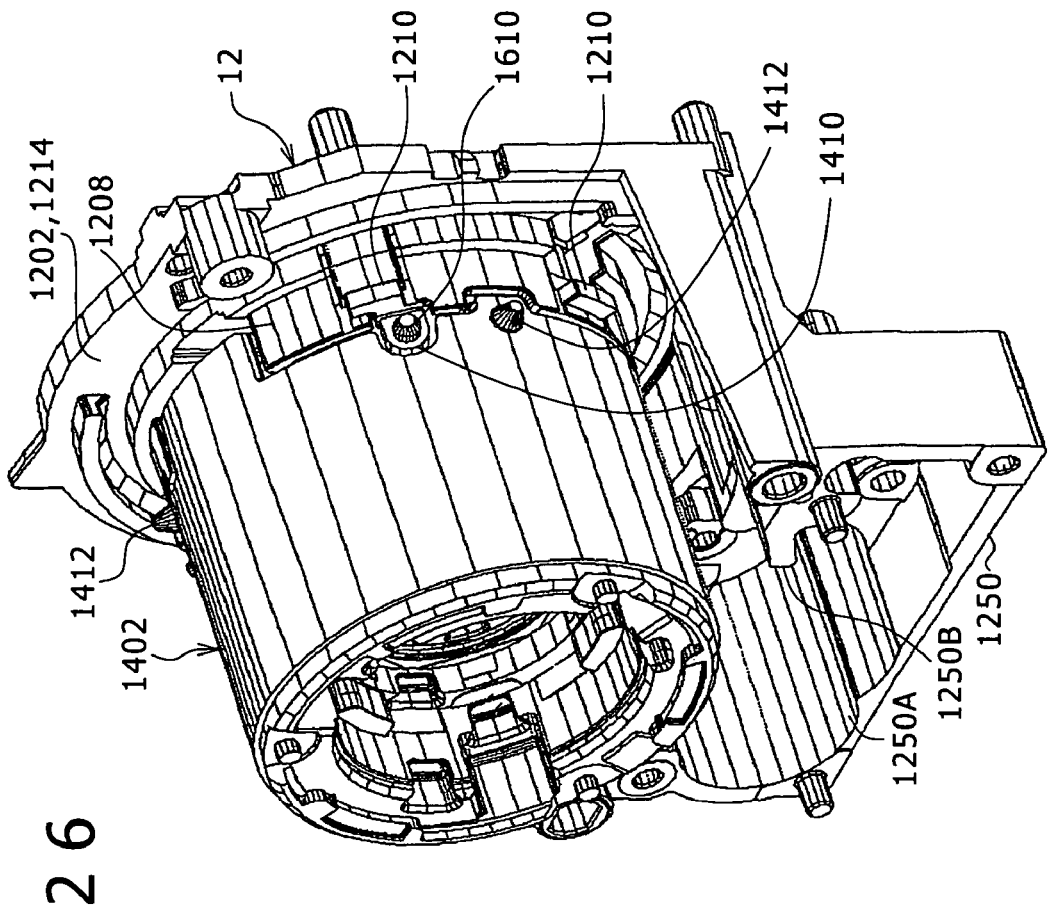
FIG. 26 is a view of an assembly of the parts shown in FIG. 25.
Figure 27:
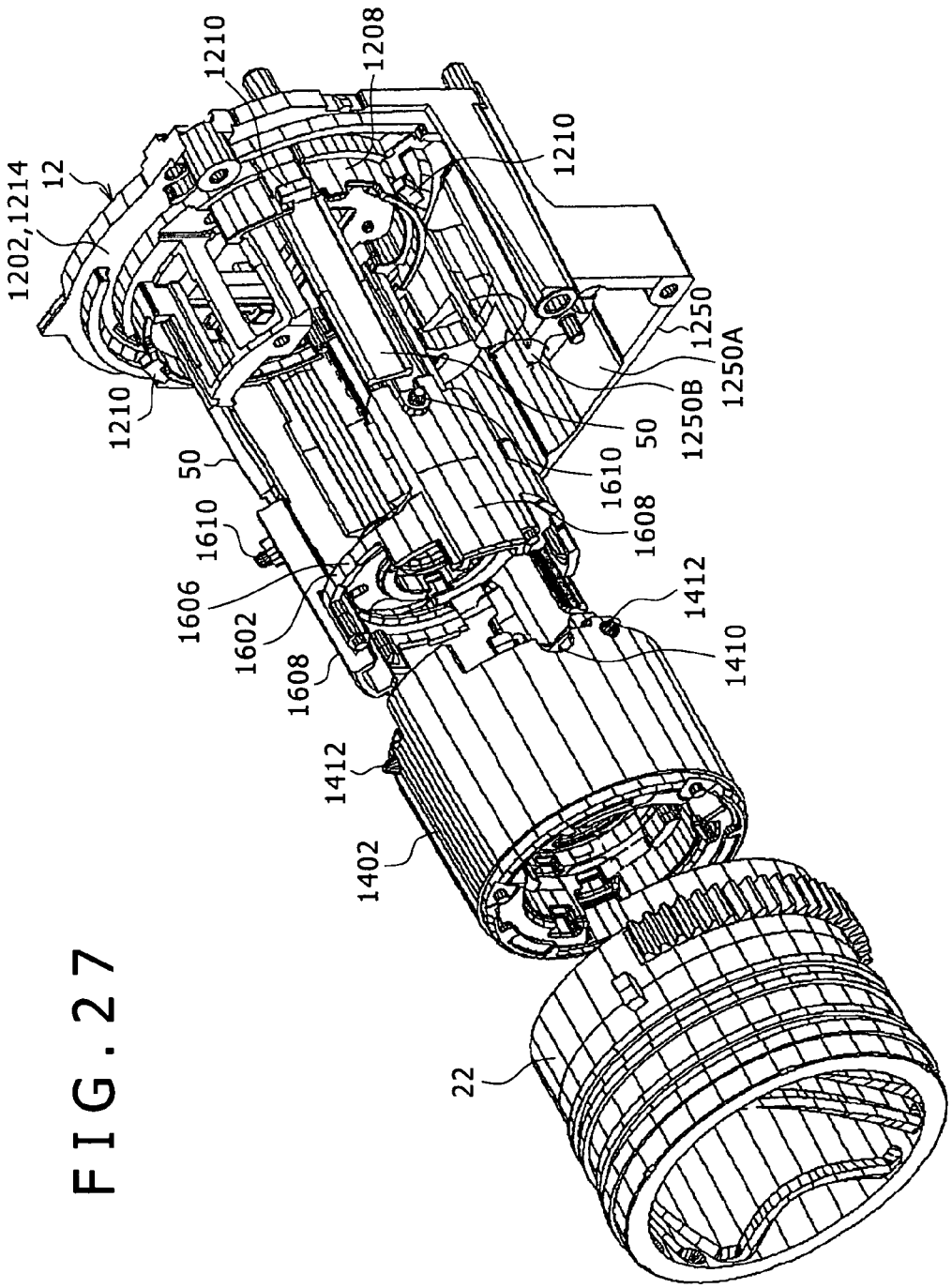
FIG. 27 is an exploded perspective view of the cam ring, the first lens holder frame, the second lens holder frame, and the base.
Figure 28:
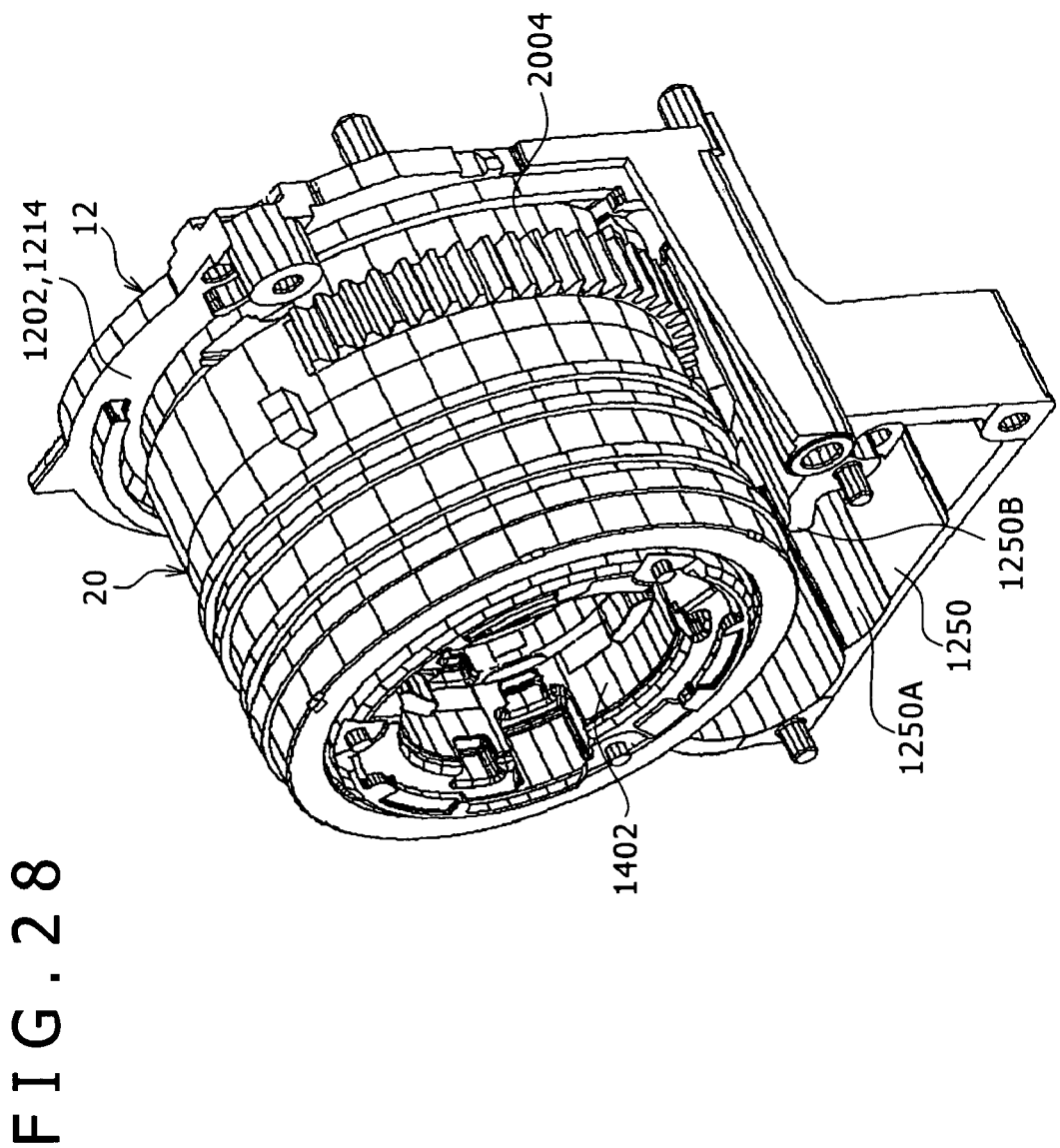
FIG. 28 is a view of an assembly of the parts shown in FIG. 27.

FIG. 25 is an exploded perspective view of the first lens holder frame, the second lens holder frame, and the base, FIG. 26 is a view of an assembly of the parts shown in FIG. 25, FIG. 27 is an exploded perspective view of the cam ring, the first lens holder frame, the second lens holder frame, and the base, and FIG. 28 is a view of an assembly of the parts shown in FIG. 27.

Figure 29:
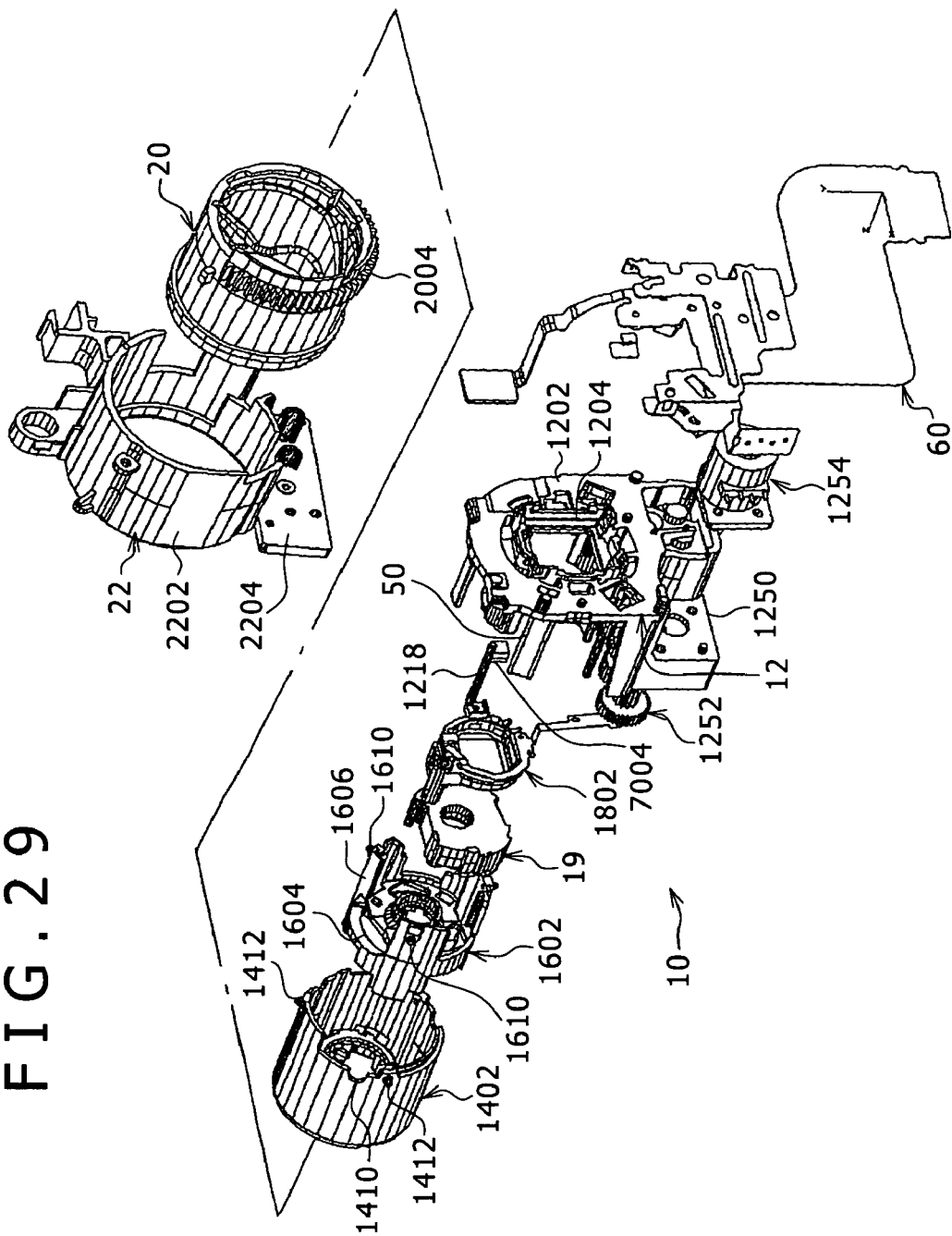
FIG. 29 is an exploded perspective view of the lens barrel 10, as viewed from behind.
Figure 30:
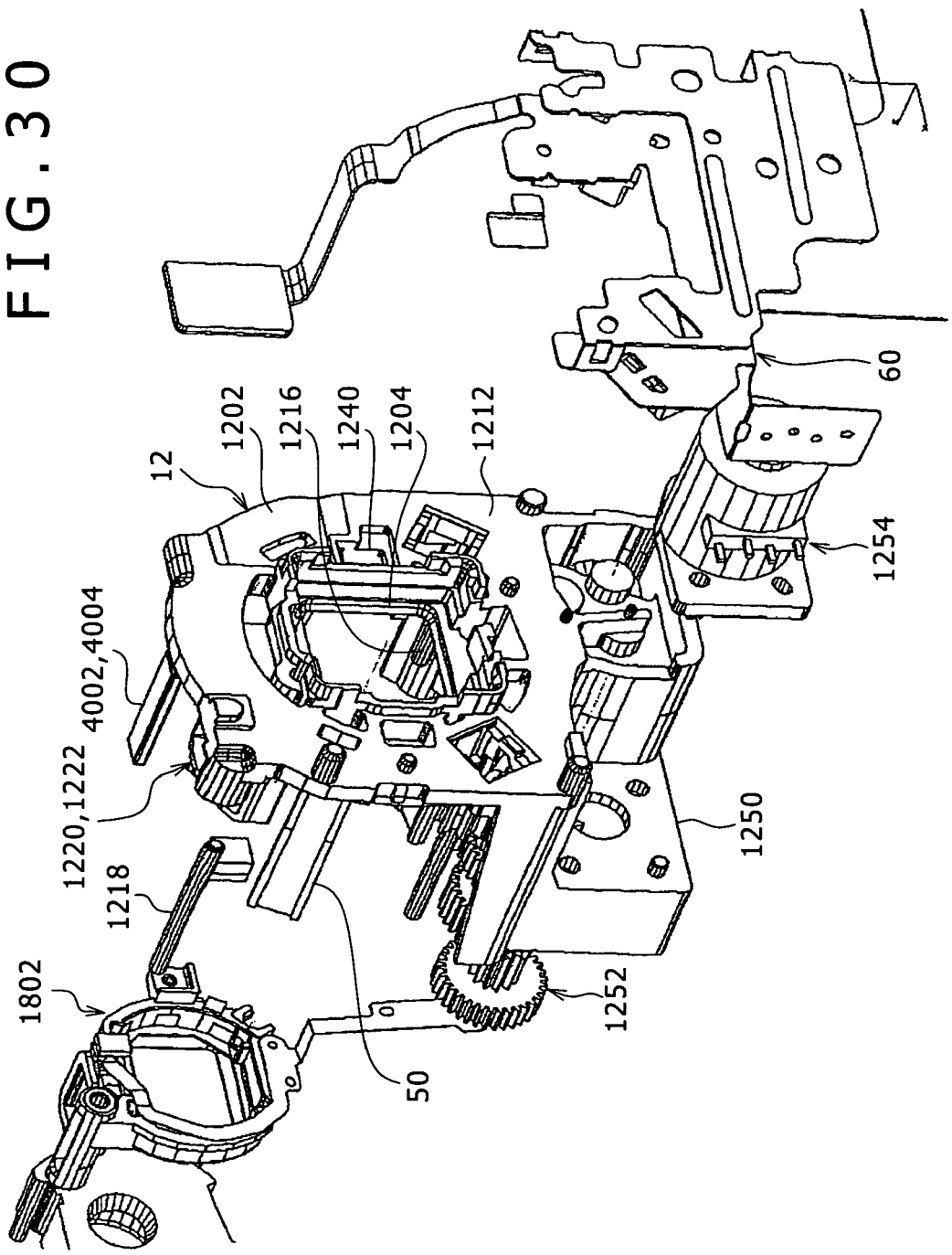
FIG. 30 is an exploded perspective view of the third lens holder frame, the base, and the flexible board shown in FIG. 29.
Figure 31:
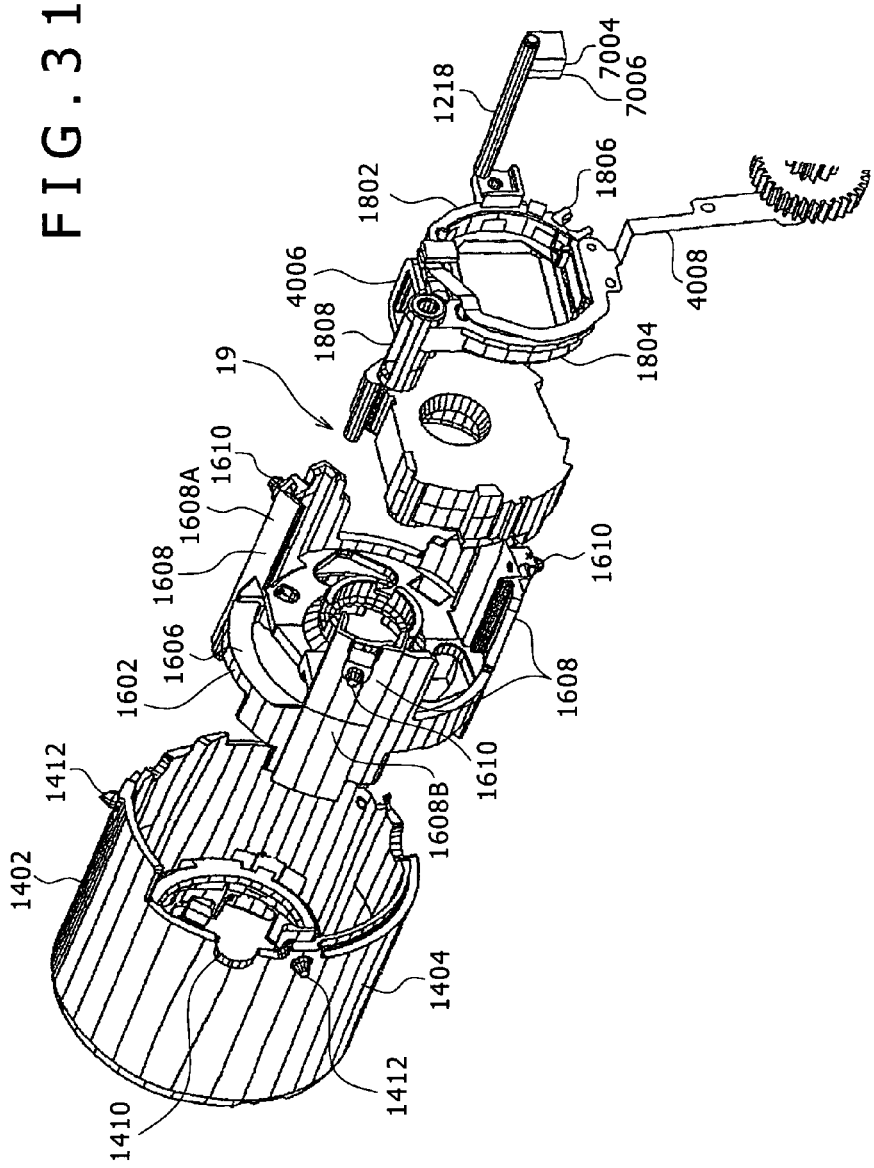
FIG. 31 is an exploded perspective view of the first lens holder frame, the second lens holder frame, the automatic exposure device, and the third lens holder frame shown in FIG. 29.
Figure 32:
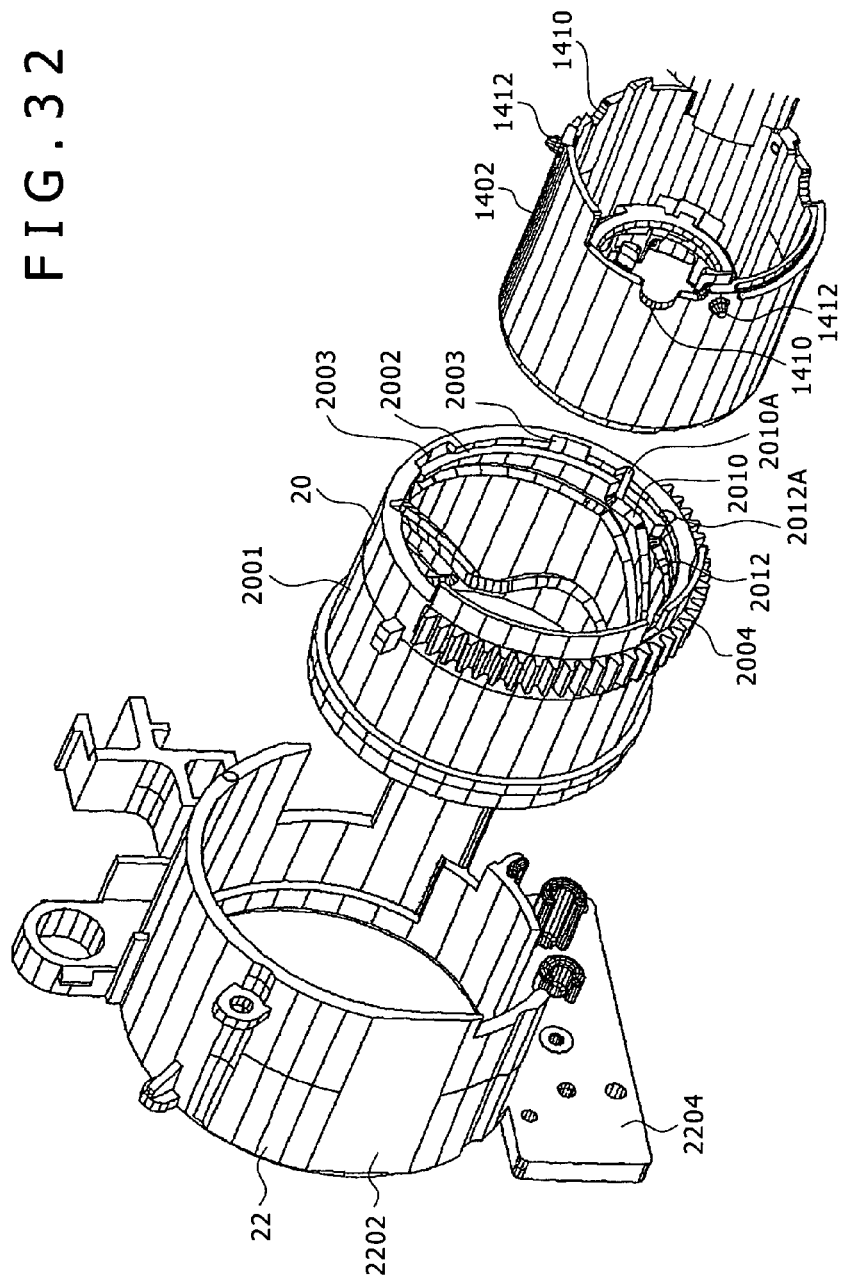
FIG. 32 is an exploded perspective view of the fixed ring, the cam ring, and the first lens holder frame shown in FIG. 29.

FIG. 29 is an exploded perspective view of the lens barrel 10, as viewed from behind, FIG. 30 is an exploded perspective view of the third lens holder frame, the base, and the flexible board shown in FIG. 29, FIG. 31 is an exploded perspective view of the first lens holder frame, the second lens holder frame, the automatic exposure device, and the third lens holder frame shown in FIG. 29, and FIG. 32 is an exploded perspective view of the fixed ring, the cam ring, and the first lens holder frame shown in FIG. 29.

Figure 33:
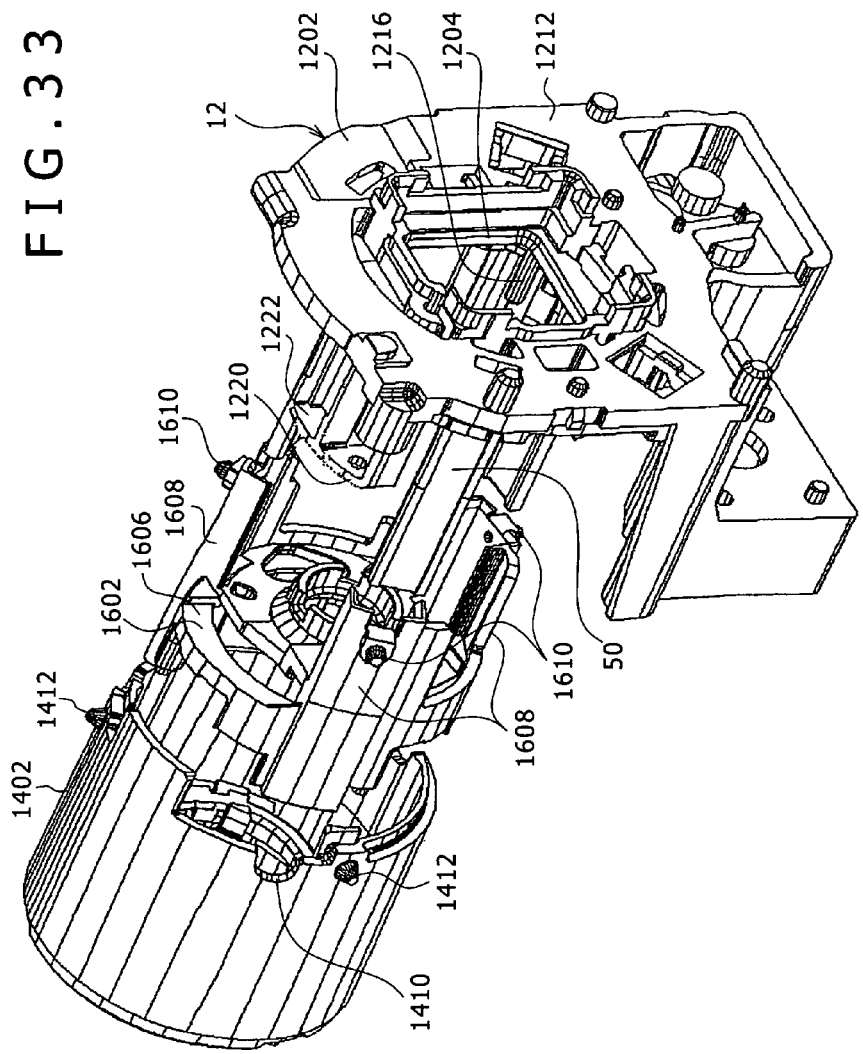
FIG. 33 is an exploded perspective view of the first lens holder frame, the second lens holder frame, and the base.
Figure 34:
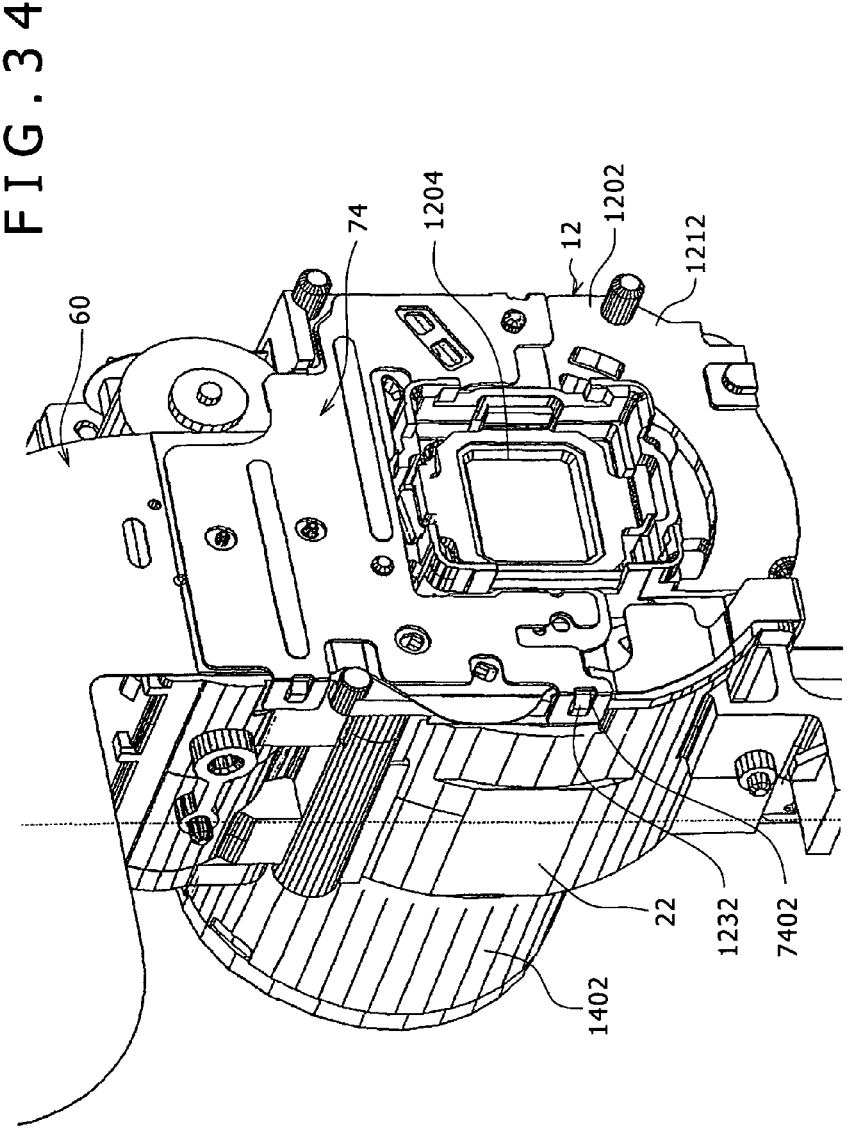
FIG. 34 is a view of an assembly of the fixed ring, the cam ring, the first lens holder frame, the second lens holder frame, the third lens holder frame, and the flexible board.

FIG. 33 is an exploded perspective view of the first lens holder frame, the second lens holder frame, and the base, and FIG. 34 is a view of an assembly of the fixed ring, the cam ring, the first lens holder frame, the second lens holder frame, the third lens holder frame, and the flexible board.

Figure 35:
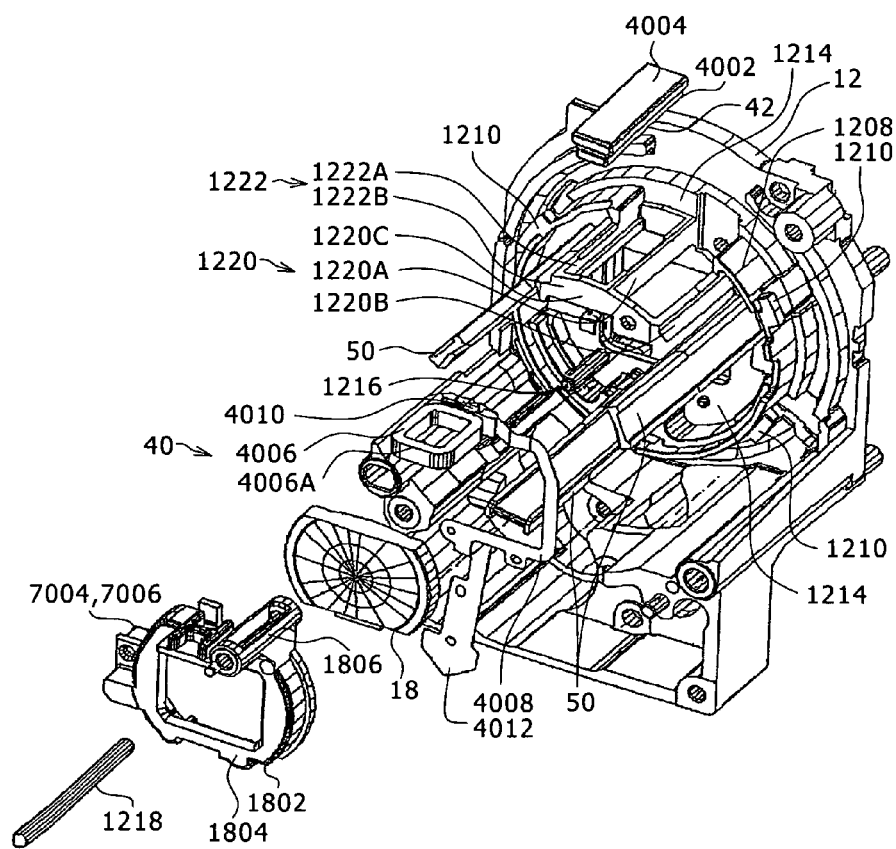
FIG. 35 is an exploded perspective view of the third lens holder frame and the base.
Figure 36:
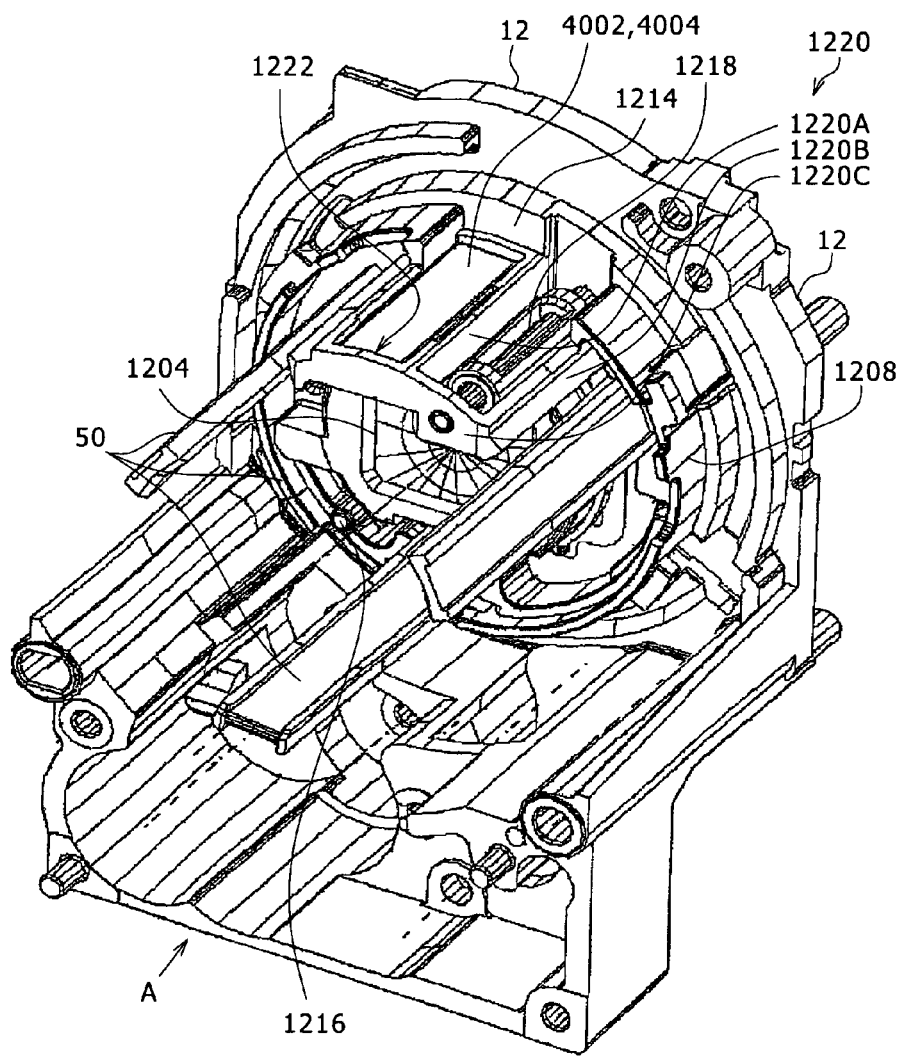
FIG. 36 is a view of an assembly of the parts shown in FIG. 35.
Figure 37:
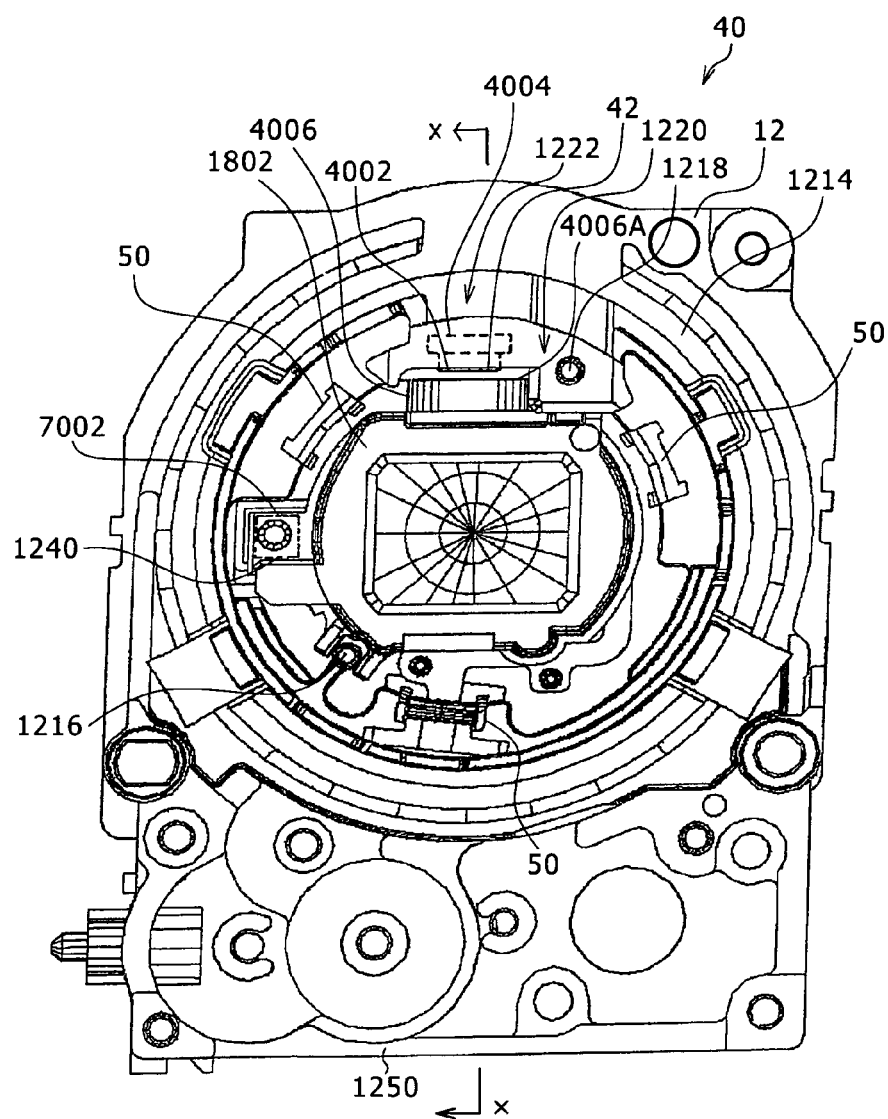
FIG. 37 is a view as viewed in the direction indicated by the arrow A in FIG. 36.
Figure 38:
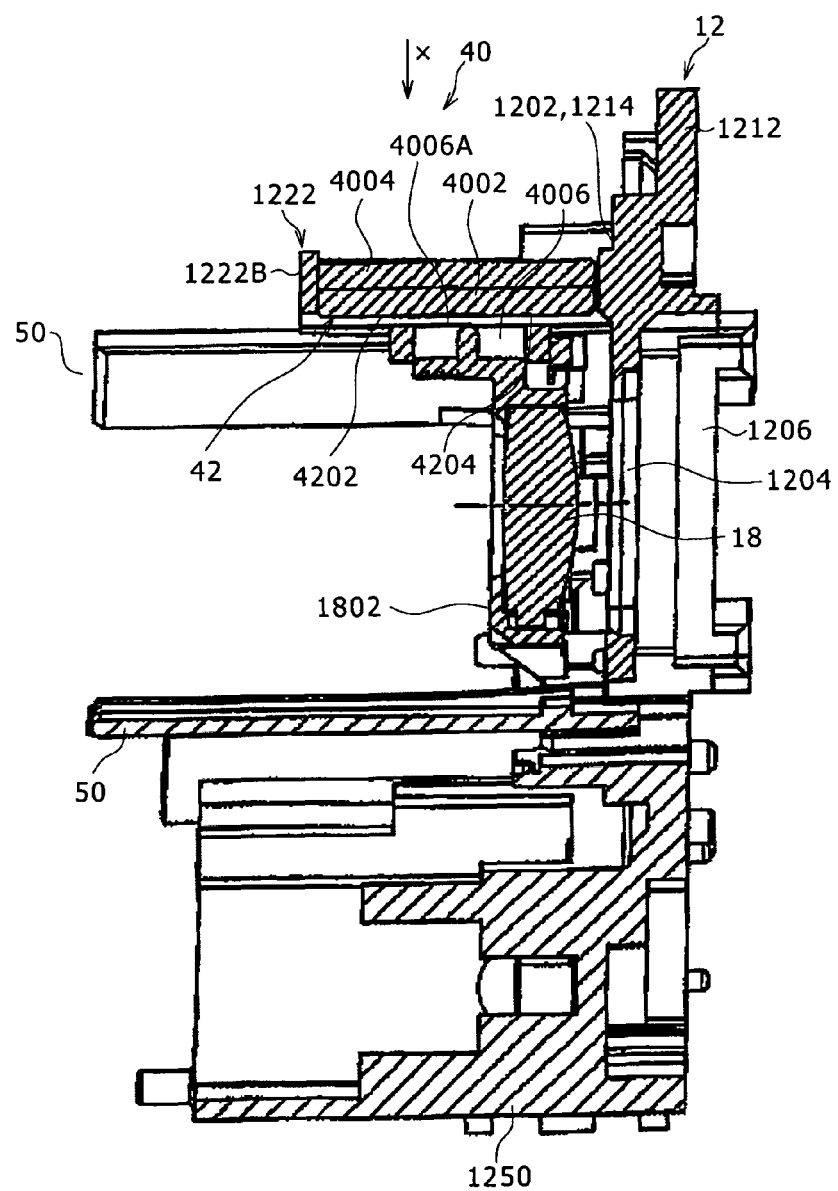
FIG. 38 is a cross-sectional view taken along line X-X of FIG. 37.

FIG. 35 is an exploded perspective view of the third lens holder frame and the base, FIG. 36 is a view of an assembly of the parts shown in FIG. 35, FIG. 37 is a view as viewed in the direction indicated by the arrow A in FIG. 36, and FIG. 38 is a cross-sectional view taken along line X-X of FIG. 37.

Figure 39:
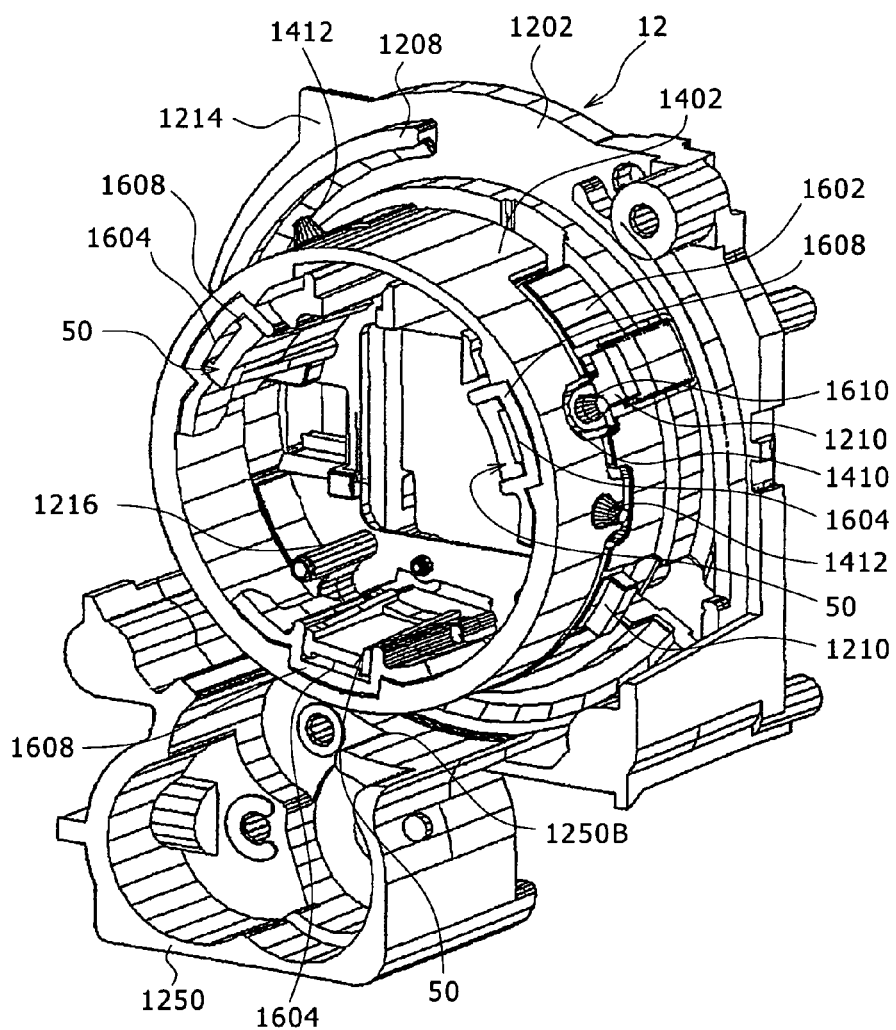
FIG. 39 is a perspective view of the first lens holder frame, the second lens holder frame, and the base which are assembled that are cut away along a plane parallel to the optical axis.
Figure 40:
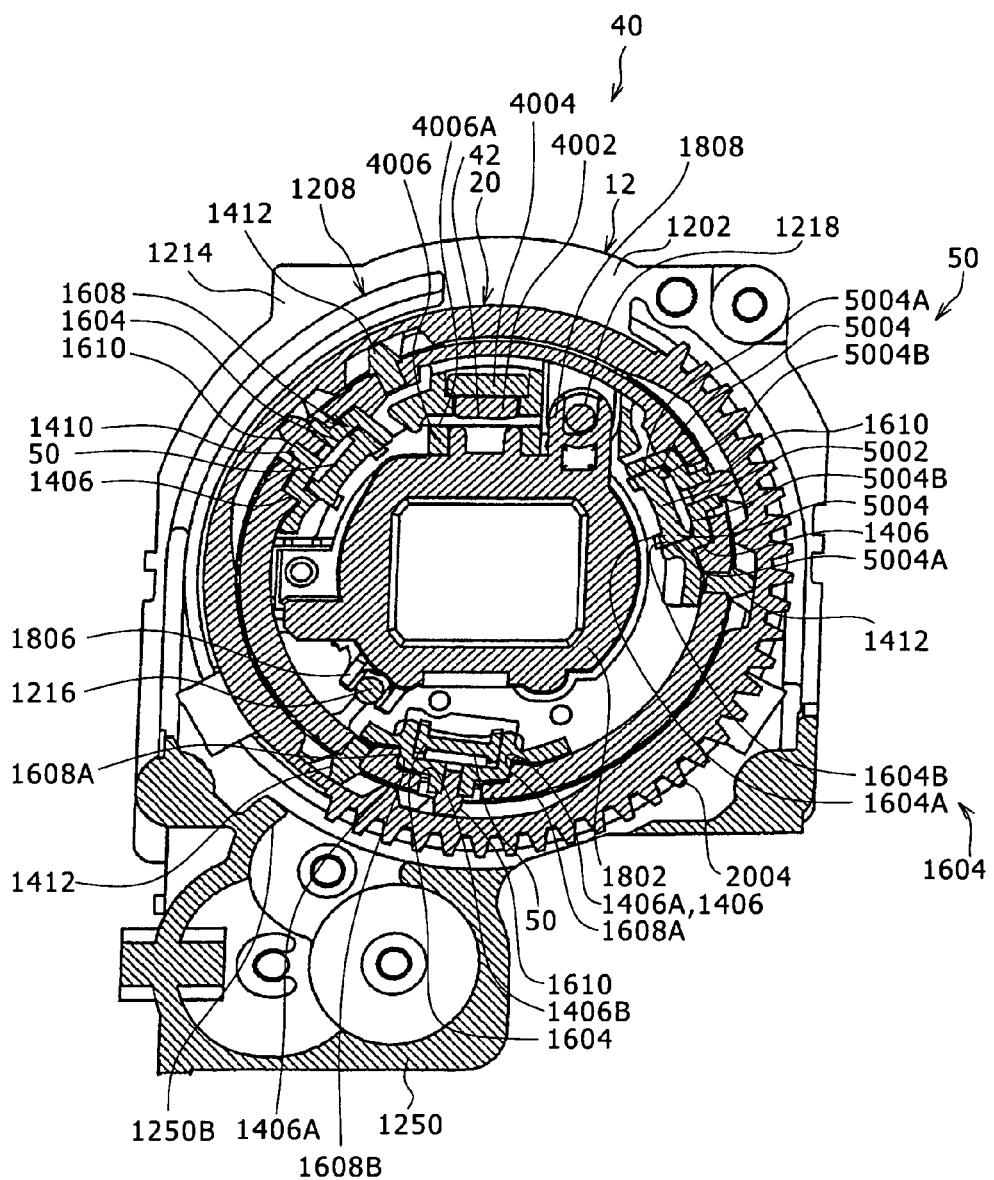
FIG. 40 is a cross-sectional view of the lens barrel taken along a plane parallel to the optical axis.
Figure 41:
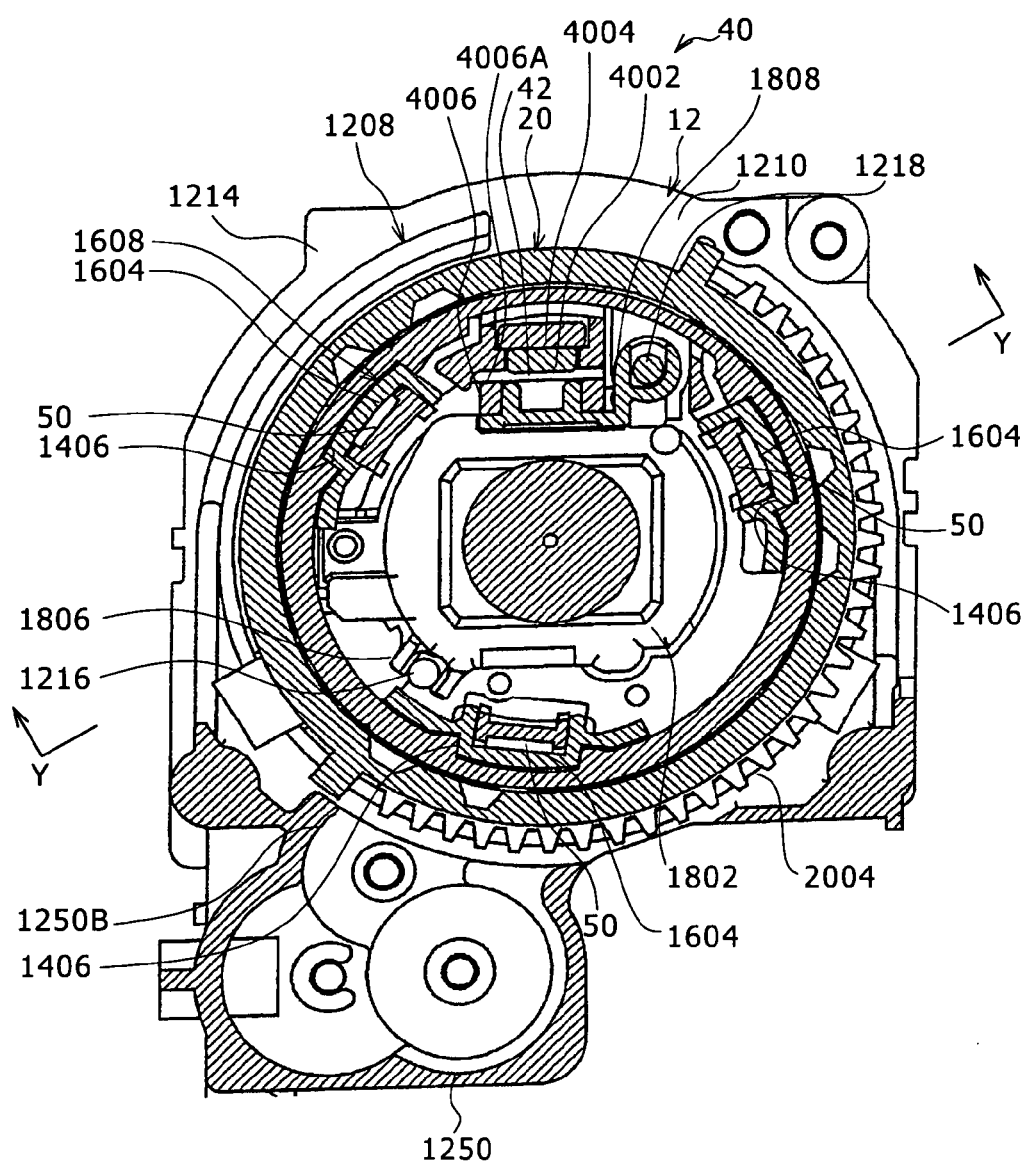
FIG. 41 is a cross-sectional view of the lens barrel taken along a plane parallel to the optical axis.
Figure 42:
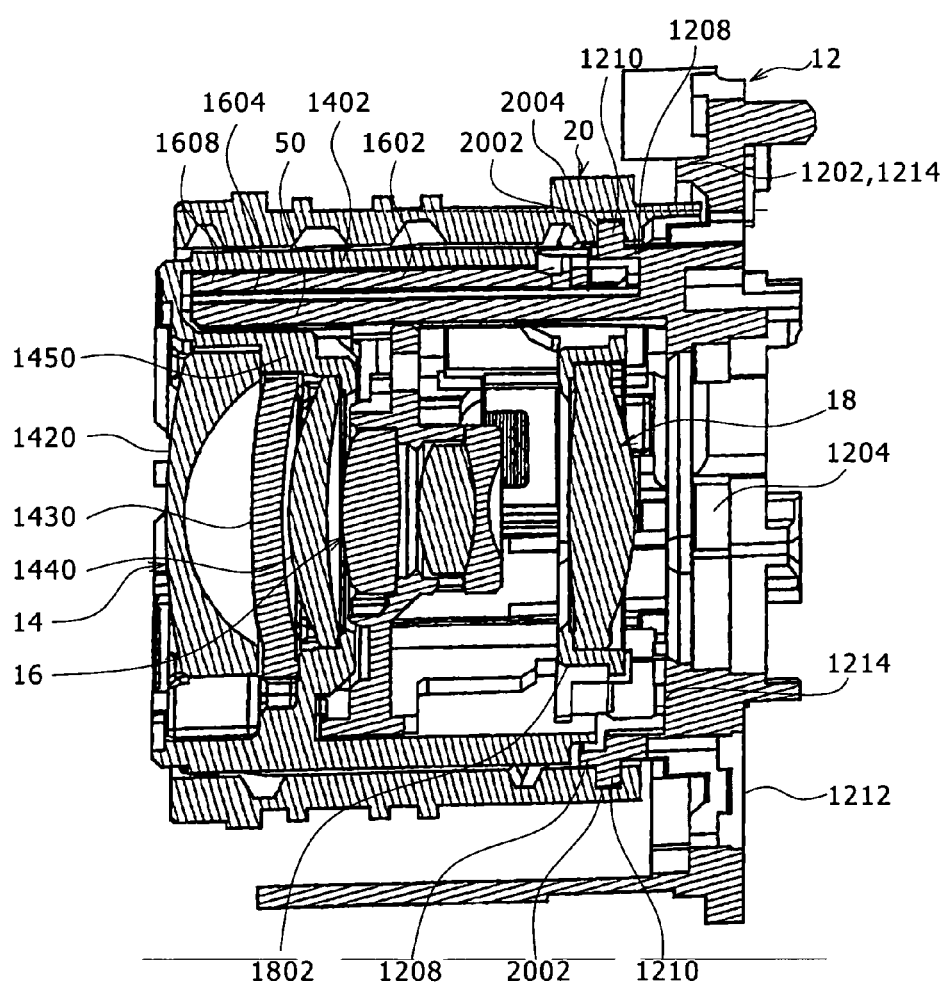
FIG. 42 is a cross-sectional view taken along line Y-Y of FIG. 41.

FIG. 39 is a perspective view of the first lens holder frame, the second lens holder frame, and the base which are assembled that are cut away along a plane parallel to the optical axis, FIG. 40 is a cross-sectional view of the lens barrel taken along a plane parallel to the optical axis, FIG. 41 is a cross-sectional view of the lens barrel taken along a plane parallel to the optical axis, and FIG. 42 is a cross-sectional view taken along line Y-Y of FIG. 41.

In some drawings of the present specification, there are areas where a plurality of straight lines are drawn on the surfaces of lenses, the surfaces of members, and the surfaces of parts. These straight lines are plotted for drawing purposes, and the areas where those straight lines are drawn actually represent cylindrical surfaces, curved surfaces, and spherical surfaces.

As shown in FIGS. 18 through 20, the image capturing optical system 104 housed in the lens barrel 10 is optically made up of three groups. Specifically, if it is assumed that the subject side is forward in the optical axis direction of the lens barrel 10 (the image capturing optical system 104) and the image capturing unit 140 side is rearward in the optical axis direction, then the three groups making up the image capturing optical system include a first lens group 14, a second lens group 16, and a third lens group 18 which are successively arranged in the order named from the forward side to the rearward side.

The lens barrel 10 performs a zooming action when the first lens group 14 and the second lens group 16 are actuated in the optical axis direction according to a predetermined cam curve, and performs a focusing action when the third lens group 18 is slightly displaced in the optical axis direction. Specifically, Therefore, the first lens group 14 and the second lens group 16 are displaced to change the focal length of the optical system, and the third lens group 18 is displaced to correct a shift that is caused from the focused position by the change in the focal length, thereby bringing the optical system into focus.

Stated otherwise, the third lens group 18 serves as a focus adjusting lens movable in the optical axis direction for adjusting the focal point of a subject image that is focused onto the image capturing unit 140.

As shown in FIGS. 21 and 29, the lens barrel 10 has a base 12 fixed to the case 102, a third lens holder frame 1802 holding the third lens group 18, an electric assembly 19, a second lens holder frame 1602 holding the second lens group 16, a first lens holder frame 1402 holding the first lens group 14, a cam ring 20, and a fixed ring 22.

As shown in FIGS. 22, 30, and 38, the base 12 has a plate-like base body 1202 and a gear housing 1250 coupled to the base body 1202. In the present embodiment, the base 12 is made of synthetic resin.

The base body 1202 has an opening 1204 defined centrally therethrough, and a recess 1206 defined in a rear surface 1212 which faces rearwardly, in surrounding relation to the opening 1204. The image capturing unit 140 is mounted in the recess 1206 as by adhesive bonding and has an image capturing surface disposed in the opening 1204.

As shown in FIGS. 25 and 42, the base body 1202 has a front surface 1214 which faces forwardly, and includes a cylindrical wall 1208 erected from the front surface 1214 and extending cylindrically around the optical axis of the image capturing optical system 104.

Four engaging fingers 1210 that are spaced at circumferential intervals project radially outwardly from an outer circumferential surface of the cylindrical wall 1208. The engaging fingers 1210 engage in an engaging groove 2002 defined in an inner circumferential surface of the cam ring 20 and extending in the circumferential direction thereof, thereby supporting the cam ring 20 on the base 12 for rotation in the circumferential direction of the cam ring 20 and against movement in the axial direction of the cam ring 20. As shown in FIG. 32, the cam ring 20 has open grooves 2003 which are open at an end thereof and which are connected to the engaging groove 2002. The engaging fingers 1210 are brought into engagement in the engaging groove 2002 when the engaging fingers 1210 are inserted through the open grooves 2003 into the engaging groove 2002.

As shown in FIG. 36, two guide shafts 1216, 1218 for guiding the third lens holder frame 1802 in the optical axis direction are disposed on the front surface 1214 of the base body 1202 radially inwardly of the cylindrical wall 1208, with the opening 1204 being positioned between the guide shafts 1216, 1218. The guide shafts 1216, 1218 extend parallel to the optical axis of the image capturing optical system 104.

One of the guide shafts 1216 has a rear end fixed to the front surface 1214.

The other of the guide shafts 1218 has a rear end fixed to the front surface 1214 and a front end supported by a guide shaft holder 1220.

The guide shaft holder 1220 includes first and second support walls 1220A, 1220B erected from the front surface 1214 and a first joint wall 1220C interconnecting the front ends of the first and second support walls 1220A, 1220B. The front end of the guide shaft 1218 is fixed to the first joint wall 1220C.

As shown in FIGS. 35, 36, 37, and 38, a magnet holder 1222 is mounted on the front surface 1214 of the base body 1202 adjacent to the guide shaft holder 1220. The guide shaft holder 1220 and the magnet holder 1222 are integrally formed with the base 12.

As shown in FIG. 35, the magnet holder 1222 is in the form of a rectangular frame having the first support wall 1220A, a third support wall 1222A erected front the front surface 1214 and spaced from the first support wall 1220A remotely from the second support wall 1220B around the optical axis, a second joint wall 1222B connected to the first joint wall 1220B and interconnecting the distal ends of the first support wall 1220A and the third support wall 1222A, and a portion of the front surface 1214 between the first and third support walls 1220A, 1222A, the rectangular frame having a longitudinal direction aligned with the optical axis direction.

As described in detail later, an actuating magnet 4002 and a strip-shaped back yoke 4004 having a contour greater than the actuating magnet 4002 and mounted on a transverse surface of the actuating magnet 4002 are inserted and mounted in the magnet holder 1222, the actuating magnet 4002 and the back yoke 4004 extending in a direction aligned with the optical axis direction.

As shown in FIG. 22, three guide posts 50 project from the front surface 1214 of the base body 1202 parallel to the optical axis and are spaced at equal intervals in the circumferential direction of the cylindrical wall 1208 (at equal intervals in the circumferential direction of the second lens holder frame 1602 to be described later. Stated otherwise, the three guide posts 50 project at equal intervals in the circumferential direction of the cam ring 20 to be described later, and face an inner circumferential surface 1620 (see FIG. 46) of the second lens holder frame 1602 to be described later.

According to the present embodiment, the guide posts 50 are made of synthetic resin and integrally formed with the base 12.

As shown in FIG. 40, each of the guide posts 50 is of an I-shaped cross section having a web 5002 and a pair of flanges 5004 disposed respectively on the opposite ends of the web 5002.

The web 5002 of each of the guide posts 50 is oriented parallel to a line tangential to the portion of the cylindrical wall 1208 which is positioned radially outwardly of the guide post 50. Stated otherwise, each of the guide posts 50 is oriented parallel to a line tangential to the corresponding portion of the second lens holder frame 1602.

As shown in FIG. 21, the gear housing 1250 has a forwardly open opening 1250A and an opening 1250B which is open laterally toward the optical axis, and houses therein a speed reducer mechanism 1252 which includes a gear train. When the drive shaft of a motor 1254 of the actuator 126 is rotated, the speed reducer mechanism 1252 transmits the rotational power of the motor 1254 at a reduced speed to the cam ring 20, thereby rotating the cam ring 20.

The motor 1254 is mounted on the gear housing 1250 and has a drive gear 1256 held in mesh with an upstream end gear of the gear train of the speed reducer mechanism 1252. A downstream end gear of gear train of the speed reducer mechanism 1252 is held in mesh with a gear 2004 on the outer circumference of the cam ring 20 through the opening 1250B.

As shown in FIGS. 22 and 30, the main flexible board 60 is mounted on the rear surface 1212 of the base body 12.

A Hall device 7002 as a magnetic force detecting sensor for detecting the position of the third lens holder frame 1802 is mounted on the main flexible board 60, and a connector for electrical connection to terminals of the motor 1254 is mounted on the main flexible board 60.

A detected signal from the Hall device 7002 is supplied through the main flexible board 60 to the controller 124. A drive signal from the controller 124 is supplied through the main flexible board 60 to the motor 1254.

As shown in FIG. 30, the Hall device 7002 is disposed in an attachment recess 1240 that is defined in the rear surface 1212 of the base body 12. Stated otherwise, the Hall device 7002 is placed in an area of the base 12 through which a straight line extending parallel to the optical axis through a position detecting magnet 7004, to be described later, passes.

The image capturing unit 140 is mounted on a flexible board, not shown. An image signal from the image capturing unit 140 is supplied through the non-illustrated flexible board to the image processor 120.

As shown in FIGS. 35 and 40, the third lens holder frame 1802 has a frame body 1804 holding the third lens group 18.

The frame body 1804 has two bearings 1806, 1808 positioned diametrically across the optical axis. The guide shafts 1216, 1218 extend respectively through the bearings 1806, 1808. Consequently, the third lens holder frame 1802 is movable along the optical axis, but nonrotatable around the optical axis. In the present embodiment, the bearings 1806, 1808 and the guide shafts 1216, 1218 make up a guide mechanism for supporting the third lens holder frame 1802 for movement in the optical axis direction.

A coil 4006 (electrical assembly) is fixed by an adhesive or the like to a portion of the frame body 1804 which faces the magnet 4002. The coil 4006 is electrically connected to the main flexible board 60 through a coil flexible board 4008 (an electrical assembly flexible board). A drive signal from the controller 124 (corresponding to a current supply means in the scope of claims for patent) is supplied through the main flexible boards 60, 4008 to the coil 4006. Specifically, as shown in FIG. 35, the coil flexible board 4008 has a distal end 4010 connected to the coil 4006 and a proximal end 4012 connected to the main flexible board 60.

The magnet 4002, the back yoke 4004, and the coil 4006 jointly make up a linear motor 40 as an actuating mechanism. When the coil 4006 is supplied with a drive current from the controller 124, the coil 4006 generates a magnetic field, which acts with the magnetic field generated by the magnet 4002 to produce a drive force for moving the third lens holder frame 1802 forwardly or rearwardly in the optical axis direction.

As shown in FIGS. 22 and 35, a position detecting magnet 7004 is fixed by an adhesive or the like to a portion of the frame body 1804 which faces the Hall device 7002, with the back yoke 7006 interposed therebetween. Stated otherwise, the position detecting magnet 7004 is placed in an area of the frame body 1804 through which a straight line extending parallel to the optical axis through the Hall device 7002 passes.

The Hall device 7002 detects the intensity (flux density) of the magnetic force of the position detecting magnet 7004, and supplies a detected signal to the controller 124, which detects the position of the third lens holder frame 1802 in the optical axis direction. The Hall device 7002, the position detecting magnet 7004, and the controller 124 jointly make up a position detecting mechanism 70.

The position detecting mechanism 70 will be described below.

First, the Hall device 7002 will be described below.

Figure 62:
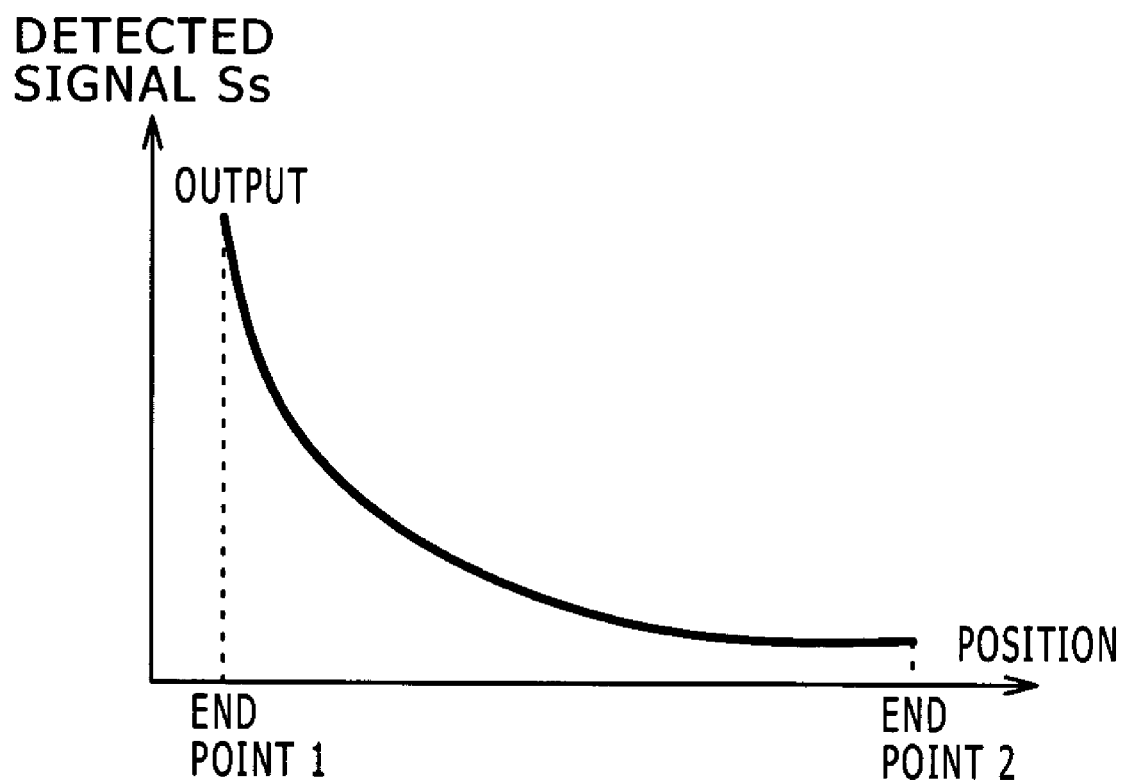
FIG. 62 is a diagram illustrative of a detected signal output from a Hall device 7002.

FIG. 62 is a diagram illustrative of a detected signal output from the Hall device 7002.

As shown in FIG. 62, since the Hall device 7002 generates a voltage that is proportional to the flux density, it outputs a detected signal Ss having a voltage corresponding (proportional) to the intensity of a magnetic force (the magnitude of the flux density) applied thereto.

If it is assumed that the third lens holder frame 1802 (the third lens group 18) is at an end point 1 when it reaches the rearmost position (a position closest to the image capturing unit 140) and at an end point 2 when the third lens holder frame 1802 reaches the foremost position (a position remotest from the image capturing unit 140), then when the third lens holder frame 1802 is positioned at the end point 1, the magnetic force of the position detecting magnet 7004 as detected by the Hall device 7002 is maximum, and hence the detected signal Ss is maximum, and as the third lens holder frame 1802 moves from the end point 1 toward the end point 2, the magnetic force of the position detecting magnet 202 as detected by the Hall device 7002 is reduced, and hence the detected signal Ss is reduced.

Stated otherwise, the position of the third lens holder frame 1802 and the voltage of the detected signal from the Hall device 7002 are held in one-to-one correspondence, and the position of the lens holder frame 1410 is uniquely determined by the value of the output voltage.

Figure 63:
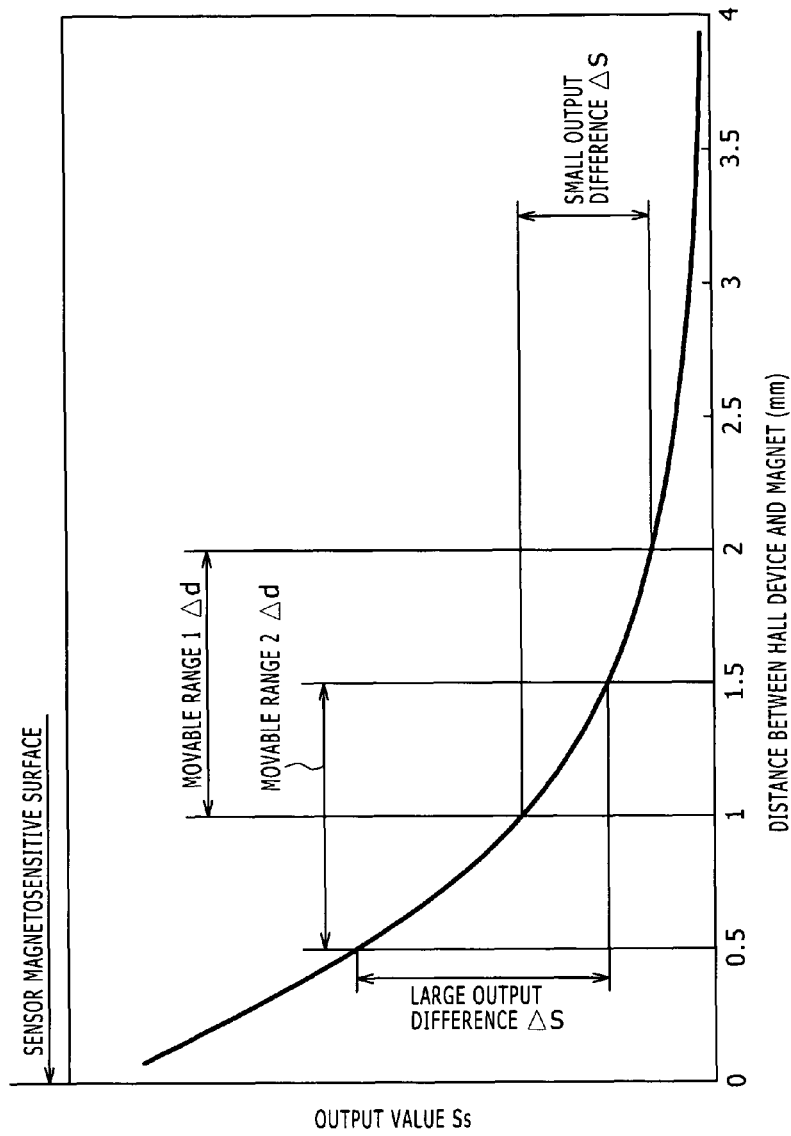
FIG. 63 is a diagram showing the relationship of the output value of the detected signal output from the Hall device 7002 to the distance between the Hall device 7002 and a position detecting magnet 7004.

FIG. 63 is a diagram showing the relationship of the output value of the detected signal output from the Hall device 7002 to the distance between the Hall device 7002 and the position detecting magnet 7004.

As shown in FIG. 63, the distance d between the Hall device 7002 and the position detecting magnet 7004 is inversely proportional to the output value of the detected signal.

Therefore, as the distance d between the Hall device 7002 and the position detecting magnet 7004 is smaller, a change ΔSs in the output value of the detected signal Ss with respect to a unit change Δd in the distance d is greater, resulting in a greater advantage in achieving the resolution and accuracy for positional detection in the optical axis direction of the third lens holder frame 1802.

Stated otherwise, keeping the distance d between the Hall device 7002 and the position detecting magnet 7004 in as small a range as possible is advantageous in achieving the resolution and accuracy for positional detection in the optical axis direction of the third lens holder frame 1802.

Figure 64:
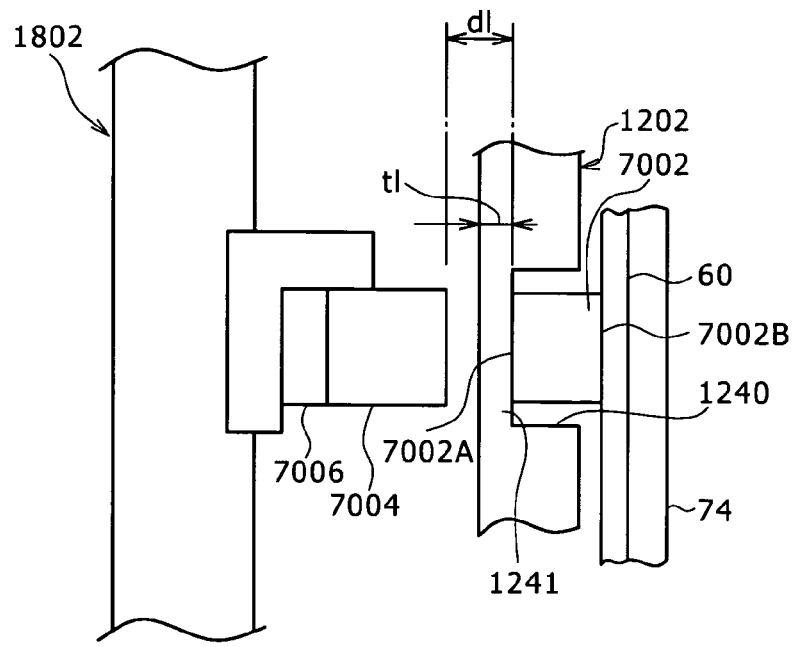
FIG. 64 is a view showing a first structural example of a position detecting mechanism 70.
Figure 65:
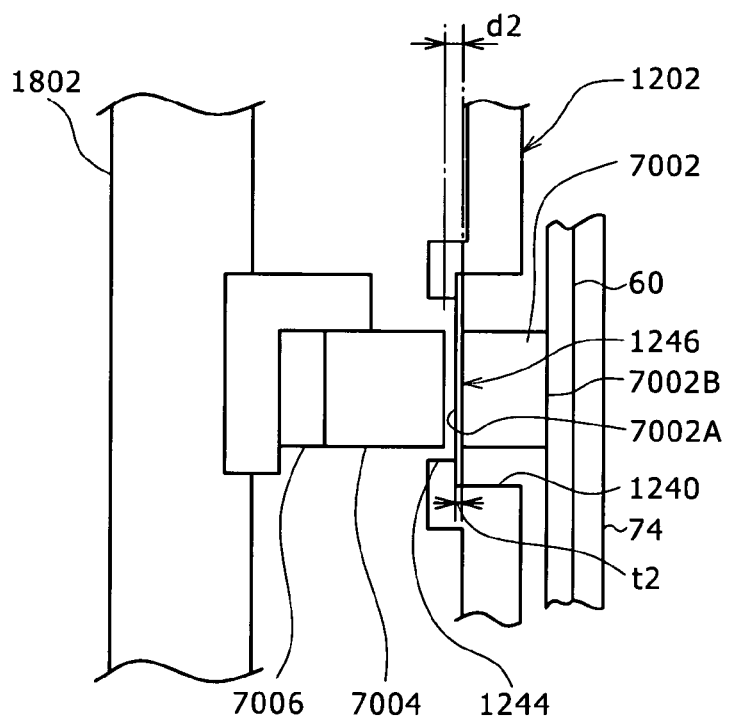
FIG. 65 is a view showing a second structural example of the position detecting mechanism 70.

FIG. 64 is a view showing a first structural example of the position detecting mechanism 70, and FIG. 65 is a view showing a second structural example of the position detecting mechanism 70.

In the first structural example shown in FIG. 64, the Hall device 7002 is mounted in place using a metal plate 74 made of a weak magnetic material.

The metal plate 74 is mounted on the base 12, and the metal plate 74 is pressed through the main flexible board 60 against a rear surface 7002B of the Hall device 7002 which is remote from a magnetosensitive surface 7002A of the Hall device 7002, holding the magnetosensitive surface 7002A against a thin wall.

In this example, an attachment recess 1240 is defined in a wall portion of the base 12 through which a straight line extending parallel to the optical axis through the position detecting magnet 7004 passes, the attachment recess 1240 being open in a direction away from the position detecting magnet 7004. The thin wall is provided by a bottom wall 1241 of the recess 1240. The Hall device 7002 is disposed in the attachment recess 1240, with the magnetosensitive surface 7002A being held against the bottom wall 1241 of the recess 1240.

If the thickness of the bottom wall 1241 is represented by t1, then the distance d1 between the magnetosensitive surface 7002A held against the bottom wall 1241 and the position detecting magnet 7004 is in a range taking the thickness t1 into account. Specifically, the distance d1 cannot be set to a dimension smaller than the thickness t1.

If the base body 1202 is made of a synthetic resin material, then there is a limitation on efforts to reduce the thickness t1, posing disadvantages in achieving the resolution and accuracy for positional detection in the optical axis direction of the third lens holder frame 1802.

In order to eliminate the above drawback, the second structural example shown in FIG. 65 is arranged as follows:

As with the arrangement shown in FIG. 64, the metal plate 74 mounted on the base 12 is pressed through the main flexible board 60 against the rear surface 7002B of the Hall device 7002, holding the magnetosensitive surface 7002A against a thin wall.

More specifically, a through hole 1244 is defined in a wall portion of the base 12 through which a straight line extending parallel to the optical axis through the position detecting magnet 7004 passes, and a thin plate 1246 made of a nonmagnetic material (a nonmagnetic body, e.g., a metal such as phosphorbronze) is disposed in the through hole 1244 to close the through hole 1244 near the position detecting magnet 7004. The thin wall in the wall portion of the base 12 is provided by the thin plate 1246. In the present example, the through hole 1244 and the thin plate 1246 provide an attachment recess 1240 defined in the wall portion of the base 12 through which the straight line extending parallel to the optical axis through the position detecting magnet 7004 passes, the attachment recess 1240 being open in a direction away from the position detecting magnet 7004. The Hall device 7002 is disposed in the through hole 1244, with the magnetosensitive surface 7002A being held against the thin plate 1246.

Since the thin plate 1246 is made of a nonmagnetic material, it does not affect the magnetic force of the detecting magnet 7004 which is detected by the Hall device 7002.

According to the second structural example, since the thin plate 1246 is made of a nonmagnetic material (metal material), the thickness t2 thereof may be of a smaller dimension than the thickness t1 of the bottom wall 1241 of the base body 1202.

Consequently, the distance d2 between the magnetosensitive surface 7002A of the Hall device 7002 which is held against the thin plate 1246 and the position detecting magnet 7004 can be close to the thickness t2 that is smaller than the thickness t1, resulting in an advantage in achieving the resolution and accuracy for positional detection in the optical axis direction of the third lens holder frame 1802.

In this example, the Hall device 7002 is used as the magnetic force detecting sensor. However, the magnetic force detecting sensor may be any sensor for detecting the intensity of a magnetic force and generating a detected signal Ss, and may include a magnetoresistive device such as an MR device other than the Hall device, for example.

As shown in FIGS. 23 and 31, the second lens holder frame 1602 includes an annular plate 1606 holding the second lens group 16 and three guides 1608 extending axially from an outer circumferential portion of the annular plate 1606 and spaced at equal intervals in the circumferential direction of the annular plate 1606.

Guide grooves 1604 are defined in respective portions of the annular plate 1606 which are radially inwardly faced by the guides 1608 (in respective inner circumferential portions of the second lens holder frame 1602).

As shown in FIG. 40, each of the guide grooves 1604 is defined by two confronting side surfaces 1604A and a bottom surface 1604B interconnecting the inner ends of the side surfaces 1604A, and is open radially inwardly of the second lens holder frame 1602. The guide grooves 1604 extend parallel to the optical axis.

The guide posts 50 engage respectively in the guide grooves 1604, so that the second lens holder frame 1602 is nonrotatably, but axially movably (along the optical axis) supported by the three guide posts 50.

More specifically, the flanges 5004 on the opposite ends of each of the guide posts 50 have respective outer surfaces 5004A engaging the respective side surfaces 1604A of the corresponding guide groove 1604 in the second lens holder frame 1602, preventing the second lens holder frame 1602 from moving circumferentially. The flanges 5004 have respective end faces 5004B engaging the bottom surface 1604B of the corresponding guide groove 1604, preventing the second lens holder frame 1602 from moving radially.

Each of the guides 1608 has a pair of side surfaces 1608A on both sides of a direction perpendicular to the direction in which the guide 1608 extends, and an outer surface 1608B facing radially outwardly between the side surfaces 1608A.

Second cam pins 1610 are mounted on respective portions of the second lens holder frame 1602 which face radially outwardly of the guide grooves 1604 (portions on the guides 1608) at positions near the rear ends of the second lens holder frame 1602. The second cam pins 1610 project radially outwardly.

As shown in FIG. 31, the second cam pins 1610 on the respective guides 1608 extend through respective recesses 1410 defined in an outer circumferential wall of the first lens holder frame 1402 and project radially outwardly from the outer circumferential wall of the first lens holder frame 1402. As shown in FIG. 32, the second cam pins 1610 engage in a second cam groove 2012 defined in the cam ring 20. When the cam ring 20 rotates, the second cam pins 1610 are guided by the second cam groove 2012 to cause the second lens holder frame 1602 to move along in the optical axis direction.

As shown in FIGS. 23, 31, 44 through 46, the electrical assembly 19 is disposed in a rear portion of the second lens holder frame 1602, and is movable in unison with the second lens holder frame 1602 in the optical axis direction.

Figure 45:
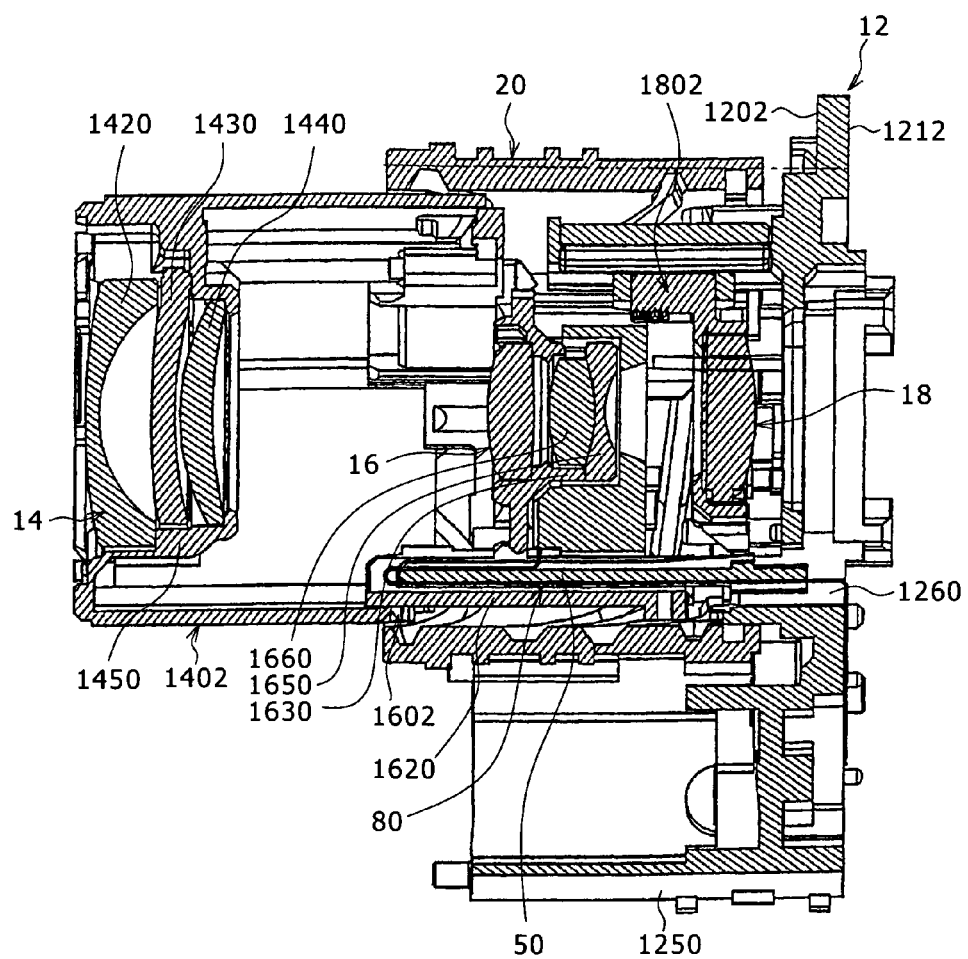
FIG. 45 is a cross-sectional view of the lens barrel, showing a state of the shutter flexible board 80 in the wide-angle state.

The electrical assembly 19 has a shutter function and a variable diaphragm function, and is electrically connected to the main flexible board 60 through the shutter flexible board 80 (see FIG. 45, the electrical assembly flexible board). When a drive signal from the controller 124 is supplied to (received by) the electrical assembly 19 through the main flexible board 60 and the shutter flexible board 80, the electrical assembly 19 controls its shutter and variable diaphragm operation.

As shown in FIGS. 23 and 31, the first lens holder frame 1402 has a tubular body 1404 holding the first lens group 14 and also has axial guide grooves 1406 defined in respective portions of the tubular body 1404 which face radially inwardly (in an inner circumferential surface of the first lens holder frame 1402). The guides 1608 of the second lens holder frame 1602 engage respectively in the guide grooves 1406.

As shown in FIG. 40, each of the guide grooves 1406 is defined by two confronting side surfaces 1406A and a bottom surface 1406B interconnecting the inner ends of the side surfaces 1406A, and is open radially inwardly of the first lens holder frame 1402.

The guides 1608 engage respectively in the guide grooves 1406 of the first lens holder frame 1402, which is nonrotatably, but axially movably supported by the three guides 1608.

More specifically, the opposite side surfaces 1608A of each of the guides 1608 engage the respective side surfaces 1406A of the corresponding guide groove 1406, preventing the first lens holder frame 1402 from moving circumferentially. The outer surface 1608B of the guide 1608 engages the bottom surface 1406B of the corresponding guide groove 1406, preventing the first lens holder frame 1402 from moving radially.

Three first cam pins 1412 are mounted on respective portions of the tubular body 1404 which face radially outwardly (on an outer circumferential surface of the first lens holder frame 1402) at circumferentially equally spaced positions near the rear end of the tubular body 1404. The first cam pins 1412 project radially outwardly.

As shown in FIG. 32, the first cam pins 1412 engage in a first cam groove 2010 in the cam ring 20. When the cam ring 20 rotates, the first cam pins 1412 are guided by the first cam groove 2010 to cause the first lens holder frame 1402 to move in the optical axis direction.

When the lens barrel 10 is in the collapsed state as shown in FIG. 17A, the second cam pins 1610 of the second lens holder frame 1602 are positioned in the respective recesses 1410 in the first lens holder frame 1402, and the first cam pins 1412 of the first lens holder frame 1402 and the second cam pins 1610 of the second lens holder frame 1602 are positioned in substantial axial alignment with each other in the optical axis direction, and spaced from each other in the circumferential direction.

As shown in FIGS. 24 and 32, the cam ring 20 has a tubular body 2001, and the gear 2004 is disposed on an outer circumferential surface of the tubular body 2001 near its rear end.

The first and second cam grooves 2010, 2012 are defined circumferentially in an inner circumferential surface of the tubular body 2001. First and second open grooves 2010A, 2012A are defined in the rear end of the inner circumferential surface of the tubular body 2001 and connected respectively to the first and second cam grooves 2010, 2012.

The first cam pins 1412 of the first lens holder frame 1402 engage into the first cam groove 2010 when the first cam pins 1412 are inserted through the respective first open grooves 2010A into the first cam groove 2010.

The second cam pins 1610 of the second lens holder frame 1602 engage into the second cam groove 2012 when the second cam pins 1610 are inserted through the respective second open grooves 2012A into the second cam groove 2012.

As shown in FIGS. 24 and 32, the fixed ring 22 includes a tubular body 2202 and a lid 2204 mounted on the tubular body 2202 near a front end thereof.

The tubular body 2202 has an inside diameter greater than the outside diameter of the cylindrical wall 1208 of the base 12, and has an opening 2203 defined therein which communicates with the opening 1250A in the housing space in the gear housing 1250.

The downstream end gear of gear train housed in the gear housing 1250 is held in mesh with the gear 2004 of the cam ring 20 through the opening 2203.

The tubular body 2202 of the fixed ring 22 houses therein the first lens holder frame 1402, the second lens holder frame 1602, the third lens holder frame 1802, and the cam ring 20. With the opening 1250A in the gear housing 1250 being closed by the lid 2204, the tubular body 2202 has its rear end fastened to the front surface 1214 of the base 12 by screws or the like.

A process of setting the shutter flexible board 80 in place will be described below.

First, the shutter flexible board 80 will be described below.

Figure 43B:
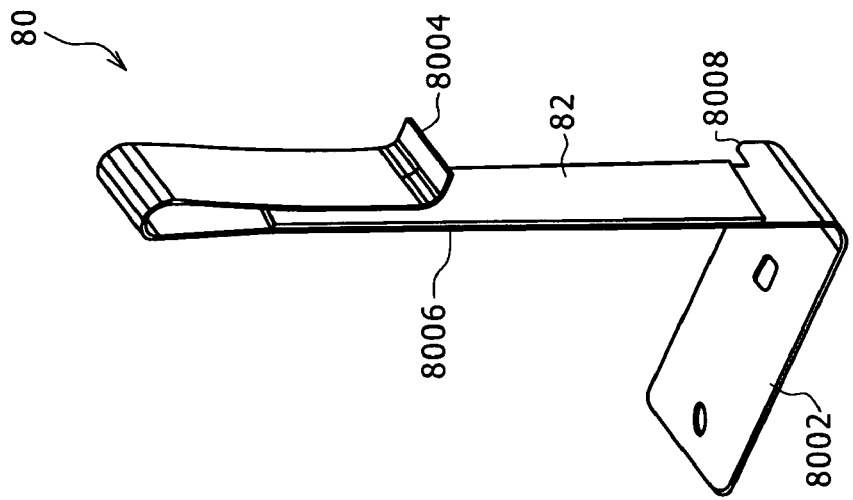
FIG. 43B is a perspective view of the shutter flexible board 80.
Figure 43A:
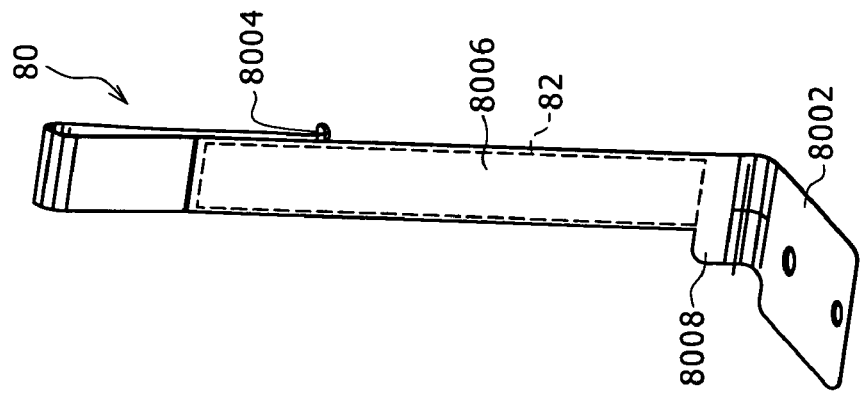
FIG. 43A is a perspective view of a shutter flexible board 80.

FIGS. 43A and 43B are perspective views of the shutter flexible board 80.

Figure 44:
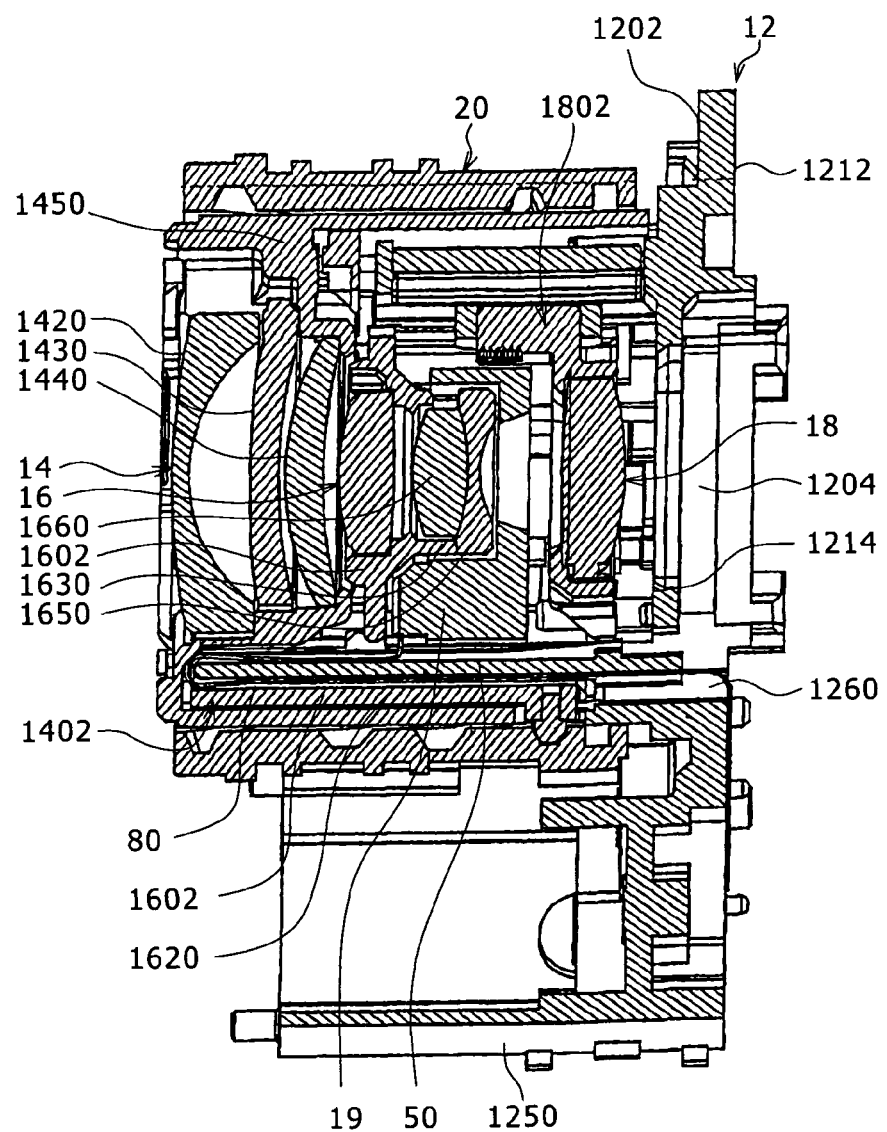
FIG. 44 is a cross-sectional view of the lens barrel, showing a state of the shutter flexible board 80 in the lens collapsed state.
Figure 46:
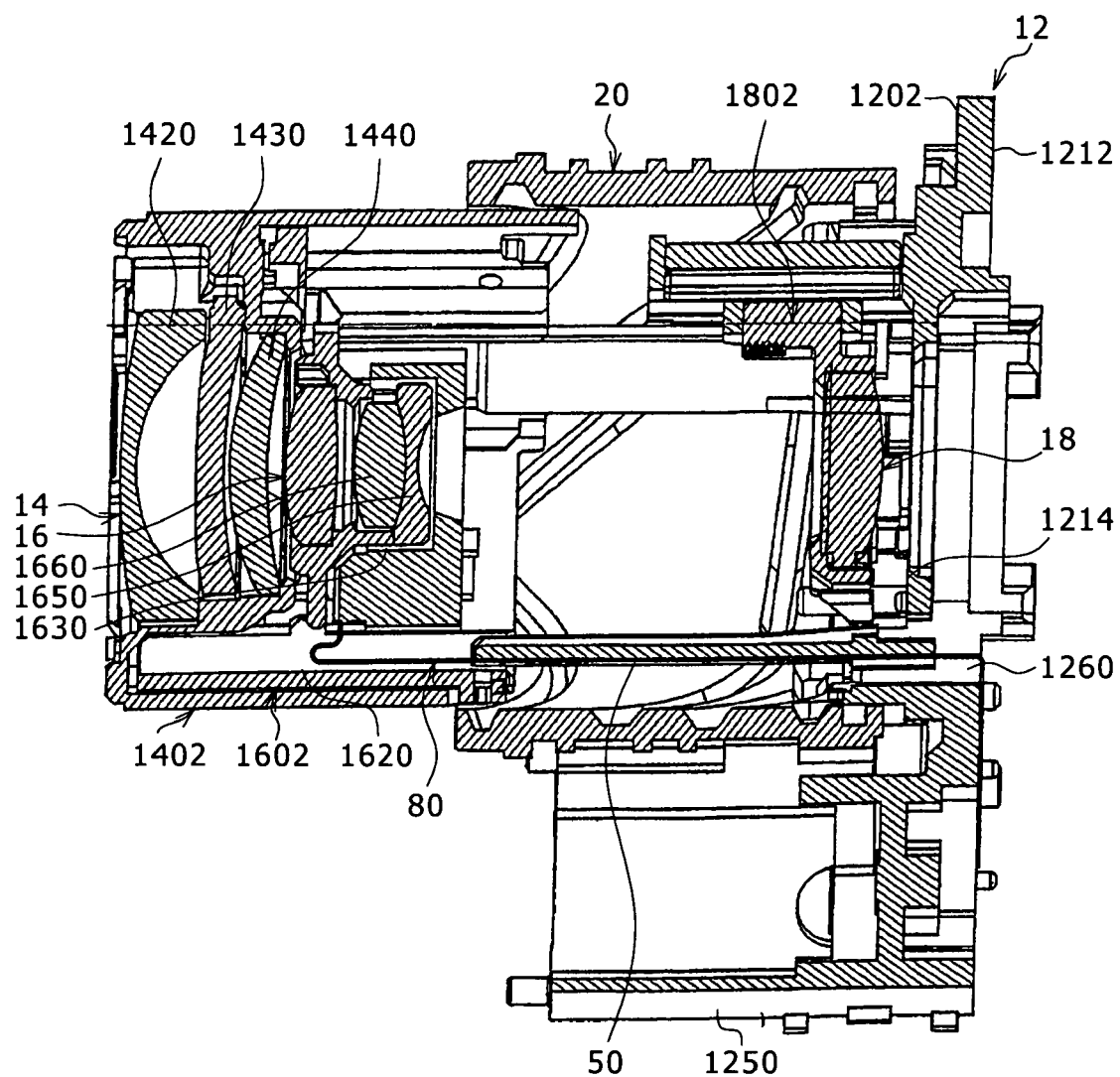
FIG. 46 is a cross-sectional view of the lens barrel, showing a state of the shutter flexible board 80 in the telephoto state.

FIG. 44 is a cross-sectional view of the lens barrel, showing a state of the shutter flexible board 80 in the lens collapsed state, FIG. 45 is a cross-sectional view of the lens barrel, showing a state of the shutter flexible board 80 in the wide-angle state, and FIG. 46 is a cross-sectional view of the lens barrel, showing a state of the shutter flexible board 80 in the telephoto state.

Figure 47A:
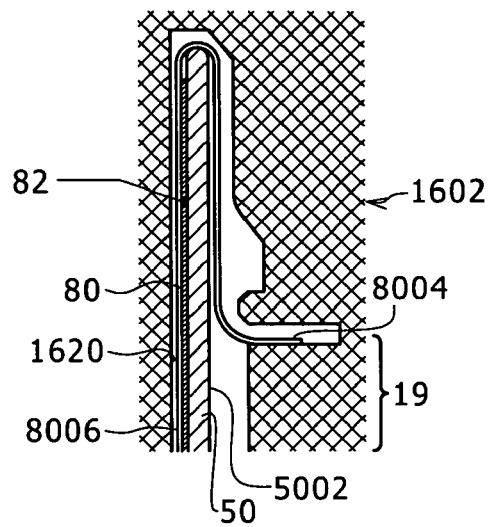
FIG. 47A is a view of a state of the shutter flexible board 80 in the lens collapsed state.
Figure 47B:
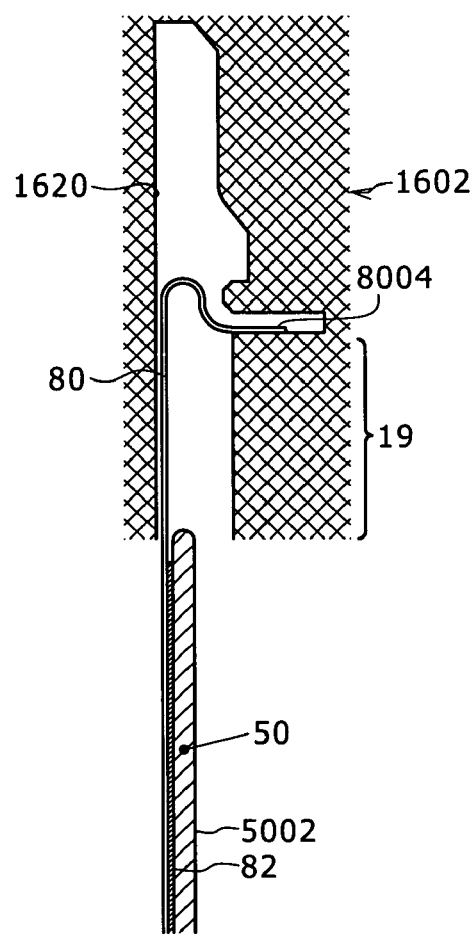
FIG. 47B is a view of a state of the shutter flexible board 80 in the wide-angle state.

FIG. 47A is a view of a state of the shutter flexible board 80 in the lens collapsed state, and FIG. 47B is a view of a state of the shutter flexible board 80 in the wide-angle state.

Figure 49:
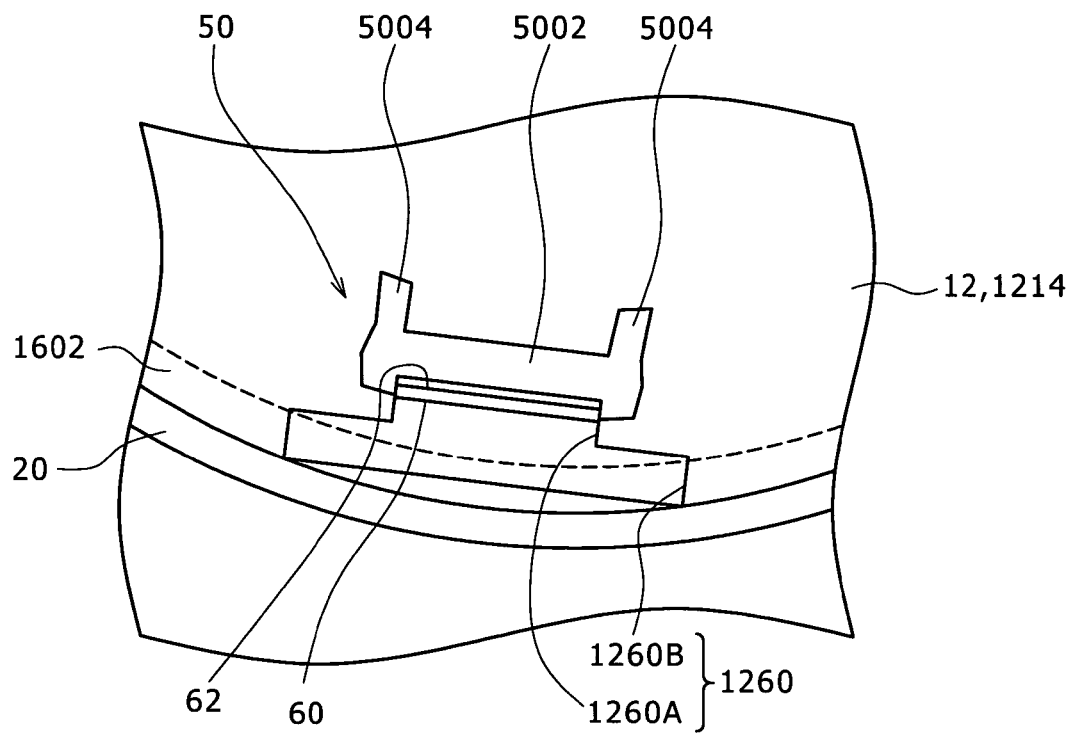
FIG. 49 is a plan view of a base 12 portion in which the shutter flexible board 80 is inserted.

FIG. 48 is a perspective view showing the manner in which the shutter flexible board 80 is set in place, and FIG. 49 is a plan view of a base 12 portion in which the shutter flexible board 80 is inserted.

As shown in FIGS. 43A and 43B, the shutter flexible board 80 is in the shape of a strip including a flexible insulating board with an electrically conductive pattern of an electrically conductive material such as copper or the like being disposed thereon.

The shutter flexible board 80 has a proximal end 8002 having a connecting terminal electrically connected to the main flexible board 60 and a distal end 8004 having a connecting terminal electrically connected to the electrical assembly 19.

The proximal end 8002 and the distal end 8004 are interconnected by a connector 8006 having a constant width, and the connector 8006 has a wider portion 8008 disposed near the proximal end 8002 and having a transverse side projecting laterally.

A strip-shaped reinforcing plate 82 is applied as by a double-sided adhesive tape or the like to one surface of the connector 8006 which extends a predetermined distance from the boundary between the proximal end 8002 and the connector 8006. The reinforcing plate 82 is made of a material harder than the shutter flexible board 80 (e.g., a synthetic resin material).

With the shutter flexible board 80 disposed along a guide post 50, as shown in FIG. 48, the reinforcing plate 82 has its upper end positioned at a location displaced from the upper end of the guide post 50 toward the base 12. Stated otherwise, the reinforcing plate 82 has a length corresponding to the length of the guide post 50, and is mounted on the shutter flexible board 80 so as to extend along the guide post 50 in an area where the shutter flexible board 80 faces the surface of the guide post 50.

Therefore, the portion of the shutter flexible board 80 to which the reinforcing plate 82 is applied extends linearly along the shape of the reinforcing plate 82.

The portion of the shutter flexible board 80 to which the reinforcing plate 82 is not applied, i.e., the proximal end 8002, the portion between the proximal end 8002 and the connector 8006, the portion of the connector 8006 near the distal end 8004, and the distal end 8004 are flexible.

The process of setting the shutter flexible board 80 in place will be described below.

As shown in FIG. 49, the portion of the base 12 where one of the three guide posts 50 is disposed has an insertion hole 1260 for inserting the flexible board therethrough.

The insertion hole 1260 is positioned outside of the guide post 50 which faces radially outwardly of the cylindrical wall 1208.

The insertion hole 1260 includes a narrower hole portion 1260A defined along a contour formed by the surface of the web 5002 and the inner surfaces of the flanges 5004 and having a width greater than the width of the connector 8006 of the shutter flexible board 80, and a wider hole portion 1260B joined to the narrower hole portion 1260A and having a width greater than the width of the wider portion 8008 of the shutter flexible board 80.

For setting the shutter flexible board 80 in place, as shown in FIG. 48, the distal end 8004 of the shutter flexible board 80 is inserted from the rear surface 1212 of the base 12 into the wider hole 1260B. The shutter flexible board 80 is inserted until the wider portion 8008 abuts against a step 1262 of the base 12, positioning the connector 8006 in the narrower hole portion 1260A. The shutter flexible board 80 now extends forwardly from the front surface 1214 of the base 12.

The connector 8006 of the shutter flexible board 80 thus extending forwardly of the base 12 is disposed along the surface of the guide post 50 which faces the inner circumferential surface 1620 (see FIGS. 47A and 47B) of the second lens holder frame 1602, i.e., along the web 5002 between the flanges 5004 of the guide post 50. The shutter flexible board 80 now extends along a space defined by the guide groove 1604 and the guide post 50. More specifically, the shutter flexible board 80 extends along a space defined by the bottom surface 1604B of the guide groove 1604 of the second lens holder frame 1602 and the surface of the guide post 50 which faces the bottom surface 1604B.

Then, the connecting terminal on the proximal end 8002 of the shutter flexible board 80 is electrically connected and fixed to the main flexible board 60 as by soldering or the like. More specifically, the proximal end 8002 is fixed to the rear surface 1212 of the base 12 by the main flexible board 60, and the portion of the rear surface 1212 of the base 12 to which the proximal end 8002 is fixed is positioned outwardly of the guide post 50 in the radial direction of the cylindrical wall 1208.

Therefore, the boundary portion between the connector 8006 and the proximal end 8002 is bent 90 degrees as shown in FIGS. 43A and 43B. The connector 8006 is urged in a direction to be pressed against the surface of the guide post 50 (the surface of the web 5002) under a reactive force produced by the bent boundary portion.

The connecting terminal on the distal end 8004 of the shutter flexible board 80 is electrically connected and fixed to the electrical assembly 19 as by soldering or the like.

The process of setting the shutter flexible board 80 in place is now completed.

Movement of the shutter flexible board 80 at the time the lens barrel 10 is moved to the collapsed state, the wide-angle state, and the telephoto state will be described below.

As shown in FIGS. 44 and 47A, when the lens barrel 10 is in the collapsed state, since the second lens holder frame 1602 is positioned most closely to the base 12, the portion of the connector 8006 of the shutter flexible board 80 near the proximal end 8002 extends along the space defined by the guide groove 1604 and the guide post 50, the longitudinally intermediate portion of the connector 8006 is bent 180 degrees at the front end of the guide post 50, and the portion of the connector 8006 near the distal end 8004 extends in the direction of the base 12.

Stated otherwise, the portion of the shutter flexible board 80 near the distal end 8004 is folded back at the front end of the guide post 50, and extends toward the base 12 along the surface of the guide post 50 that is positioned opposite to the surface of the guide post 50 which faces the inner circumferential surface 1620 of the second lens holder frame 1602.

As shown in FIG. 45, when the lens barrel 10 is moved from the collapsed state to the wide-angle state, since the second lens holder frame 1602 is moved slightly forwardly, the portion that has been bent 180 degrees (the portion facing the front end of the guide post 50) moves forwardly from the front end of the guide post 50 by a distance corresponding to the distance that the distal end 8004 of the shutter flexible board 80 moves forwardly.

As shown in FIGS. 46 and 47B, when the lens barrel 10 is moved from the wide-angle state to the telephoto state, the portion that has been bent 180 degrees (the portion facing the front end of the guide post 50) moves largely forwardly from the front end of the guide post 50 by a distance corresponding to the distance that the distal end 8004 of the shutter flexible board 80 moves forwardly.

At this time, the connector 8006 that is positioned ahead of the front end of the guide post 50 extends due to the resiliency of the shutter flexible board 80 in the direction in which the surface of the web 5002 of the guide shaft 50 extends, or stated otherwise, linearly forwardly from the front end of the guide post 50 along the inner circumferential surface 1620 of the second lens holder frame 1602.

When the lens barrel 10 is moved from the telephoto state to the wide-angle state or the lens barrel 10 is moved from the wide-angle state to the collapsed state, the shutter flexible board 80 is moved in a sequence which is a reversal of the above sequence.

With the above arrangement, the guide post 50 which extends axially and faces the inner circumferential surface 1620 of the second lens holder frame 1602 is erected from the base 12, and the shutter flexible board 80 extends from the base 12 along the surface of the guide post 50 which faces the inner circumferential surface 1620 of the second lens holder frame 1602, with the distal end 8004 being connected to the electrical assembly 19. Therefore, even when the second lens holder frame 1602 moves, the shutter flexible board 80 remains extending along the guide post 50. Therefore, the portion of the shutter flexible board 80 does not interfere with the second lens holder frame 1602 to allow the lens holder frame to move smoothly and minimize the space occupied by the shutter flexible board 80, resulting in advantages in making the lens barrel 10 small in size and hence making the image capturing device 100 small in size. Furthermore, the shutter flexible board 80 extends along the space defined by the bottom surface 1604B of the guide groove 1604 of the second lens holder frame 1602 and the surface of the guide post 50 which faces the bottom surface 1604B, resulting in an advantage in reducing the occupied space.

As the reinforcing plate 82 is mounted on one of the surfaces of the connector 8006 of the shutter flexible board 80, even when a force is applied in a direction to bend (a direction to compress) the connector 8006 upon movement of the second lens holder frame 1602, the connector 8006 keeps its attitude along the surface of the guide post 50, and the shutter flexible board 80 is prevented from interfering with the second shutter holder frame 1602, resulting in an advantage in moving the second shutter holder frame 1602 smoothly.

The three guide posts 50 that are spaced at intervals in the circumferential direction of the cam ring 20 project on the base 12 parallel to the axial direction, and the inner circumferential surface of the second lens holder frame 1602 engages the guide posts 50, so that the second lens holder frame 1602 is supported radially nonrotatably, but axially movably, by the guide posts 50. Consequently, as shown in FIG. 40, components of the image capturing device, such as the guide shafts 1216, 1218 and the magnet 4002, can be placed in the spaces between the guide posts 50 on a circumferential plane passing through the guide posts 50 around the optical axis. This structure is more advantageous in reducing the diametrical dimension of the lens barrel 10 and reducing the size of the image capturing device 100 than if a linear guide ring is disposed between the outer circumferential surfaces of the first and second lens holder frames 1402, 1602 and the inner circumferential surface of the cam ring 20. For assembling the first and second lens holder frames 1402, 1602 onto the base 12, the second lens holder frame 1602 is inserted toward the base 12 with the guide posts 50 of the base 12 engaging in the guide grooves 1604 in the second lens holder frame 1602, and then the first lens holder frame 1402 is inserted toward the base 12 with the guides 1608 engaging in the guide grooves 1406 in the first lens holder frame 1402. Therefore, the first and second lens holder frames 1402, 1602 can easily be assembled in place. When the lens barrel 10 is in the collapsed state, the first cam pins 1412 of the first lens holder frame 1402 and the second cam pins 1610 of the second lens holder frame 1602 are positioned in substantially the same location in the optical axis direction and are positioned in circumferentially spaced locations. Therefore, the first and second cam pins 1412, 1610 can simultaneously be inserted from the first and second open grooves 2010A, 2012A in the cam ring 20 into the first and second cam grooves 2010, 2012, resulting in a greater advantage in simplifying the assembling process than if one of the cam pins is inserted into the cam grooves, then the cam ring 20 is rotated one revolution, and thereafter the other cam pin is inserted into the cam groove, as is the case with the conventional arrangement.

Each of the guide posts 50 is of the I-shaped cross section having the web 5002 and the flanges 5004 disposed respectively on the opposite ends of the web 5002. Therefore, the guide posts 50 thus shaped are advantageous in keeping the strength of the guide posts 50 and reducing the occupied space of the guide posts 50. Furthermore, since the flanges 5004 on the opposite ends of each of the guide posts 50 have the respective outer surfaces 5004A engaging the respective side surfaces 1604A of the corresponding guide groove 1604 in the second lens holder frame 1602, and have the respective end faces 5004B engaging the bottom surface 1604B of the corresponding guide groove 1604, a dead space is defined between the portion of the web 5002 and the bottom surface 1604B of the guide groove 1604. Consequently, when the second cam pin 1610 is pressed into the portion of the second lens holder frame 1602 which faces radially outwardly of the guide groove 1604 and the tip end of the second cam pin 1610 in the direction in which it is pressed projects from the inner circumferential surface of the lens holder frame 1602, the tip end is accommodated in the dead space. As a result, the dead space of each of the guide posts 50 is effectively utilized to reduce the diametrical dimension of the lens barrel 10.

A connected structure of the main flexible board 60, the coil flexible board 4008, and the shutter flexible board 80 will be described below.

Figure 50:
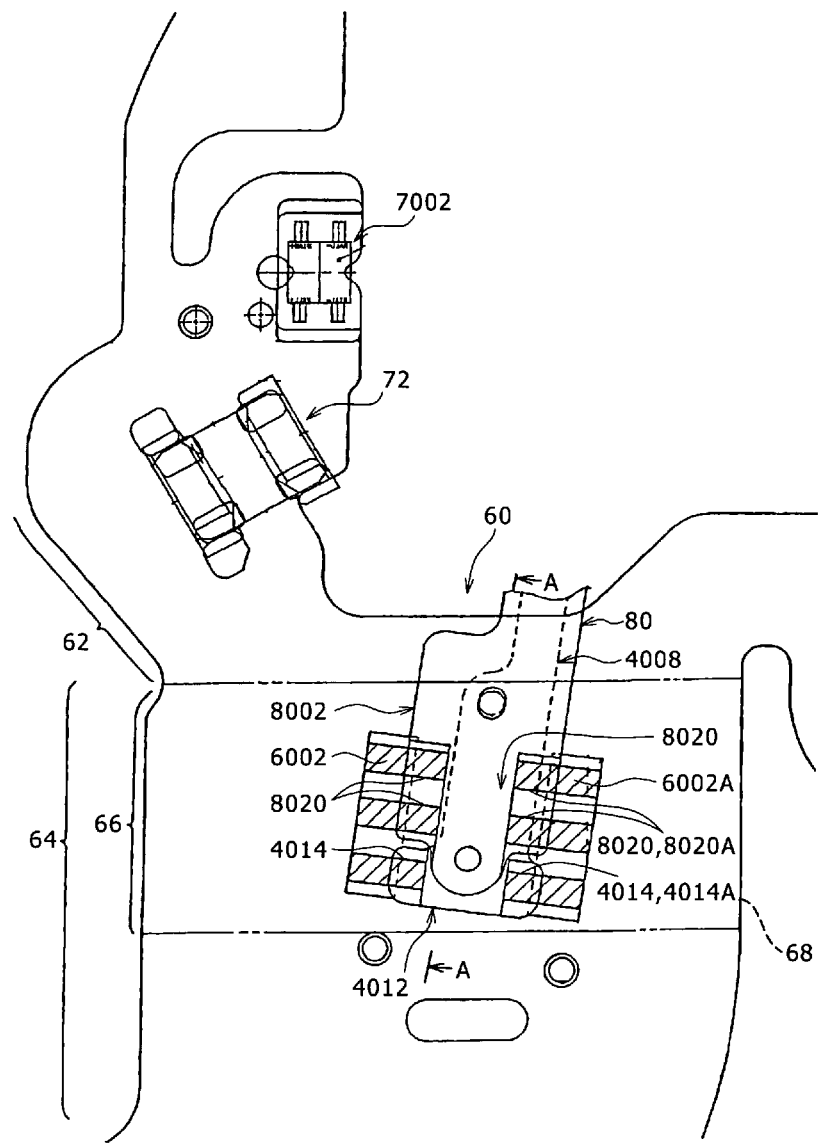
FIG. 50 is a plan view showing the positional relationship between a main flexible board 60, a coil flexible board 4008, and the shutter flexible board 80.
Figure 51A:
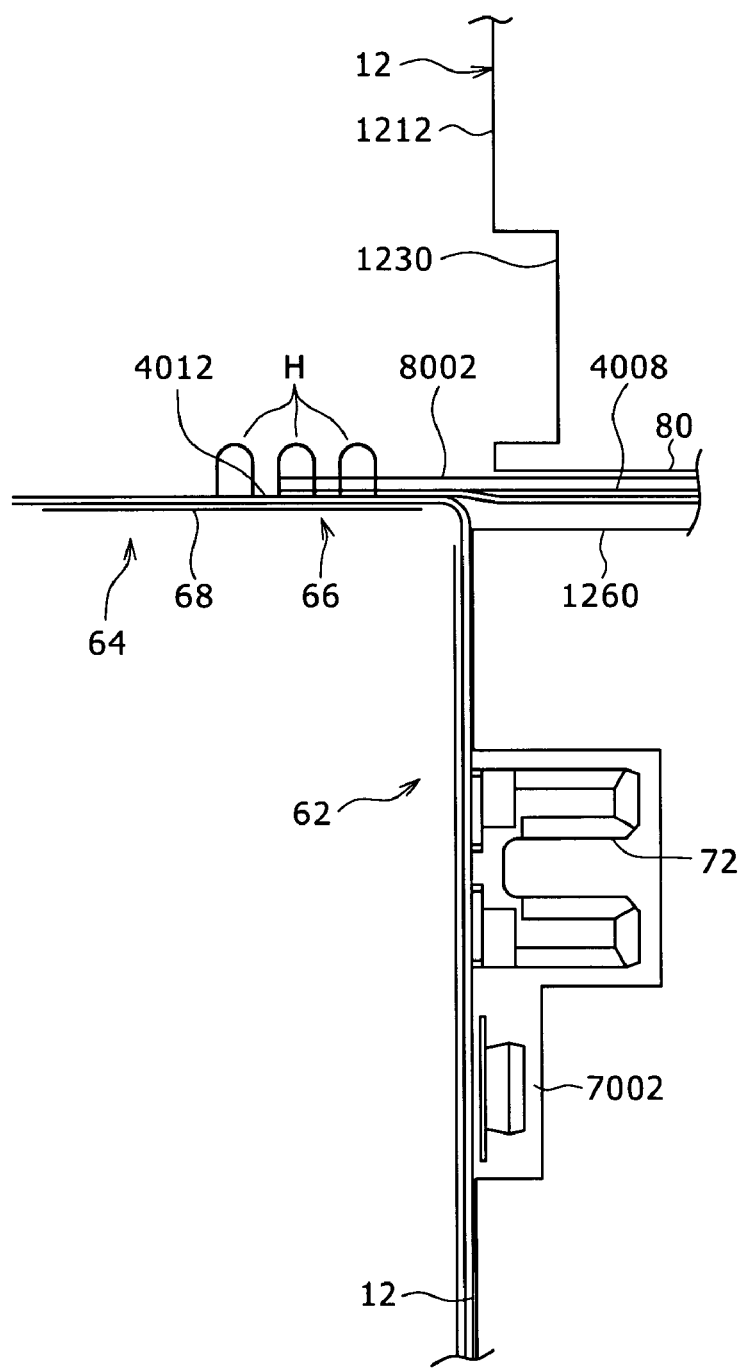
FIG. 51A is a cross-sectional view taken along line A-A of FIG. 50, showing a bent state of a liftable and depressable surface portion of the main flexible board 60.
Figure 51B:
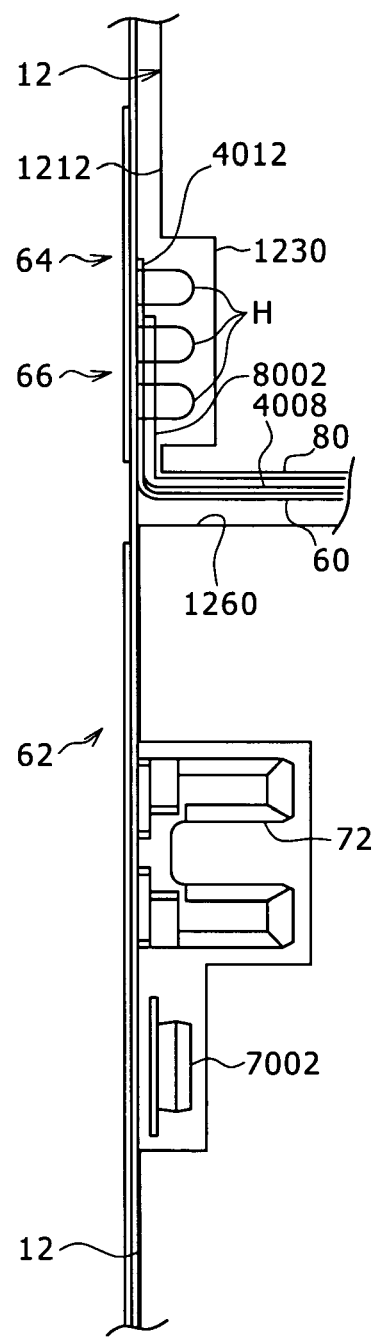
FIG. 51B is a cross-sectional view taken along line A-A of FIG. 50, showing a flat state of the liftable and depressable surface portion of the main flexible board 60.
Figure 52:
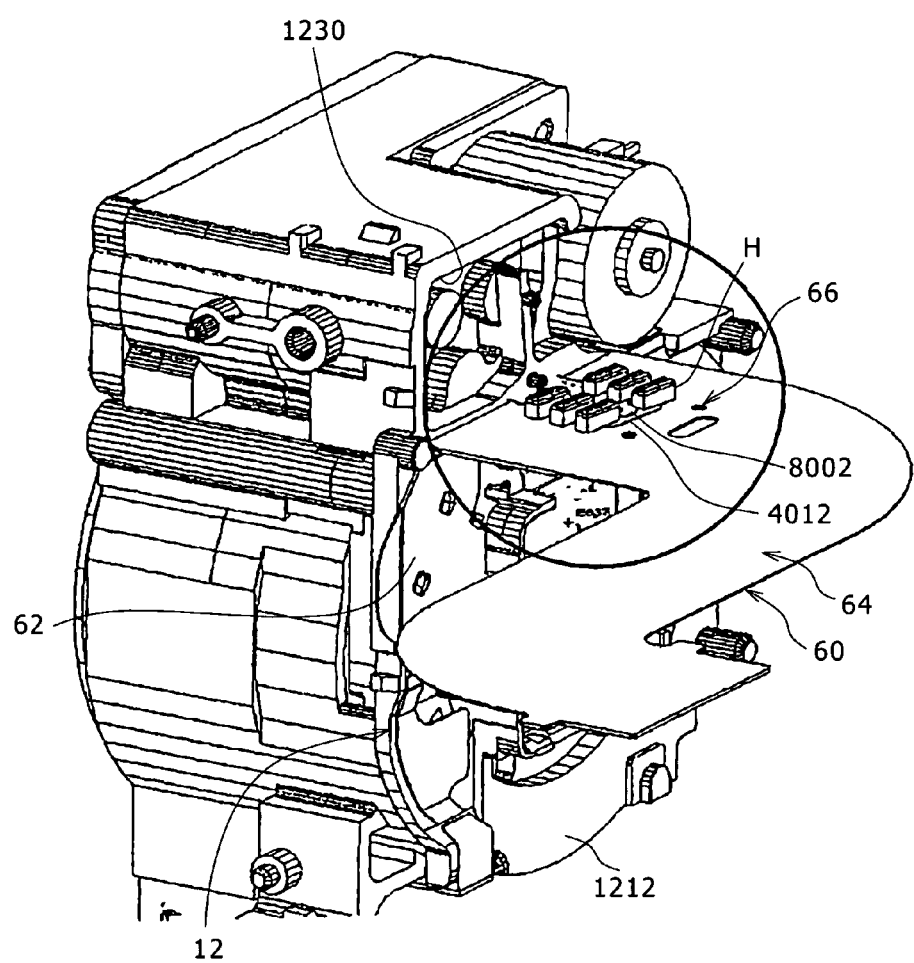
FIG. 52 is a perspective view showing the bent state of the liftable and depressable surface portion of the main flexible board 60.
Figure 53:
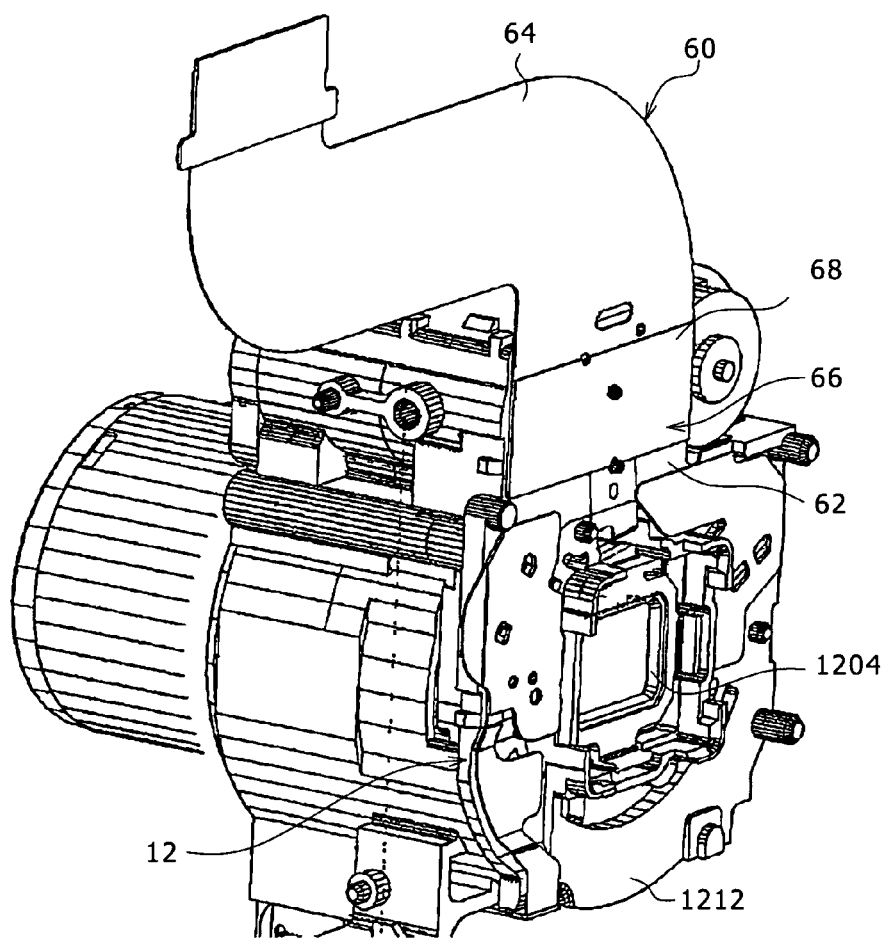
FIG. 53 is a perspective view showing the flat state of the liftable and depressable surface portion of the main flexible board 60.
Figure 54:
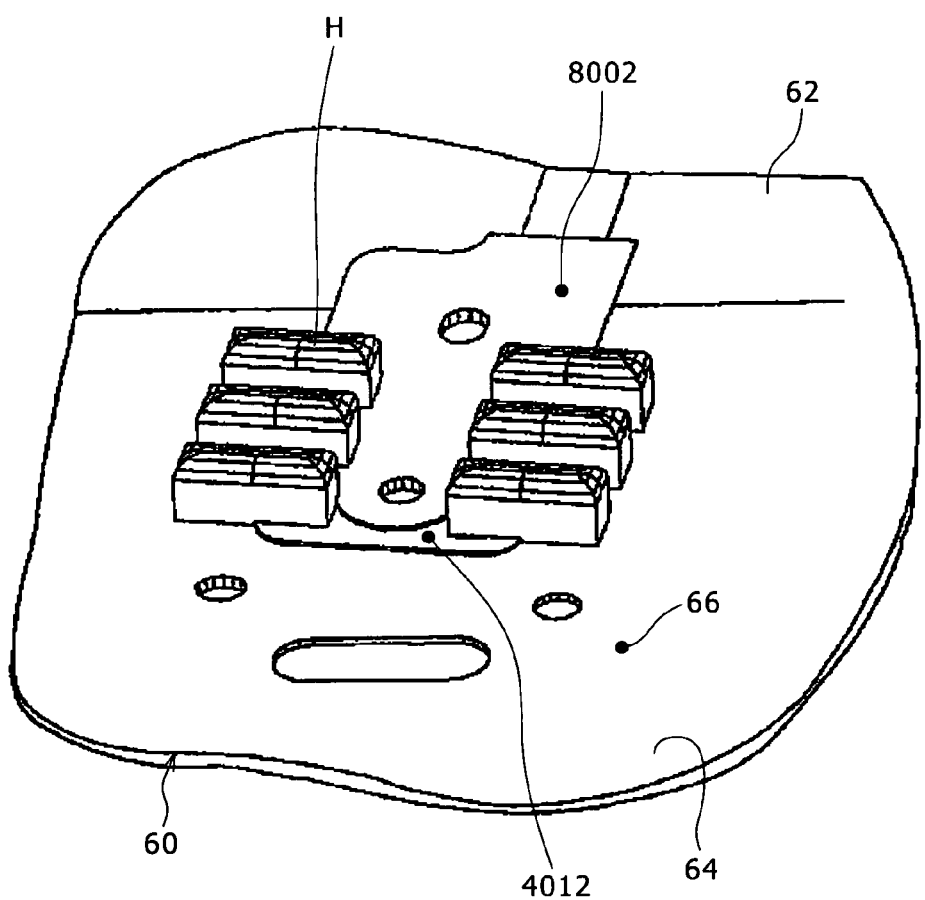
FIG. 54 is a perspective view showing a soldered state of first and second soldering terminals.

FIG. 50 is a plan view showing the positional relationship between the main flexible board 60, the coil flexible board 4008, and the shutter flexible board 80. FIGS. 51A and 51B are cross-sectional views taken along line A-A of FIG. 50, FIG. 51A showing a bent state of a liftable and depressable surface portion of the main flexible board 60, and FIG. 51B showing a flat state of the liftable and depressable surface portion of the main flexible board 60. FIG. 52 is a perspective view showing the bent state of the liftable and depressable surface portion of the main flexible board 60. FIG. 53 is a perspective view showing the flat state of the liftable and depressable surface portion of the main flexible board 60. FIG. 54 is a perspective view showing a soldered state of first and second soldering terminals.

First, the main flexible board 60 will be described below.

The main flexible board 60 includes a flexible insulating board and an electrically conductive pattern disposed on the insulating board. As shown in FIG. 22, the main flexible board 60 has an attachment surface portion 62 mounted on the rear surface 1212 of the base 12 and a movable surface portion 64 extending from the attachment surface portion 62.

As shown in FIG. 50, in addition to the Hall device 7002, a photointerruptor 72 for detecting a detectable member 2020 (see FIG. 21) mounted on the rear end of the cam ring 20 and extending circumferentially along the cam ring 20 is mounted on the attachment surface portion 62.

With the main flexible board 60 being mounted on the rear surface 1212 of the base 12, the photointerruptor 72 is disposed so as to project forwardly from the front surface 1214 of the base 12 and face the detectable member 2020 of the cam ring 20 through an opening (not shown) in the base 12.

A detected signal from the photointerruptor 72 is supplied through the main flexible board 60 to the controller 124, which identifies the angular position of the cam ring 20 based on the detected signal.

The portion of the movable surface portion 64 which is close to the attachment surface portion 62 has a liftable and depressable surface portion 66 that can be lifted and depressed between a bent state (FIGS. 51A and 52) wherein the liftable and depressable surface portion 66 is bent at a right angle to the attachment surface portion 62 and spaced from the rear surface 1212 of the base 12, and a flat state (FIGS. 51B and 53) wherein the liftable and depressable surface portion 66 mates with and is attached to the rear surface 1212 of the base 12.

A first soldering terminal 6602 is disposed on the front surface of the liftable and depressable surface portion 66 which faces the rear surface 1212 of the base 12. According to the present embodiment, the first soldering terminal 6602 includes two rows of three connecting terminals 6602A arrayed at spaced intervals on a straight line, the two rows being spaced from each other in a direction perpendicular to the straight line. Therefore, the first soldering terminal 6602 includes a total of six connecting terminals 6602A.

A reinforcing plate 68 which is made of a material harder than the insulating board and has a size corresponding to the liftable and depressable surface portion 66 is mounted on the rear surface of the liftable and depressable surface portion 66 which is opposite to the front surface facing the rear surface 1212 of the base 12.

The shutter flexible board 80 will be described below.

The proximal end 8002 (rear end) of the shutter flexible board 80 is inserted through the insertion hole 1260 (opening) in the base 12 and extends rearwardly of the rear surface 1212 of the base 12.

A second soldering terminal 8020 is disposed on the proximal end 8002 of the shutter flexible board 80. According to the present embodiment, the second soldering terminal 8020 includes two connecting terminals 8020A on each of transversely opposite sides of the proximal end 8002. Therefore, the second soldering terminal 8020 includes a total of four connecting terminals 8020A.

The coil flexible board 4008 will be described below.

The proximal end 4012 of the coil flexible board 4008 is inserted through the insertion hole 1260 and extends rearwardly of the rear surface 1212 of the base 12, as with the shutter flexible board 80.

A second soldering terminal 4014 is disposed on the proximal end 4012 of the coil flexible board 4008. According to the present embodiment, the second soldering terminal 4014 includes connecting terminal 4014A on each of transversely opposite sides of the proximal end 4012. Therefore, the second soldering terminal 4014 includes a total of two connecting terminals 4014A.

A process of soldering the main flexible board 60 and the shutter flexible board 80, the coil flexible board 4008 will be described below.

As shown in FIGS. 51A and 52, the liftable and depressable surface portion 66 is held in a bent state.

Then, the connecting terminals 4014A of the second soldering terminal 4014 of the coil flexible board 4008 are superposed on and soldered to the connecting terminals 6002A of the first soldering terminal 6602 of the liftable and depressable surface portion 66.

Then, the connecting terminals 8020A of the second soldering terminal 8020 of the shutter flexible board 80 are superposed on and soldered to the connecting terminals 6002A of the first soldering terminal 6602 of the liftable and depressable surface portion 66 from above the coil flexible board 4008, with the rear end of the second soldering terminal 4014 of the coil flexible board 4008 being exposed.

As shown in FIG. 54, solder H is applied between the connecting terminals 4014A, 6002A, and solder H is applied between the connecting terminals 8020A, 6002A, electrically connecting the main flexible board 60 and the shutter flexible board 80, the coil flexible board 4008.

Then, as shown in FIGS. 51B and 53, the liftable and depressable surface portion 66 is bent into a flat state. As shown in FIG. 22, the metal plate 74 is held against the rear surfaces of the attachment surface portion 62 and the liftable and depressable surface portion 66, and engaging recesses 7402 defined in opposite sides of the metal plate 74 are brought into fitting engagement with respective engaging teeth 1232 on opposite sides of the base 12. The attachment of the main flexible board 60 to the base 12 is now completed.

Since the solder H is positioned between the front surface of the main flexible board 60 and the rear surface 1212 of the base 12, the solder H is covered with the insulating board of the main flexible board 60 and is not exposed.

In the present embodiment, a recess 1230 is defined in the rear surface 1212 of the base 12, and the solder H applied to the first and second soldering terminals 6002, 4014, 8020 is placed in the recess 1230.

With the above arrangement, the liftable and depressable surface portion 66 is disposed on the main flexible board 60, the first soldering terminal 6002 is disposed on the front surface of the liftable and depressable surface portion 66 which faces the rear surface 1212 of the base 12, and the second soldering terminals 4014, 8020 are disposed respectively on the rear ends of the shutter flexible board 80 and the coil flexible board 4008.

When the liftable and depressable surface portion 66 is in the folded state, the second soldering terminals 4014, 8020 of the shutter flexible board 80 and the coil flexible board 4008 can be superposed on and soldered to the first soldering terminal 6002 on the liftable and depressable surface portion 66, resulting in an advantage in simplifying the assembling process.

When the liftable and depressable surface portion 66 is in the flat state, since the solder H is covered with the main flexible board 60 and is not exposed, there is no need for a space for preventing the solder H and other members from contacting each other, unlike the conventional arrangement, resulting in an advantage in reducing the size. As there is no need for applying a member such as an insulating tape or the like to the solder H, the arrangement is advantageous in reducing the number of parts used and also reducing the cost.

Because the reinforcing plate 68 having a size corresponding to the liftable and depressable surface portion 66 is mounted on the liftable and depressable surface portion 66, the liftable and depressable surface portion 66 can reliably be bent and can remain flat when bent for efficient soldering operation.

As the recess 1230 for holding the solder H is defined in the rear surface 1212 of the base 12, when the liftable and depressable surface portion 66 is in the flat state, the solder H on the liftable and depressable surface portion 66 does not occupy a space behind the rear surface 1212 of the base 12, resulting in an advantage in reducing the size.

The second lens group 16 and the second lens holder frame 1602 will be described below.

Figure 55:
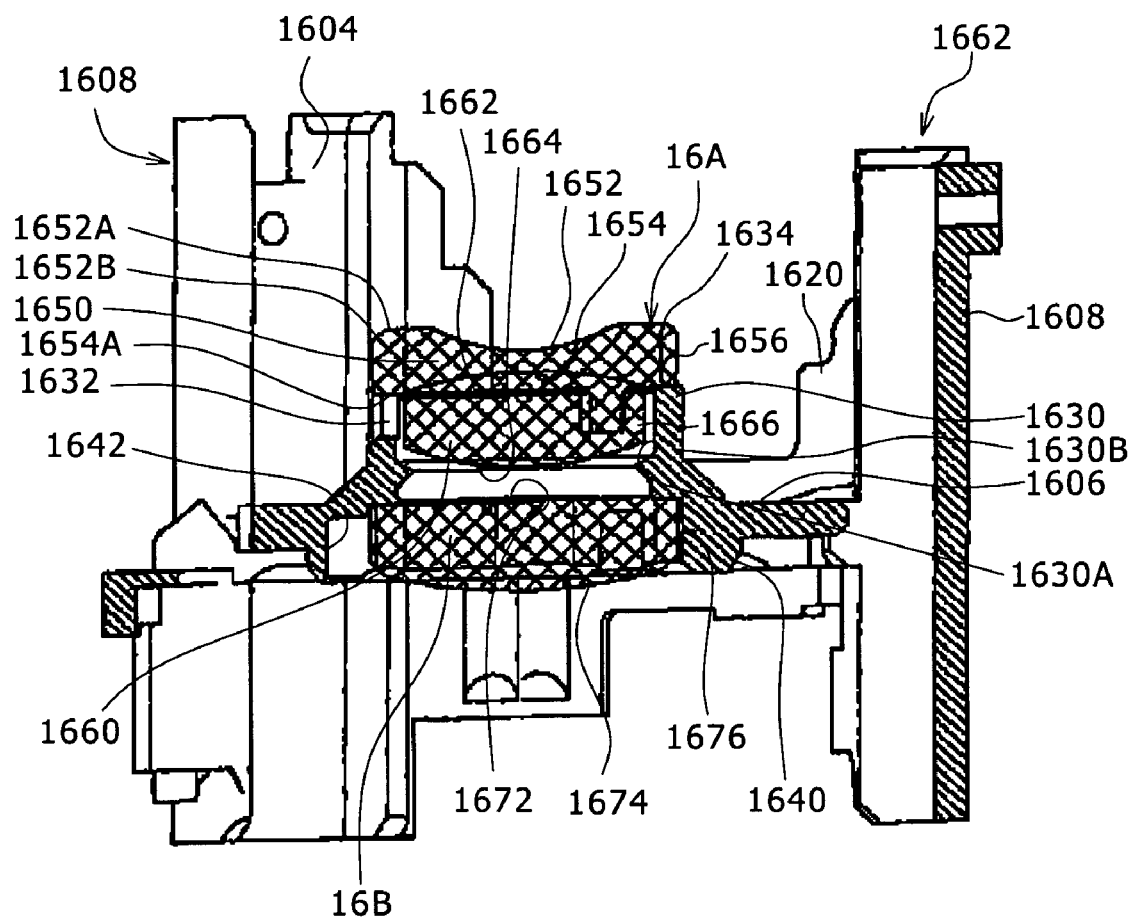
FIG. 55 is a cross-sectional view of a second lens group 16 and a second lens holder frame 1602.
Figure 56:
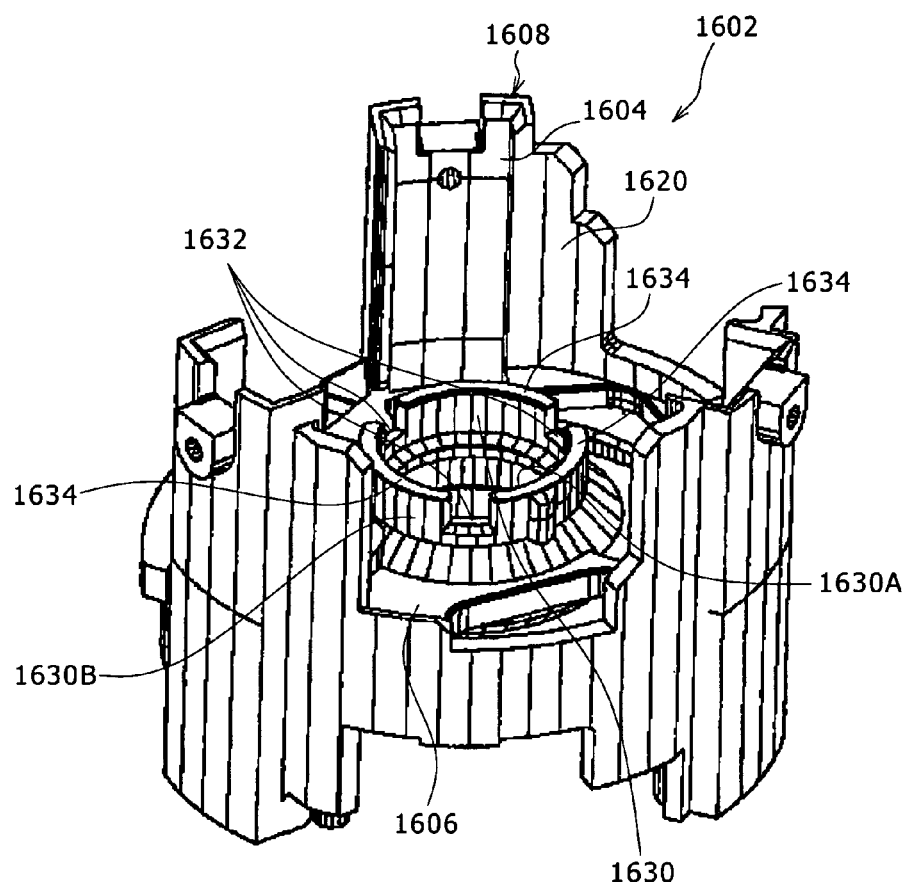
FIG. 56 is a perspective view of the second lens holder frame 1602.
Figure 57:
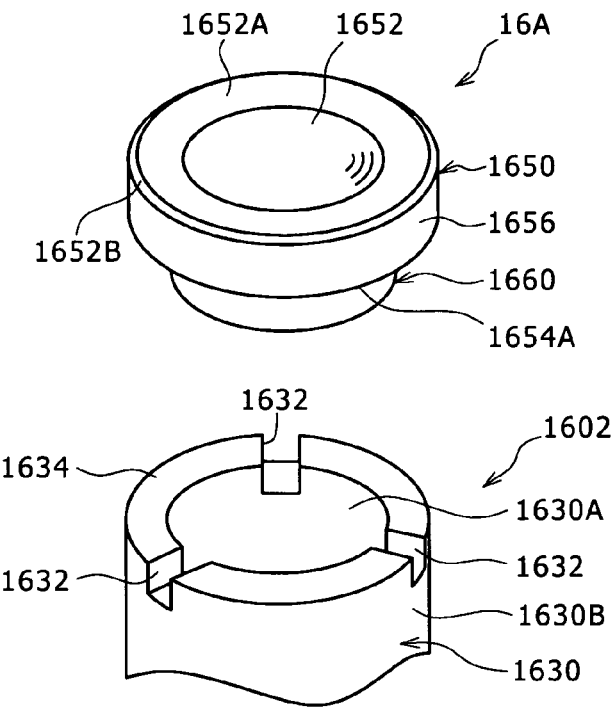
FIG. 57 is a view showing how the second lens group 16 and the second lens holder frame 1602 are assembled.
Figure 58:
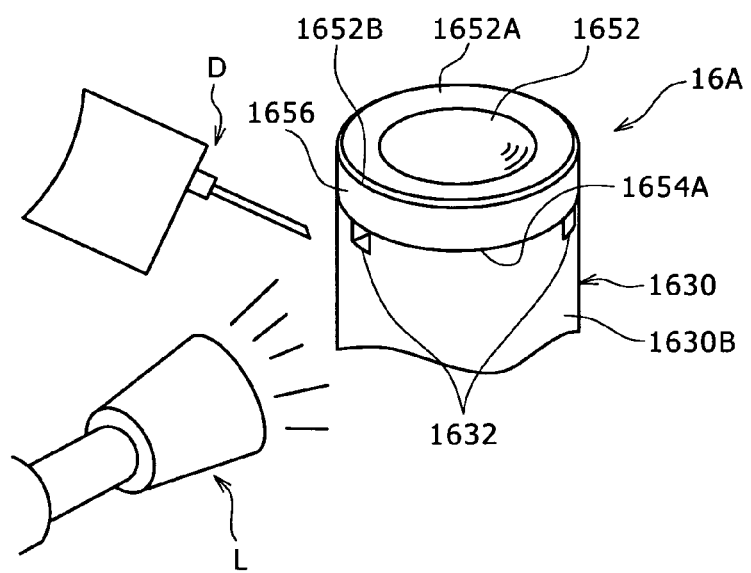
FIG. 58 is a view showing an assembly of the second lens group 16 and the second lens holder frame 1602.
Figure 59:
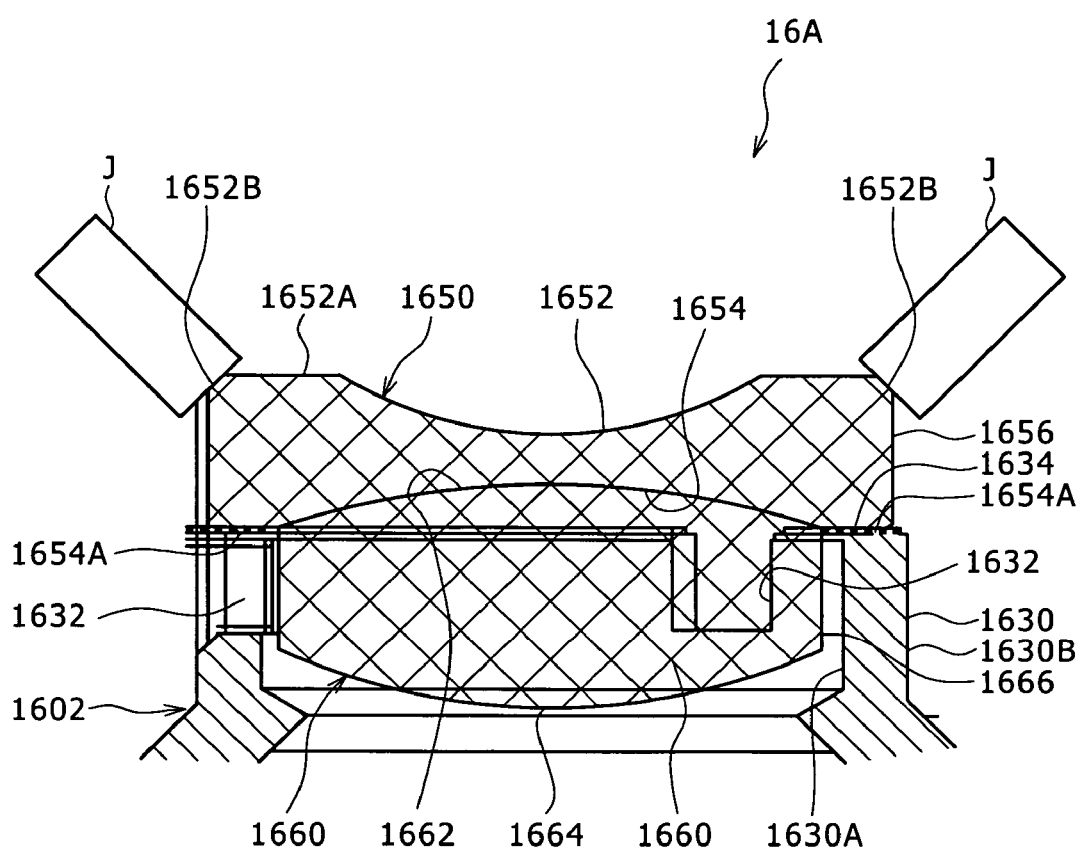
FIG. 59 is a view illustrative of an adjustment process for optical axis alignment of the second lens group 16.

FIG. 55 is a cross-sectional view of the second lens group 16 and the second lens holder frame 1602. FIG. 56 is a perspective view of the second lens holder frame 1602. FIGS. 57 and 58 are views showing how the second lens group 16 and the second lens holder frame 1602 are assembled. FIG. 59 is a view illustrative of an adjustment process for optical axis alignment of the second lens group 16.

First, the second lens group 16 will be described below.

As shown in FIG. 55, the second lens group 16 has a cemented lens 16A and a lens 16B.

The cemented lens 16A includes a concave lens 1650 and a convex lens 1660 having an outside diameter smaller than the concave lens 1650. The concave lens 1650 and the convex lens 1660 have their optical axes aligned with each other and have their confronting surfaces cemented together.

The concave lens 1650 has a first concave lens surface 1652 and a second concave lens surface 1654 positioned remotely from the first concave lens surface 1652 and cemented to the convex lens 1660. The concave lens 1650 has an outer cylindrical surface 1656.

The concave lens 1650 has annular end surfaces 1652A, 1654A disposed on the outer circumferences of the first and second lens surfaces 1652, 1654 and positioned radially outwardly of the convex lens 1660 that is cemented to the concave lens 1650. The end surfaces 1652A, 1654A extend on planes perpendicular to the optical axis of the concave lens 1650.

The end surface 1654A of the second lens surface 1654 faces a cylindrical surface 1666 of the convex lens 1660.

The end surface 1652A of the first lens surface 1652 has an outer edge beveled as an annular conical surface 1652B.

The convex lens 1660 has a first convex lens surface 1662 cemented to the concave lens 1650 and a second lens surface 1664 positioned remotely from the first lens surface 1662. The convex lens 1660 has an outer cylindrical surface 1666.

The lens 16B is separate from the cemented lens 16A. The lens 16B has a first planar lens surface 1672 confronting the convex lens 1660, a second convex lens surface 1674 positioned remotely from the first lens surface 1672, and an outer cylindrical circumferential surface 1676.

The second lend holder frame 1602 will be described below.

As shown in FIGS. 55 and 56, the annular plate 1606 of the second lend holder frame 1602 has a tubular wall 1630 disposed centrally which faces the image capturing unit 140 side and an annular wall 1640 which faces the subject side.

The tubular wall 1630 has an inner circumferential surface 1630A having an inside diameter greater than the outside diameter of the cylindrical surface 1666 of the convex lens 1660.

The tubular wall 1630 has an outer circumferential surface 1630B having an outside diameter which is substantially the same as the outside diameter of the cylindrical surface 1656 of the concave lens 1650.

The tubular wall 1630 has an annular distal end surface 1634 extending on a plane perpendicular to the axial direction (optical axial direction). In the present embodiment, the outside diameter of the distal end surface 1630 and the outside diameter of the end surface 1654A of the concave lens 1650 are of substantially the same dimension.

The tubular wall 1630 has a plurality of (three in the present embodiment) adhesive filling recesses 1632 defined radially therethrough at circumferentially spaced intervals. Each of the adhesive filling recesses 1632 is open at the distal end surface 1634. Stated otherwise, the adhesive filling recesses 1632 communicate with the outer circumferential surface 1630B of the tubular wall 1630 and are open at the distal end surface 1634.

The tubular wall 1640 has an inner circumferential surface 1640A having an inside diameter which is slightly greater than the outside diameter of the cylindrical surface 1676 of the lens 16B. The inner circumferential surface 1640A has a plurality of adhesive filling recesses 1642 defined therein at circumferentially spaced intervals. Each of the adhesive filling recesses 1642 is open at the distal end surface of the tubular wall 1640.

A process of assembling the second lens group 16 and the second lens holder frame 1602 together will be described below.

First, the lens 16B is inserted into the inner circumferential surface 1640A of the tubular wall 1640, and the adhesive filling recesses 1642 are filled with an ultraviolet-curable adhesive. Then, an ultraviolet radiation is applied to cure the ultraviolet-curable adhesive to secure the lens 16B to the tubular wall 1640, i.e., to fix the lens 16B to the second lens holder frame 1602.

Then, the second lens holder frame 1602 is fixedly mounted on an adjustment jig, not shown. As shown in FIG. 57, the convex lens 1660 of the cemented lens 16A is oriented to face the inner circumferential surface 1630A of the tubular wall 1630 of the second lens holder frame 1602, and then inserted into the inner circumferential surface 1630A of the tubular wall 1630 until the end surface 1654A of the second lens surface 1654 is placed on the distal end surface 1634 of the tubular wall 1630.

At this time, an annular gap is defined between the outer circumferential surface 1630B of the convex lens 1660 and the inner circumferential surface 1630A of the tubular wall 1630.

Then, as shown in FIG. 59, pins J of the adjustment jig are held against respective three circumferentially spaced areas of the conical surface 1652B of the cemented lens 16A to hold the end surface 1654A of the second lens surface 1654 against the distal end surface 1634 of the tubular wall 1630. The projecting distances of the pins J are then controlled to move the cemented lens 16A in a direction perpendicular to the optical axis thereof, thereby bringing the optical axis of the cemented lens 16A into alignment with the optical axis of the lens 16B.

When the optical axis of the cemented lens 16A and the optical axis of the lens 16A are aligned with each other, as shown in FIG. 58, the needle of an adhesive dispenser D fills the adhesive filling recesses 1632 with the ultraviolet-curable adhesive. In the adhesive filling recesses 1632, the ultraviolet-curable adhesive is applied to the end surface 1654A of the second lens surface 1654.

Then, an ultraviolet lamp L applies an ultraviolet radiation to the ultraviolet-curable adhesive in the adhesive filling recesses 1632, thereby curing the ultraviolet-curable adhesive. The end surface 1654A of the second lens surface 1654 is now attached and fixed to the distal end surface 1634 of the tubular wall 1630.

With the above arrangement, the outer circumferential surface of the convex lens 1660 includes the cylindrical surface 1666 having a diameter smaller that the outside diameter of the concave lens 1650, and the concave lens 1650 has the annular end surface 1654A positioned radially outwardly of the convex lens 1660 and facing the outer circumferential surface of the convex lens 1660. The second lens holder frame 1602 has the projecting tubular wall 1630 having the inner circumferential surface 1630A whose diameter is greater than the outside diameter of the tubular surface 1666 of the convex lens 1660. The tubular wall 1630 has the adhesive filling recesses 1632 defined at spaced intervals in the circumferential direction of the tubular wall 1603, the adhesive filling recesses 1632 communicating with the outer circumferential surface 1630B of the tubular wall 1630 and being open at the distal end 1634 of the tubular wall 1630. The convex lens 1660 of the cemented lens 16A is inserted into the tubular wall 1630, the annular end surface 1654A of the concave lens 1650 is held against the distal end surface 134 of the tubular wall 1630, and the annular end surface 1654A is attached to the tubular wall 1630 by the adhesive filled in the adhesive filling recesses 1632.

Therefore, the space extending fully along the circumferential and axial directions of the outer circumferential portion of the concave lens 1650 of the cemented lens 16A is open and is not occupied by the tubular wall 1630 of the second lens holder frame 1602. Other members and parts of the lens barrel 10 (e.g., the electrical assembly 19 shown in FIG. 44) can be placed in that space. The arrangement is thus advantageous in reducing the outside dimensions (the diametrical dimension and the dimension along the optical axis) of the lens barrel 10 and also in reducing the size of the image capturing unit 100.

The outside diameter of the distal end surface 1630 of the tubular wall 1630 and the outside diameter of the end surface 1654A of the concave lens 1650 are substantially equal to each other. This structure is advantageous in keeping an area where the distal end surface 1630 of the tubular wall 1630 and the end surface 1654A of the concave lens 1650 are superposed on each other, and also in achieving the bonding strength between the concave lens 1650 and the tubular wall 1630, i.e., the bonding strength between the cemented lens 16A and the second lens holder frame 1602.

The first lens holder frame 1402 which holds the first lens group 14 will be described below.

Figure 60:
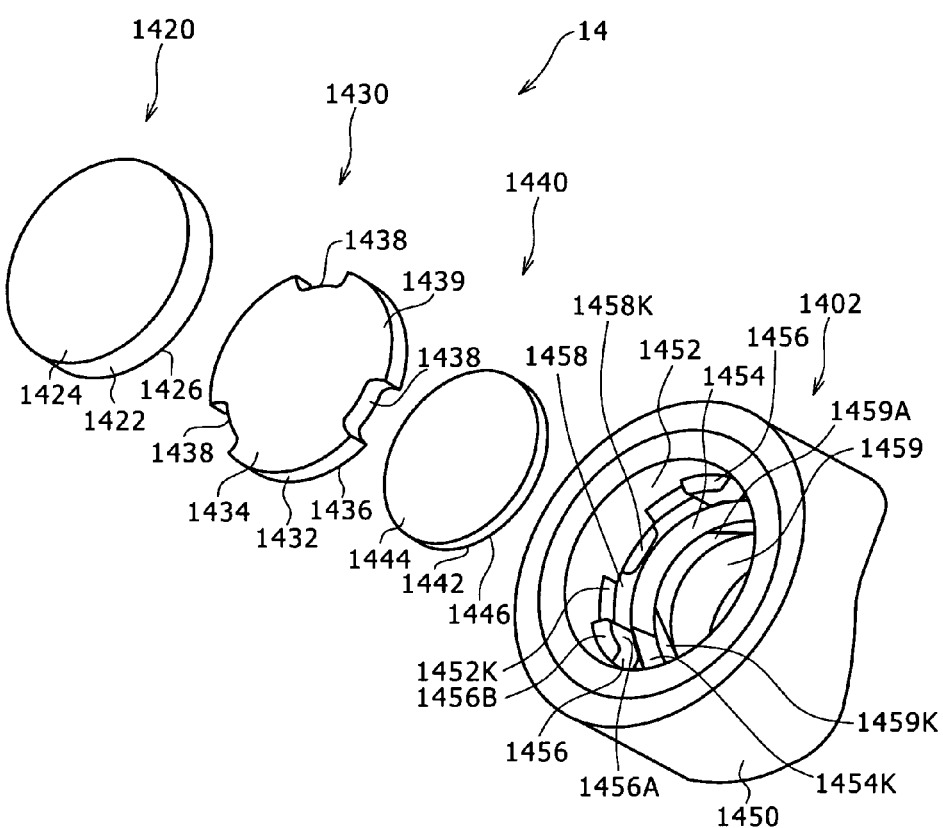
FIG. 60 is an exploded perspective view of a first lens holder frame 1402 with a first lens group 14 assembled therein.
Figure 61:
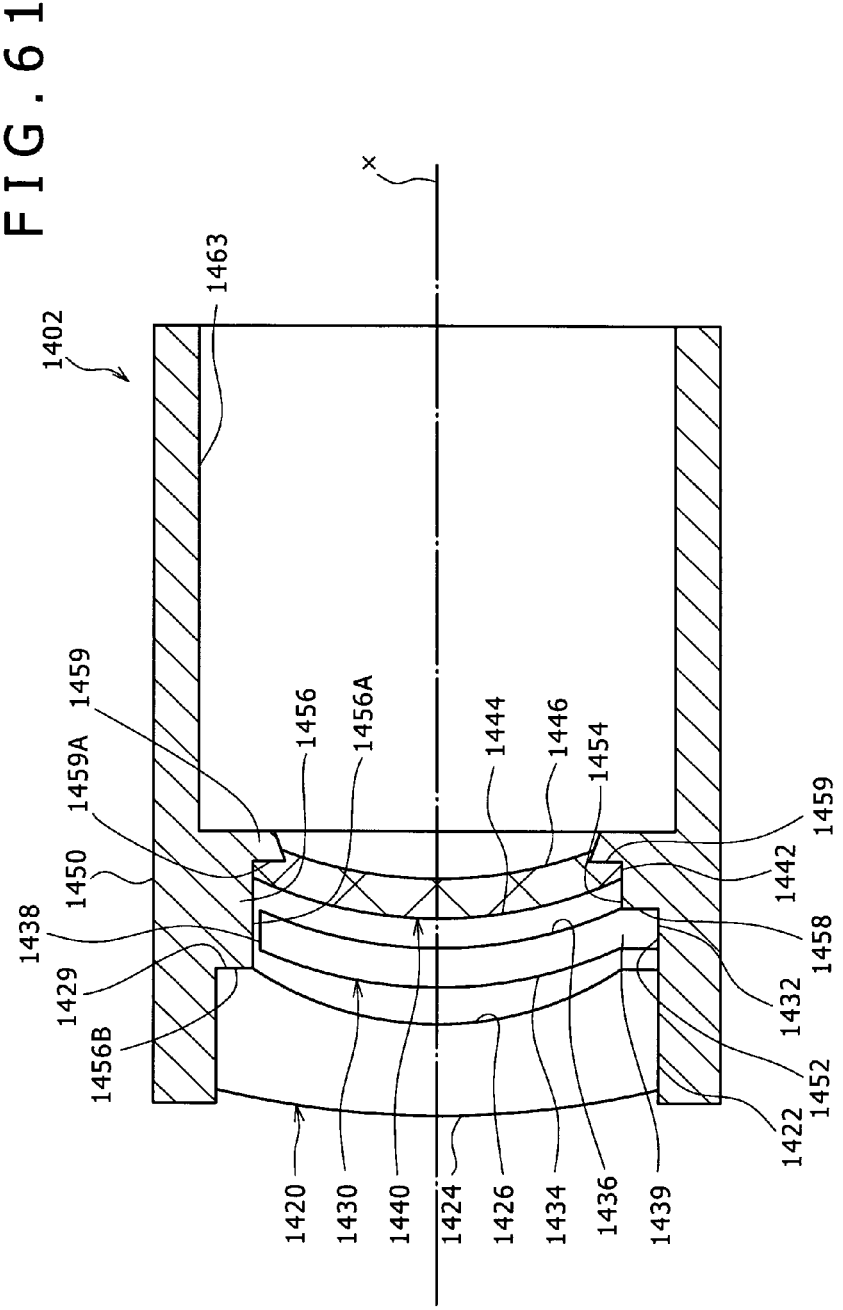
FIG. 61 is a cross-sectional view of the first lens holder frame 1402 with the first lens group 14 assembled therein.

FIG. 60 is an exploded perspective view of the first lens holder frame 1402 with the first lens group 14 assembled therein, and FIG. 61 is a cross-sectional view of the first lens holder frame 1402 with the first lens group 14 assembled therein.

First, the first lens group 14 will be described below.

As shown in FIGS. 60 and 61, the first lens group 14 includes a front lens 1420, a middle lens 1430, and a rear lens 1440 which are arrayed in the optical axis direction in axial alignment and held by the first lens holder frame 1402.

Specifically, the front lens 1420, the middle lens 1430, and the rear lens 1440 are arranged in the order named from the front to the rear in the optical axis direction.

The front lens 1420 has a front convex surface 1424 facing forwardly in the optical axis direction and a rear concave surface 1426 facing rearwardly in the optical axis direction. The front lens 1420 has a second outer circumferential surface 1422 as a cylindrical surface.

In the present embodiment, the rear surface 1426 of the front lens 1420 has an outer circumferential portion serving as an annular abutment surface 1429 which is a flat surface perpendicular to the optical axis.

The middle lens 1430 has a front convex surface 1434 facing forwardly in the optical axis direction and a rear concave surface 1436 facing rearwardly in the optical axis direction.

The middle lens 1430 has a first outer circumferential surface 1432 as a cylindrical surface. The first outer circumferential surface 1432 has an outside diameter slightly smaller than the outside diameter of the second outer circumferential surface 1422 of the front lens 1420.

The middle lens 1430 has a plurality of recesses 1438 defined in the first outer circumferential surface 1432 at circumferentially equally spaced intervals along the first outer circumferential surface 1432. The recesses 1438 are open radially outwardly of the middle lens 1430 and have a sectorial shape extending circumferentially. The recesses 1438 extend transversely through the middle lens 1430. In the present embodiment, there provided three recesses 1438.

In the present invention, the middle lens 1430 has an outer circumferential portion constructed as an annular plate 1439 having a uniform thickness and surfaces facing forwardly and rearwardly in the optical axis direction and extending perpendicularly to the optical axis. The recesses 1438 are defined in the annular plate 1439. The rear surface 1436 of the annular plate 1439, which serves as the rear surface 1436 of the middle lens 1430, is used as an abutment surface of the middle lens 1430.

The rear lens 1440 has a front convex surface 1444 facing forwardly in the optical axis direction and a rear concave surface 1446 facing rearwardly in the optical axis direction.

In the present embodiment, the rear surface 1446 of the rear lens 1440 has an outer circumferential portion serving as an annular abutment surface 1449 which is a flat surface perpendicular to the optical axis.

The rear lens 1440 has a third outer circumferential surface 1442 as a cylindrical surface. The third outer circumferential surface 1442 has an outside diameter smaller than both the outside diameter of the second outer circumferential surface 1422 of the front lens 1420 and the outside diameter of the first outer circumferential surface 1432 of the middle lens 1430.

The first lens holder frame 1402 will be described below.

As shown in FIGS. 60 and 61, the first lens holder frame 1402 has a tubular wall portion 1450 in the form of a hollow cylinder holding the front lens 1420, the middle lens 1430, and the rear lens 1440.

The tubular wall portion 1450 has a first inner circumferential surface 1452, a second inner circumferential surface 1454, and protruding walls 1456.

Specifically, the first inner circumferential surface 1452, the protruding walls 1456, and the second inner circumferential surface 1454 are arranged in the order named from the front to the rear in the optical axis direction. The tubular wall portion 1450 includes a tubular wall 1463 projecting rearwardly from a rear end thereof.

The first inner circumferential surface 1452 has such an inside diameter and a width (a length in the optical axis direction) which allow the front lens 1420 and the middle lens 1430 to be inserted therein.

The second inner circumferential surface 1454 is disposed rearwardly of the first inner circumferential surface 1452.

The second inner circumferential surface 1454 has an inside diameter smaller than the inside diameter of the first inner circumferential surface 1452. The second inner circumferential surface 1454 has such an inside diameter and a width (a length in the optical axis direction) which allow itself to engage the outer circumferential surface 1442 of the rear lens 1440.

The protruding walls 1456 protrude radially inwardly from the first inner circumferential surface 1452 at a plurality of (three in the present embodiment) locations spaced in the circumferential direction of the first inner circumferential surface 1452 near the second inner circumferential surface 1454, the protruding walls 1456 having a sectorial shape extending circumferentially. The protruding walls 1456 are shaped so as to be inserted into the recesses 1438 in the middle lens 1430.

According to the present embodiment, each of the protruding walls 1456 projects from the boundary between the first inner circumferential surface 1452 and the second inner circumferential surface 1454 toward the first inner circumferential surface 1452 side. Each of the protruding walls 1456 has a radially inner region disposed on a cylindrical surface 1456A that lies flush with the second inner circumferential surface 1454.

Arcuate end surfaces 1458 are disposed at the boundary between the first inner circumferential surface 1452 and the second inner circumferential surface 1454. Each of the arcuate end surfaces 1458 extends arcuately on a plane perpendicular to the optical axis except for the protruding wall 1456 in facing relation to the first inner circumferential surface 1452.

The length of the protruding wall 1456 along the optical axis direction from the arcuate end surface 1458 is greater than the thickness of the annular plate 1439 of the middle lens 1430 which as the recesses 1438.

One of the opposite surfaces (front surface) of each of the protruding walls 1456 in the optical axis direction is provided as a flat abutment surface 1456B extending on a plane perpendicular to the optical axis. In the present embodiment, since each of the protruding walls 1456 projects from the boundary between the first inner circumferential surface 1452 and the second inner circumferential surface 1454 toward the first inner circumferential surface 1452 side, the protruding wall 1456 has only a surface facing forwardly in the optical axis direction, and this surface serves as the abutment surface 1456B.

An abutment step portion 1459 is disposed at the rear end of the second inner circumferential surface 1454 and projects radially inwardly of the second inner circumferential surface 1454. The abutment step portion 1459 has a surface facing the second inner circumferential surface 1454 and serving as an annular abutment surface 1459A extending on a plane perpendicular to the optical axis.

As shown in FIG. 60, the tubular wall portion 1450 has a plurality of flat optical restrictive surfaces for increasing the accuracy with which to position the middle lens 1430 and the front lens 1420 in the optical axis direction and directions perpendicular to the optical axis direction.

Specifically, the optical restrictive surfaces include flat optical restrictive surfaces 1452K disposed at a plurality of locations spaced at equal intervals in the circumferential direction of the first inner circumferential surface 1452 for abutment against the outer circumferential surface 1432 of the middle lens 1430, flat optical restrictive surfaces 1458K disposed at a plurality of locations spaced at equal intervals in the circumferential direction of the arcuate end surface 1458 for abutment against the rear surface 1436 of the middle lens 1430 (the rear surface 1436 of the annular plate 1439), flat optical restrictive surfaces 1454K disposed at a plurality of locations spaced at equal intervals in the circumferential direction of the second inner circumferential surface 1454 for abutment against the outer circumferential surface 1442 of the rear lens 1440, and flat optical restrictive surfaces 1459K disposed at a plurality of locations spaced at equal intervals in the circumferential direction of the abutment surface 1459A for abutment against the rear surface 1446 (the abutment surface 1449).

A process of assembling the first lens group 14 and the first lens holder frame 1402 together will be described below.

First, an ultraviolet-curable adhesive is applied to the abutment surface 1459A of the abutment step portion 1459.

Then, the rear lens 1440 with its rear surface 1446 facing rearwardly is inserted into the tubular wall portion 1650. The third outer circumferential surface 1442 is brought into engagement with the second inner circumferential surface 1454, and the rear surface 1446 is held against the abutment surface 1459A (more specifically, the abutment surface 1449 is held against the optical restrictive surfaces 1459K), thereby placing the rear lens 1440 in the tubular wall portion 1450.

Then, an ultraviolet radiation is applied to the adhesive-coated areas of the abutment surface 1459A, curing the ultraviolet-curable adhesive to secure the rear lens 1440 to the tubular wall portion 1450, i.e., to secure the rear lens 1440 to the first lens holder frame 1402.

Then, an ultraviolet-curable adhesive is applied to each of the arcuate end surfaces 1458.

Then, the middle lens 1430 with its rear surface 1436 facing rearwardly is inserted into the tubular wall portion 1650. The protruding walls 1456 are placed in the respective recesses 1438, the first outer circumferential surface 1432 is brought into engagement with the second inner circumferential surface 1454, and the rear surface 1436 of the annular plate 1439 is held against the arcuate end surfaces 1458 (more specifically, the rear surface 1436 serving as an abutment surface is held against the optical restrictive surfaces 1458K), thereby placing the middle lens 1430 in the tubular wall portion 1450.

Then, an ultraviolet radiation is applied to the adhesive-coated areas of the arcuate end surfaces 1458, curing the ultraviolet-curable adhesive to secure the middle lens 1430 to the tubular wall portion 1450, i.e., to secure the middle lens 1430 to the first lens holder frame 1402.

The rear lens 1440 and the middle lens 1430 are fixed to the first lens holder frame 1402 while their optical axes are being aligned with each other by the optical restrictive surfaces 1454K, 1452K.

Then, an ultraviolet-curable adhesive is applied to the abutment surface 1456B of each of the protruding walls 1456.

Then, the front lens 1420 with its rear surface 1426 facing rearwardly is inserted into the tubular wall portion 1650. The rear surface 1426 of the front lens 1420 is held against the abutment surfaces 1456B of the protruding walls 1456 which face forwardly through the recesses 1438 (more specifically, the abutment surface 1429 of the front lens 1420 is held against the abutment surfaces 1456B). Using an adjustment jig, not shown, the front lens 1420 is moved in directions perpendicular to the optical axis to bring the optical axis of the front lens 1420 into alignment with the optical axes of the rear lens 1440 and the middle lens 1430.

When the coaxial alignment is completed, an ultraviolet radiation is applied to adhesive-coated areas of the arcuate end surfaces 1458, curing the ultraviolet-curable adhesive to secure the front lens 1420 to the tubular wall portion 1450, i.e., to secure the front lens 1420 to the first lens holder frame 1402.

Though the adhesive is first applied, then the lens is inserted, and thereafter the adhesive is cured in the above description, the lens may first be inserted and then the adhesive may be applied.

With the above arrangement, the outer circumferential surface 1432 of the middle lens 1430 engages the first inner circumferential surface 1452 (the optical restrictive surfaces), and the rear surface 1426 (the abutment surface 1429) of the front lens 1420 is held against the abutment surfaces 1456B, which face forwardly, of the protruding walls 1456 that are placed in the recesses 1438 in the middle lens 1430, thereby placing both the middle lens 1430 and the front lens 1420 in the tubular wall portion 1450.

Therefore, the outside diameters of the middle lens 1430 and the front lens 1420 do not need to be different from each other and abutment surfaces having diameters corresponding to the outside diameters of these lenses do not need to be provided in the lens holder frame, resulting in an advantage in reducing the outside diameter of the first lens holder frame 1402.

The middle lens 1430 is positioned when the outer circumferential surface 1432 thereof engages the first inner circumferential surface 1452 (the optical restrictive surfaces 1452K)

of the tubular wall portion 1450, and the front lens 1420 is positioned when the abutment surface 1429 thereof is held against the abutment surfaces 1456B of the protruding walls 1456 of the tubular wall portion 1450, resulting in a greater advantage in achieving the positional accuracy of the lenses than if one of the two lenses is positioned by being held against the other lens as with the prior art 2.

Therefore, there are provided advantages in reducing the sizes of the lens barrel 10 and the image capturing device 100 and increasing the positional accuracy of the lenses.

The linear motor 40 will be described below.

Figure 66:
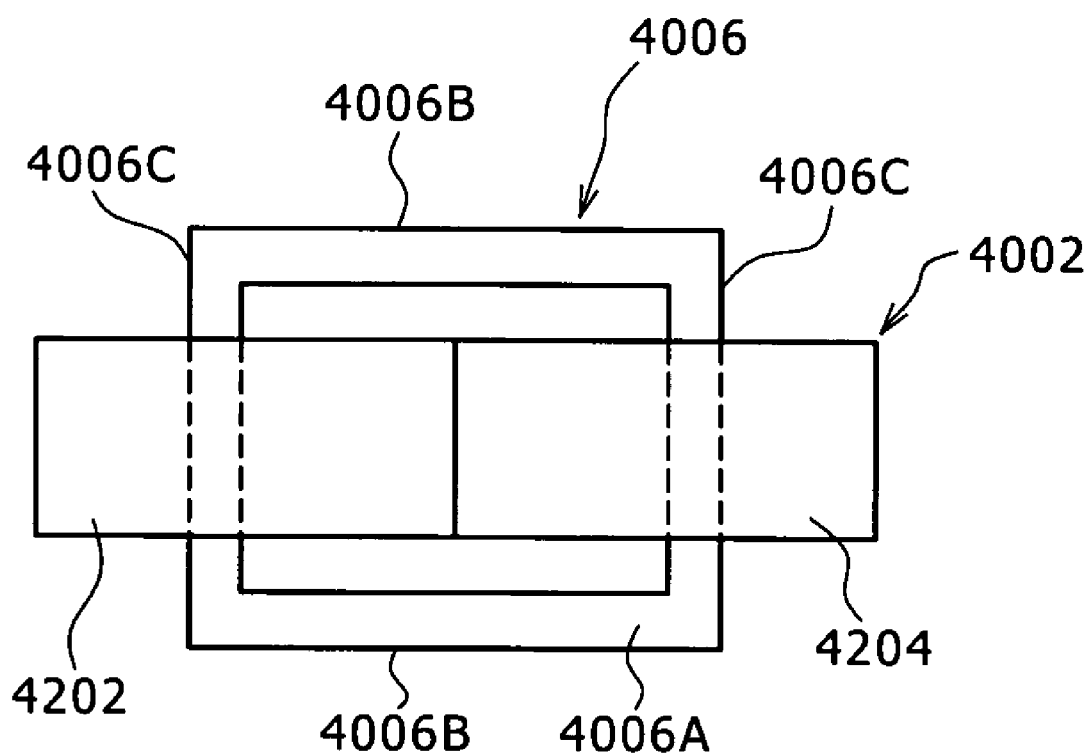
FIG. 66 is a view of an actuating magnet 4002 and a coil 4006 as viewed in the direction indicated by the arrow X in FIG. 38.

FIG. 66 is a view of the actuating magnet 4002 and the coil 4006 as viewed in the direction indicated by the arrow X in FIG. 38.

As shown in FIGS. 37, 38, and 66, the actuating magnet 4002 has a magnetic pole surface 42 extending in a direction parallel to the optical axis of the third lens group 18. The magnetic pole surface 42 has two different magnetic poles, i.e., an N pole 4202 and an S pole 4204, arrayed along the direction in which the magnetic pole surface 42 extends.

The back yoke 4004 is mounted on a surface 44 of the actuating magnet 4002 opposite to the magnetic pole surface 42 for enabling lines of magnetic force radiated from the magnetic pole surface 42 reach the coil 4006 efficiently.

Specifically, the actuating magnet 4002 is of a rectangular shape which is elongate in the optical axis direction. The actuating magnet 4002 is constructed as a flat magnet of a rectangular shape having a length extending in the optical axis direction, a width smaller than the length, and a height smaller than the width, the flat magnet being elongate in the optical axis direction and having a small thickness in a direction perpendicular to the optical axis.

The magnetic pole surface 42 is constructed as an elongate rectangular surface of the flat magnet which has the length and the width described above.

As shown in FIGS. 37 and 38, the actuating magnet 4002 is disposed such that a hypothetical line perpendicular to the optical axis crosses the magnetic pole surface 42 at a right angle.

In the present embodiment, the third lens group 18 is of a rectangular shape as viewed from the optical axis direction, and the actuating magnet 4002 is disposed such that the magnetic pole surface 42 lies parallel to one of the sides of the rectangular third lens group 18 as viewed from the optical axis direction.

As shown in FIGS. 37, 38, and 66, the coil 4006 is disposed such that it has a winding disposed around the axis perpendicular to the magnetic pole surface 42 and having a winding end surface 4006A (the coil 4006 facing one of the end surface in axis direction) facing the magnetic pole surface 42.

The flat coil has a winding height smaller than the size of the contour of the winding end surface 4006A and a small height in a direction perpendicular to the magnetic pole surface 42.

In greater detail, the coil 4006 includes a flat coil having its winding shaped as a rectangular frame. The flat coil has a winding height smaller than longer sides 4006B and shorter sides 4006C of the rectangular frame, and a small height in a direction perpendicular to the magnetic pole surface 42.

Operation of the linear motor 40 will be described below.

When the controller 124 supplies a drive current to the coil 4006, the coil 4006 generates a magnetic field depending on the direction of the drive current.

The magnetic field generated by the coil 4006 and the magnetic field generated by the magnetic pole surface 42 of the magnet 4002 magnetically interact to produce a drive force forwardly or rearwardly in the optical axis direction with respect to the coil 4006 according to the Fleming's left-hand law.

In greater detail, as shown in FIG. 66, the drive force is generated by the magnetic interaction between the magnetic field generated by the two shorter sides 4006C of the coil 4006 and the magnetic field generated by the N pole 4202 and the S pole 4204 of the magnetic pole surface 42.

The third lens holder frame 1802 is now moved forwardly or rearwardly in the optical axis direction.

With the above arrangement, the linear motor 40 has the coil 4006 mounted on the third lens holder frame 18, the actuating magnet 4002 mounted on the base 12, and the current supply means for supplying the drive current to the coil 4006. The actuating magnet 4002 has the magnetic pole surface 42 extending in the direction parallel to the optical axis of the third lens group 18. The magnetic pole surface 42 has the two different magnetic poles 4202, 4204 arranged along the direction in which the magnetic pole surface 42 extends. The coil 4006 is disposed such that it has its winding disposed around the axis perpendicular to the magnetic pole surface 42 and having its winding end surface 4006A facing the magnetic pole surface 42.

Consequently, the space that is occupied in the lens barrel 10 by the coil 4006 and the actuating magnet 4002 of the linear motor 40 is smaller than in a rotary motor, and any dead space in the lens barrel 10 is small. Since the actuating mechanism does not have a male screw member, a support member, and a female screw member, the space occupied by the actuating mechanism is reduced. Therefore, the arrangement is advantageous in reducing the sizes of the lens barrel and the image capturing device and also in achieving the freedom of the layout of parts and members.

In the present invention, the third lens group 18 is of a rectangular shape as viewed in the optical axis direction, and the actuating magnet 4002 is disposed such that the magnetic pole surface 42 lies parallel to one of the sides of the rectangular third lens group 18 as viewed in the optical axis direction. Accordingly, the actuating magnet 4002 can be positioned closely to the optical axis, resulting in an advantage in reducing the outside diameter of the lens barrel.

The actuating magnet 4002 is constructed as a flat magnet of a rectangular shape having a length extending in the optical axis direction, a width smaller than the length, and a height smaller than the width, the flat magnet being elongate in the optical axis direction and having a small thickness. The coil 4006 includes a flat coil having a winding end surface 4006A, and the flat coil has a winding height smaller than the size of the contour of the winding end surface 4006A and a small height in a direction perpendicular to the magnetic pole surface 42. Therefore, the space occupied in the lens barrel 10 by the actuating magnet 4002 and the coil 4006 is reduced.

The actuating magnet 4002 is disposed such that a hypothetical line perpendicular to the optical axis crosses the magnetic pole surface 42 at a right angle. Therefore, the vertical direction of the actuating magnet 4002 and the vertical direction of the coil 4006 can be substantially aligned with the radial direction of the lens barrel 10, resulting in an advantage in reducing the space occupied radially in the lens barrel 10 by the actuating magnet 4002 and the coil 4006.

The guide shaft holder 1220 and the magnet holder 1222 are integrally formed with the base 12, resulting in advantages in reducing the number of parts used and also reducing the occupied space.

The actuating magnet 4002, the Hall device 7002, the position detecting magnet 7004, and the metal plate 74 which are essential features of the present invention will be described below.

Figure 67:
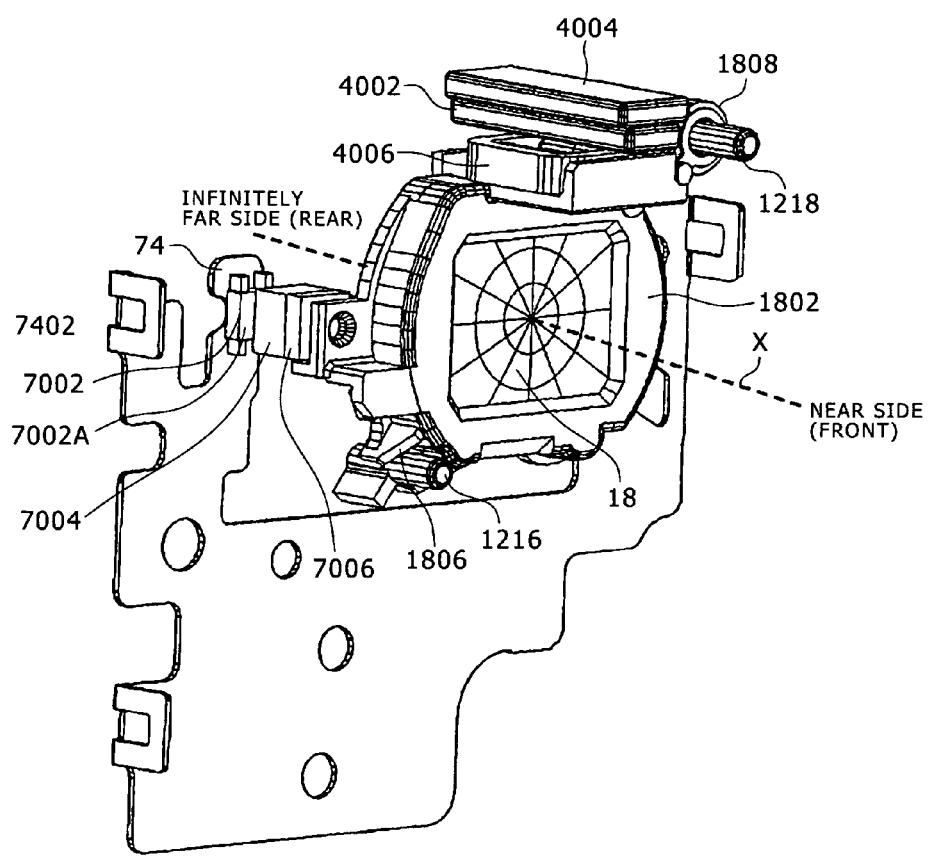
FIG. 67 is a perspective view of a metal plate 74 and a third lens holding fame 1802, as viewed obliquely from front.
Figure 68:
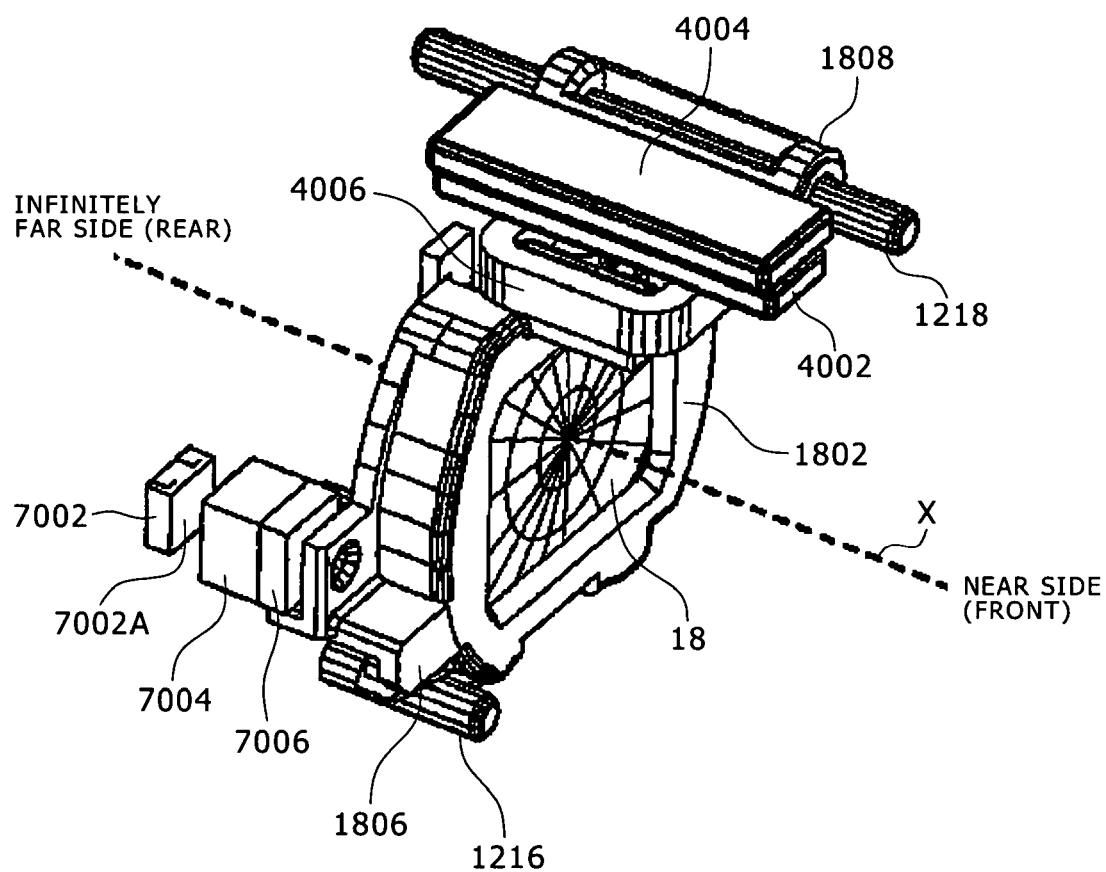
FIG. 68 is a perspective view of the metal plate 74 and the third lens holding fame 1802, as viewed obliquely from front.
Figure 69A:
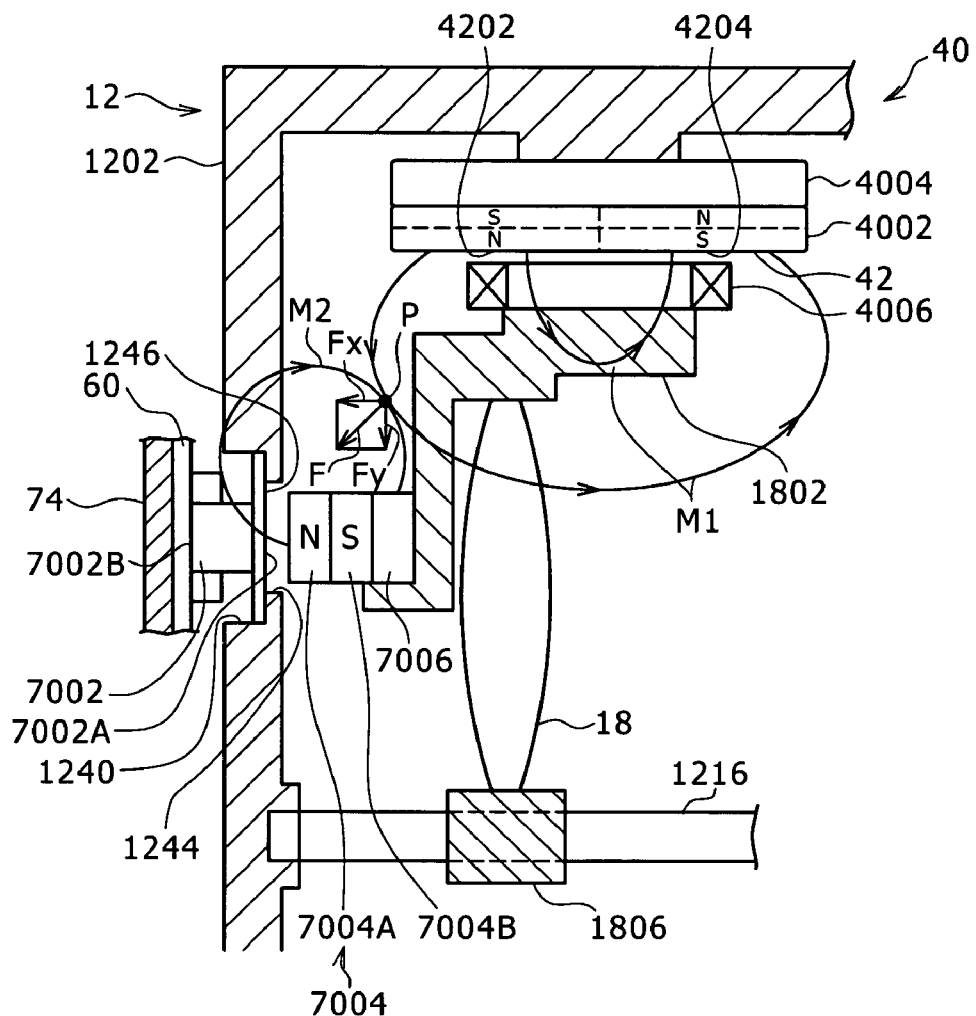
FIG. 69A is a view illustrative of magnetic fields produced by the actuating magnet 4002 and the position detecting magnet 7002.

FIGS. 67 and 68 are perspective views of the metal plate 74 and the third lens holding fame 1802, as viewed obliquely from front. FIG. 69A is a view illustrative of magnetic fields produced by the actuating magnet 4002 and the position detecting magnet 7002. FIG. 49B is an enlarged partial view of FIG. 69A. (A) of FIG. 70 is a side elevational view of the actuating magnet 4002 and the yoke 4004, (B) is a view as viewed in the direction indicated by the arrow B in (A), and (C) is a view as viewed in the direction indicated by the arrow C in (B). FIG. 71 is a cross-sectional view of the position detecting mechanism 70.

As shown in FIGS. 67, 68, and 70, the actuating magnet 4002 has the magnetic pole surface 42 extending in the direction parallel to the optical axis of the third lens group 18. The magnetic pole surface 42 has the two different magnetic poles, i.e., the N pole 4202 and the S pole 4204, arrayed along the direction in which the magnetic pole surface 42 extends. The back yoke 4004 is mounted on the surface of the actuating magnet 4002 opposite to the magnetic pole surface 42.

More specifically, as shown in FIGS. 69A and 70, the portion of the magnetic pole surface 42 of the actuating magnet 4006 which is closer to the image capturing unit 140 side in the optical axis direction (closer to the rear in the optical axis direction) is magnetized into the N pole 4202, and the portion of the magnetic pole surface 42 which is closer to the subject in the optical axis direction (closer to the front in the optical axis direction) is magnetized into the S pole 4204.

As shown in FIG. 69A, the magnetic circuit provided by the actuating magnet 4002 and the back yoke 4004 is not closed, and the magnetic circuit generates a first flux line M1 spreading from the magnetic pole surface 42 of the actuating magnet 4002.

Since the linear motor 40 includes a flat linear motor with its magnetic circuit being open, a magnetic field is generated around the linear motor 40.

As shown in FIGS. 67 and 68, the position detecting magnet 7004 is mounted on the third lens holder frame 1802 by the back yoke 7006. The position detecting magnet 7004 includes a magnet which is small in size and light in weight and which is capable of producing an intensive magnetic field, such as a neodymium magnet (Nd—Fe—B magnet).

As shown in FIG. 69A, the position detecting magnet 7004 has a surface facing the image capturing unit 140 side (a surface facing rearwardly in the optical axis direction), magnetized into an N pole 7004A, and a surface facing the subject (a surface facing forwardly in the optical axis direction), magnetized into an S pole 7004B.

The magnetic circuit provided by the position detecting magnet 7004 and the back yoke 7006 is not closed, and the magnetic circuit generates a second flux line M2 spreading between the N pole 7004A of the position detecting magnet 7004 and the back yoke 7006.

In the present example, the center of the magnetic field generated by the actuating magnet 4006 (the boundary between the N pole 4202 and the S pole 4204) and the center of the magnetic field generated by the position detecting magnet 7004 (the boundary between the N pole 7004A and the S pole 7004B) are spaced from each other in a direction parallel to the optical axis.

As shown in FIG. 71, the Hall device 7002 is disposed in the attachment recess 1240 defined in the wall portion of the base 12 with the magnetosensitive surface 7002A facing the position detecting magnet 7004. The hall device 7002 detects a magnetic force generated by the magnetic poles of the position detecting magnet 7004 through the magnetosensitive surface 7002A, and generates a detected signal having a magnitude depending on the intensity of the magnetic force.

More specifically, the through hole 1244 is defined in the wall portion of the base 12 through which the straight line extending parallel to the optical axis through the position detecting magnet 7004 passes, and the thin plate 1246 made of a nonmagnetic material (a metal such as phosphorbronze) is disposed in the through hole 1244 to close the through hole 1244 near the position detecting magnet 7004. In the present example, the through hole 1244 and the thin plate 1246 provide the attachment recess 1240 defined in the wall portion of the base 12 through which the straight line extending parallel to the optical axis through the position detecting magnet 7004 passes, the attachment recess 1240 being open in the direction away from the position detecting magnet 7004.

The Hall device 7002 is held in place by the metal plate 74 that is mounted on the base 12 and pressed through the main flexible board 60 against the rear surface 7002B of the Hall device 7002, which is opposite to the magnetosensitive surface 7002A, thereby holding the magnetosensitive surface 7002A against the thin plate 1246.

The metal plate 74 is made of a metal material including a weak magnetic material (a weak magnetic body), e.g., stainless steel SUS 303 or SUS 304. Since the metal plate 74 is of a weak magnetic material, it does not produce a magnetic force by itself, but can be attracted by a magnetic force.

Operation and advantages will be described below.

As shown in FIG. 69A, the portion of the magnetic pole surface 42 of the actuating magnet 4006 which is closer to the image capturing unit 140 side in the optical axis direction (closer to the rear in the optical axis direction) is magnetized into the N pole 4202, and the portion of the magnetic pole surface 42 which is closer to the subject side in the optical axis direction (closer to the front in the optical axis direction) is magnetized into the S pole 4204. The position detecting magnet 7004 has the surface facing the image capturing unit 140 side (the surface facing rearwardly in the optical axis direction), magnetized into the N pole 7004A, and the surface facing the subject side (the surface facing forwardly in the optical axis direction), magnetized into an S pole 7004B.

Consequently, as shown in FIG. 69A, the first flux line M1 and the second flux line M2 are oriented in the same direction at a magnetic interference point P where the first flux line M1 generated by the actuating magnet 4006 and the second flux line M2 generated by the position detecting magnet 7004 cross each other.

If the first flux line M1 and the second flux line M2 are oriented in the same direction at the magnetic interference point P, then a magnetic reactive force F acts between the actuating magnet 4006 and the position detecting magnet 7004 in a direction to keep them apart from each other.

Figure 69B:
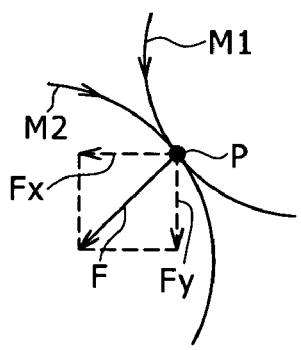
FIG. 69B is an enlarged partial view of FIG. 69A.

In the present example, since the center of the actuating magnet 4006 and the center of the position detecting magnet 7004 are spaced from each other in the direction parallel to the optical axis as shown in FIGS. 69A and 69B, the position detecting magnet 7004 undergoes a force applied due to the magnetic reactive force F in a direction inclined to the optical axis.

Because the position detecting magnet 7004 is mounted on the third lens holder frame 1802 and the third lens holder frame 1802 is supported for movement in the optical axis direction, a component force Fx of the magnetic reactive force F which acts in a direction parallel to the optical axis acts on the third lens holder frame 1802. Stated otherwise, the third lens holder frame 1802 is normally urged rearwardly in the optical axis direction (a direction toward the image capturing unit 140).

Therefore, when the coil 4006 is supplied with a drive current to move the third lens holder frame 1802 rearwardly in the optical axis direction, the force Fx, in addition to the actuating force from the linear motor 40, is applied to the third lens holder frame 1802, thereby accelerating the third lens holder frame 1802.

As described above, the third lens group 18 held by the third lens holder frame 1802 includes a focusing lens (focus adjusting lens), and adjusts the focus when moved in the optical axis direction. The focus is adjusted by moving the third lens group 18 to make the edge of the subject image captured by the image capturing unit 140 sharpest.

The focus adjustment is performed by moving the third lens group 18 to a near end which is the forward limit position in the optical axis direction and then moving the third lens group 18 toward an infinite far end which is the rearward limit position in the optical axis direction.

Therefore, when the third lens group 18 is moved for focus adjustment, since the third lens group 18 is accelerated by the magnetic reactive force F, the focus adjustment is performed quickly, resulting in an advantage in increasing the efficiency with which to capture images.

In the present embodiment, as the metal plate 74 mounted on the base 12 is attractable by a magnetic force, the position detecting magnet 7004 undergoes an attractive force from the metal plate 74.

Since the position detecting magnet 7004 is mounted on the third lens holder frame 1802 and the third lens holder frame 1802 is supported for movement in the optical axis direction, the attractive force from the metal plate 74 acts on the third lens holder frame 1802. Stated otherwise, the third lens holder frame 1802 is normally urged rearwardly in the optical axis direction (the direction toward the image capturing unit 140).

Therefore, when the coil 4006 is supplied with a drive current to move the third lens holder frame 1802 rearwardly in the optical axis direction, the attractive force, in addition to the actuating force from the linear motor 40, is applied to the third lens holder frame 1802, thereby accelerating the third lens holder frame 1802.

Inasmuch as the third lens group 18 is accelerated by the attractive force, the focus adjustment is performed quickly without the need for an increased size and an increased power consumption of the linear motor 40, resulting in an advantage in increasing the efficiency with which to capture images.

In the present example, the Hall device 7002 is pressed by the metal plate 74 against the thin plate 1246 mounted in the through hole 1244 defined in the wall portion of the base 12. However, as shown in FIG. 64, even if the Hall device 7002 is pressed by the metal plate 74 against the bottom wall 1241 (thin wall portion) of the attachment recess 1240 defined in the wall portion of the base 12, the attractive force from the metal plate 74 acts on the position detecting magnet 7004.

In this case, therefore, the attractive force accelerates the third lens group 18 to enable the third lens group 18 to perform quick focus adjustment, resulting in an advantage in increasing the efficiency with which to capture images.

With the lens barrel according to the present embodiment, the focusing lens moves in a direction toward the image capturing unit until the image is focused, and when the image is focused, the focusing lens stops moving, and an image capturing mode is initiated.

If the focusing lens moves faster, then the image is focused in a shorter period of time. There is also a focusing system wherein the focusing lens moves in a direction away from the image capturing unit to focus the image.

In such a focusing system, the layout of the N and S poles in the optical axis direction of one of the actuating magnet 4006 and the position detecting magnet 7004, or stated otherwise, the magnetized direction or the orientation of the magnet is inverted from the direction according to the present embodiment for applying an urging force to the lens holder frame in a direction to move away from the image capturing unit.

According to the present invention, the position detecting magnet moves at a position offset in the optical axis direction from the center of the magnetic poles of the actuating magnet (the center of the magnetic field), and an urging force is applied to the position detecting magnet mounted on the lens holder frame in a direction for the focusing lens to focus the image. In this manner, the image is focused in a shorter period of time.

The image capturing device has been illustrated as being a digital still camera in the above embodiments. However, the present invention is also applicable to any of various other image capturing devices including a video camera.

The invention claimed is:

1. A lens position detecting device for detecting the position of a lens on a base in an optical axis direction, the base being fixedly mounted in a lens barrel body, the device comprising:
   a position detecting magnet mounted on either one of said lens and said base;
   a magnetic force detecting sensor mounted on the other of said lens and said base, for generating a detected signal having a magnitude depending on the intensity of a magnetic force generated from magnetic poles of said position detecting magnet;
   an actuating magnet mounted on said base, said actuating magnet having a magnetic pole surface extending parallel to the optical axis of said lens; and
   positional information generating means for generating positional information of said lens on said base in said optical axis direction based on the magnitude of said detected signal.

2. The lens position detecting device according to claim 1, wherein said lens is held by a lens holder frame, said position detecting magnet is mounted on one of said lens holder frame and said base, and said magnetic force detecting sensor is mounted on the other of said lens holder frame and said base.

3. The lens position detecting device according to claim 2, further comprising a lens guide mechanism for holding said lens holding frame on said base for movement in said optical axis direction.

4. The lens position detecting device according to claim 1, wherein said position detecting magnet is magnetized in a direction parallel to said optical axis direction.

5. The lens position detecting device according to claim 1, wherein said magnetic force detecting sensor comprises a Hall device or a magnetoresistive device.

6. The lens position detecting device according to claim 1, wherein said magnetic force detecting sensor is disposed on a straight line passing through said position detecting magnet parallel to the optical axis of said lens.

7. The lens position detecting device according to claim 1, wherein said position detecting magnet is mounted on said lens holder frame, and said magnetic force detecting sensor is disposed on a straight line passing through said position detecting magnet parallel to the optical axis of said lens.

8. The lens position detecting device according to claim 1, wherein said positional information generating means has an amplifying circuit for amplifying said detected signal supplied from said magnetic force detecting sensor to generate an output signal, said positional information generating means generates said positional information based on said output signal, and said amplifying circuit is arranged to change an amplification factor to two or three or more different levels depending on the absolute value of the gradient of said output signal.

9. The lens position detecting device according to claim 8, further comprising noise removing means for removing noise of said detected signal or noise of said output signal.

10. The lens position detecting device according to claim 2, wherein said position detecting magnet is mounted on said lens holder frame, and said magnetic force detecting sensor comprises a first magnetic force detecting sensor and a second magnetic force detecting sensor and is mounted on said base.

11. The lens position detecting device according to claim 10, wherein said first magnetic force detecting sensor and said second magnetic force detecting sensor are disposed in respective two locations one on each side of said position detecting magnet, on a straight line passing through said position detecting magnet parallel to said optical axis.

12. The lens position detecting device according to claim 10, wherein said positional information generating means generates said positional information based on either one of a first detected signal supplied from said first magnetic force detecting sensor and a second detected signal supplied from said second magnetic force detecting sensor.

\* \* \* \* \*

UNITED STATES PATENT AND TRADEMARK OFFICE
CERTIFICATE OF CORRECTION

| | |
|---|---|
| PATENT NO. | : 8,131,141 B2 |
| APPLICATION NO. | : 10/576097 |
| DATED | : March 6, 2012 |
| INVENTOR(S) | : Tomoya Takei et al. |

It is certified that error appears in the above-identified patent and that said Letters Patent is hereby corrected as shown below:

Title page, item 22, line 1, "Aug. 18, 2005" should read -- Aug. 16, 2005 --.

Signed and Sealed this
Fourteenth Day of August, 2012

David J. Kappos
*Director of the United States Patent and Trademark Office*